(12) United States Patent
Surnilla et al.

(10) Patent No.: US 7,481,039 B2
(45) Date of Patent: Jan. 27, 2009

(54) ENGINE SYSTEM AND METHOD FOR EFFICIENT EMISSION CONTROL DEVICE PURGING

(75) Inventors: Gopichandra Surnilla, West Bloomfield, MI (US); Christian T. Goralski, Jr., Ypsilanti, MI (US); Stephen B. Smith, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 11/374,712

(22) Filed: Mar. 13, 2006

(65) Prior Publication Data

US 2006/0162320 A1 Jul. 27, 2006

Related U.S. Application Data

(62) Division of application No. 10/794,494, filed on Mar. 5, 2004, now Pat. No. 7,021,046.

(51) Int. Cl.
*F01N 3/00* (2006.01)
(52) U.S. Cl. ............... 60/274; 60/285; 123/198 F; 123/295; 123/305; 123/481; 123/692
(58) Field of Classification Search ............... 60/274, 60/276, 285, 286, 297, 301; 123/198 F, 295, 123/305, 443, 481, 493, 691, 692
See application file for complete search history.

(56) References Cited

U.S. PATENT DOCUMENTS

| | | | |
|---|---|---|---|
| 4,134,261 A * | 1/1979 | Iizuka et al. ............... 60/276 |
| 4,304,208 A | 12/1981 | Etoh et al. | |
| 4,320,726 A | 3/1982 | Etoh et al. | |
| 4,344,393 A | 8/1982 | Etoh et al. | |
| 4,376,426 A | 3/1983 | Iizuka et al. | |
| 4,391,240 A | 7/1983 | Sugasawa et al. | |
| 4,409,949 A | 10/1983 | Tanaka et al. | |
| 4,484,548 A | 11/1984 | Sugasawa et al. | |
| 5,582,003 A | 12/1996 | Patil et al. | |
| 5,758,616 A | 6/1998 | Motose | |
| 5,769,041 A | 6/1998 | Suzuki et al. | |
| 5,873,242 A | 2/1999 | Morishima et al. | |
| 6,016,654 A | 1/2000 | Schatz | |
| 6,023,929 A * | 2/2000 | Ma ........................ 60/295 |
| 6,167,696 B1 | 1/2001 | Maaseidvaag et al. | |
| 6,176,228 B1 | 1/2001 | Kerns | |
| 6,240,895 B1 * | 6/2001 | Oder ....................... 123/295 |
| 6,289,672 B1 | 9/2001 | Katoh et al. | |
| 6,415,601 B1 * | 7/2002 | Glugla et al. ............... 60/284 |
| 6,609,364 B2 * | 8/2003 | Litorell et al. ............. 60/274 |
| 6,619,258 B2 | 9/2003 | McKay et al. | |
| 6,679,221 B2 | 1/2004 | Bassi et al. | |
| 6,692,404 B2 | 2/2004 | Matsubara et al. | |
| 6,708,668 B2 * | 3/2004 | Yoshida et al. ............ 123/295 |
| 6,745,747 B2 | 6/2004 | Surnilla | |
| 6,874,490 B2 | 4/2005 | Surnilla | |

(Continued)

*Primary Examiner*—Tu M Nguyen
(74) *Attorney, Agent, or Firm*—Allan J. Lippa; Alleman Hall McCoy Russell & Tuttle LLP

(57) ABSTRACT

Various systems and methods are disclosed for carrying out combustion in a fuel-cut operation in some or all of the engine cylinders of a vehicle. Further, various subsystems are considered, such as fuel vapor purging, air-fuel ratio control, engine torque control, catalyst design, and exhaust system design.

5 Claims, 35 Drawing Sheets

U.S. PATENT DOCUMENTS

| | | |
|---|---|---|
| 6,883,311 B2 | 4/2005 | Liu |
| 6,886,649 B2 | 5/2005 | Wakashiro et al. |
| 6,892,527 B2 | 5/2005 | Ueda et al. |
| 6,915,775 B2 | 7/2005 | Patterson et al. |
| 6,995,042 B2 | 2/2006 | Abbott |
| 7,004,148 B2 | 2/2006 | Yokoi et al. |
| 7,181,902 B2 * | 2/2007 | Naik .......................... 60/274 |
| 7,383,813 B2 * | 6/2008 | Weiss et al. ................ 123/325 |
| 7,401,462 B2 * | 7/2008 | Naik et al. ................... 60/274 |
| 2002/0107106 A1 | 8/2002 | Kato et al. |
| 2003/0086850 A1 | 5/2003 | Jobson et al. |
| 2004/0107945 A1 | 6/2004 | Yeo |

* cited by examiner

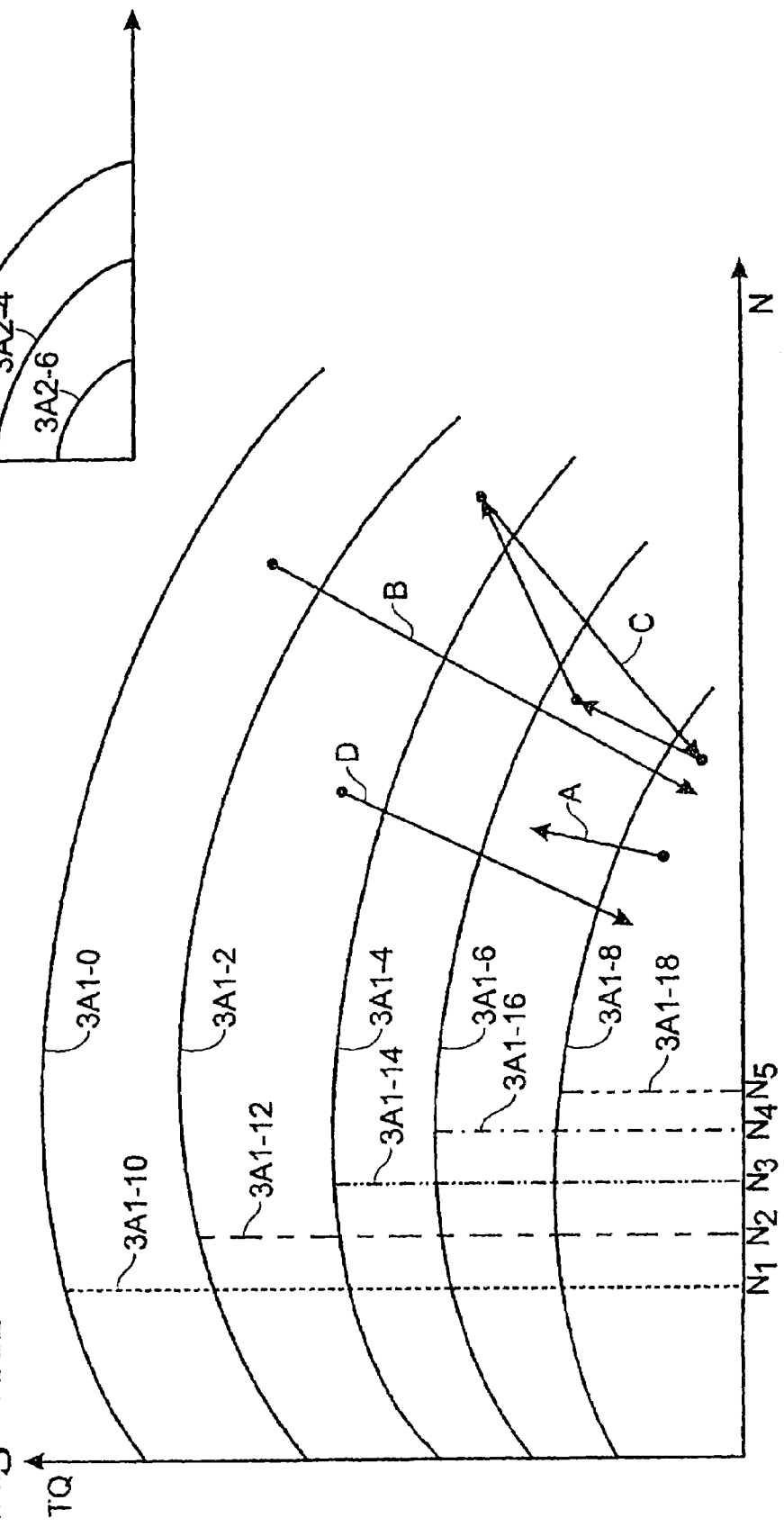

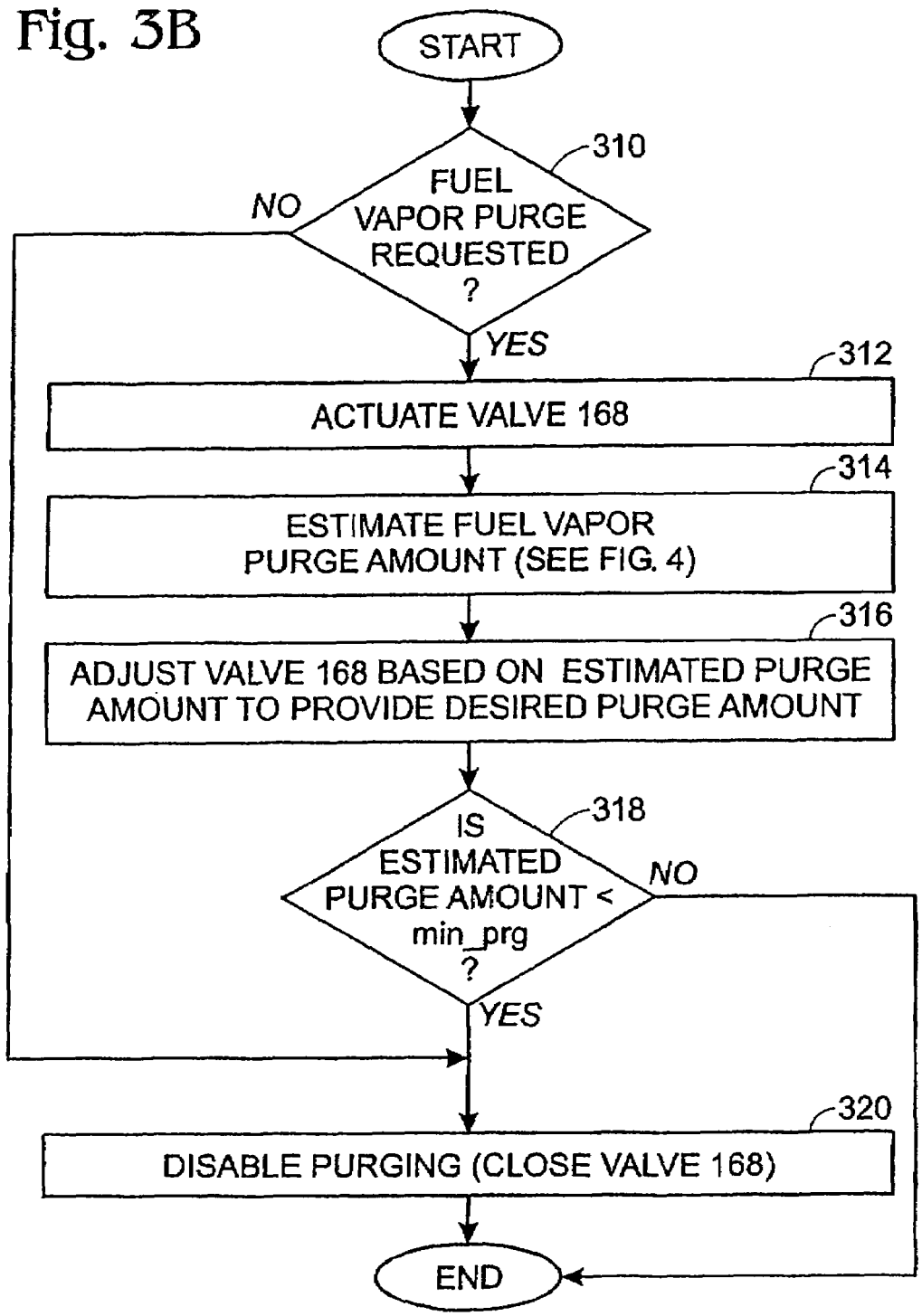

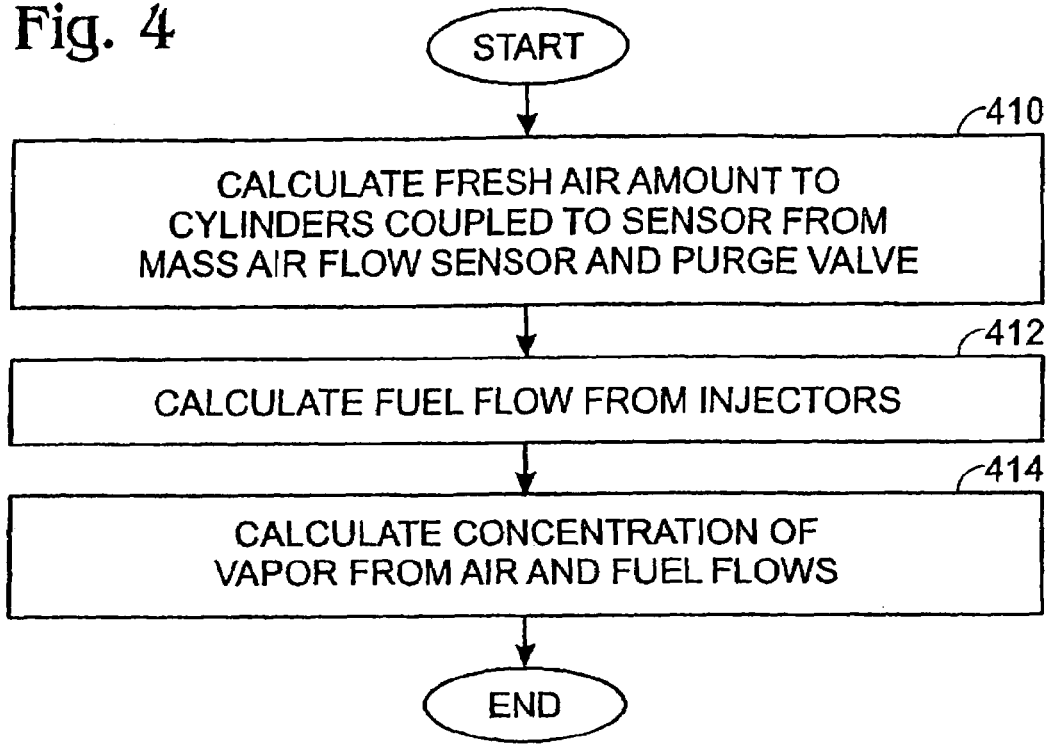
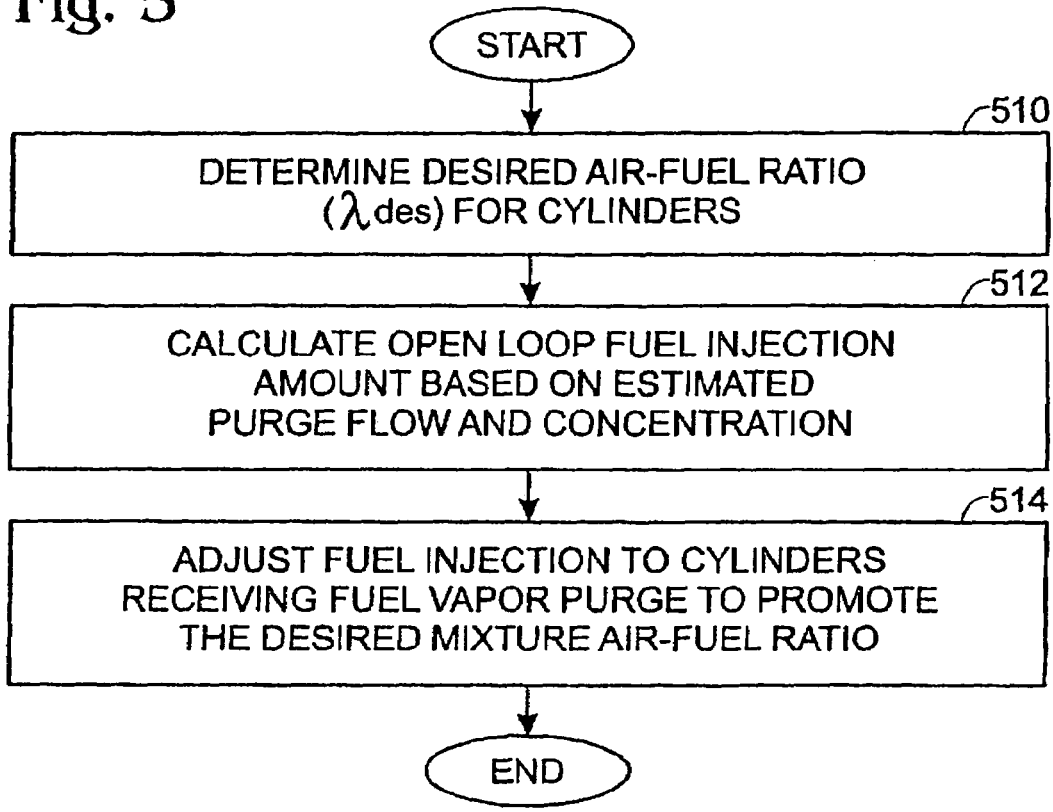

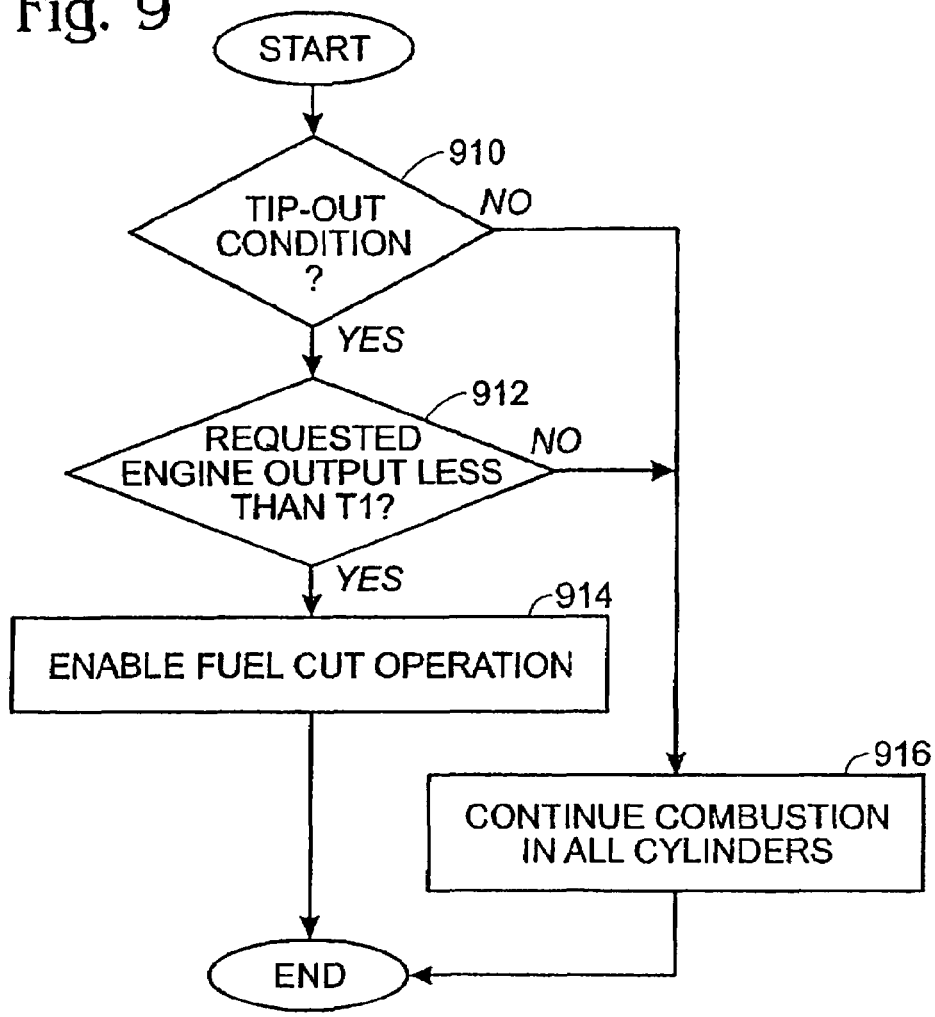
Fig. 9
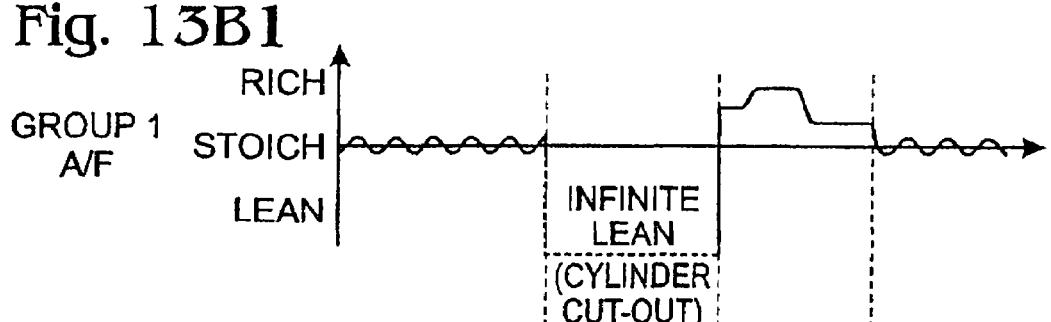
Fig. 13B1
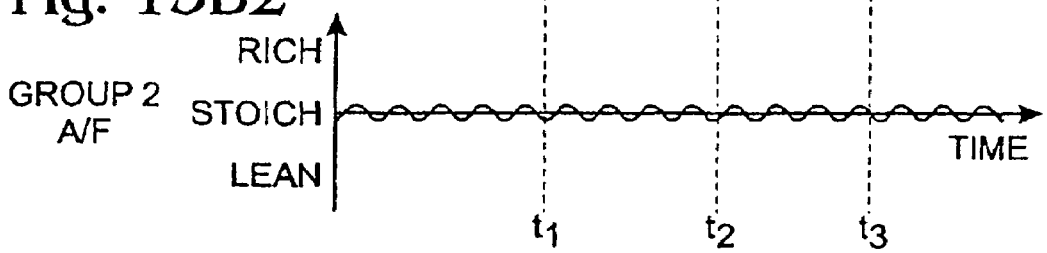
Fig. 13B2

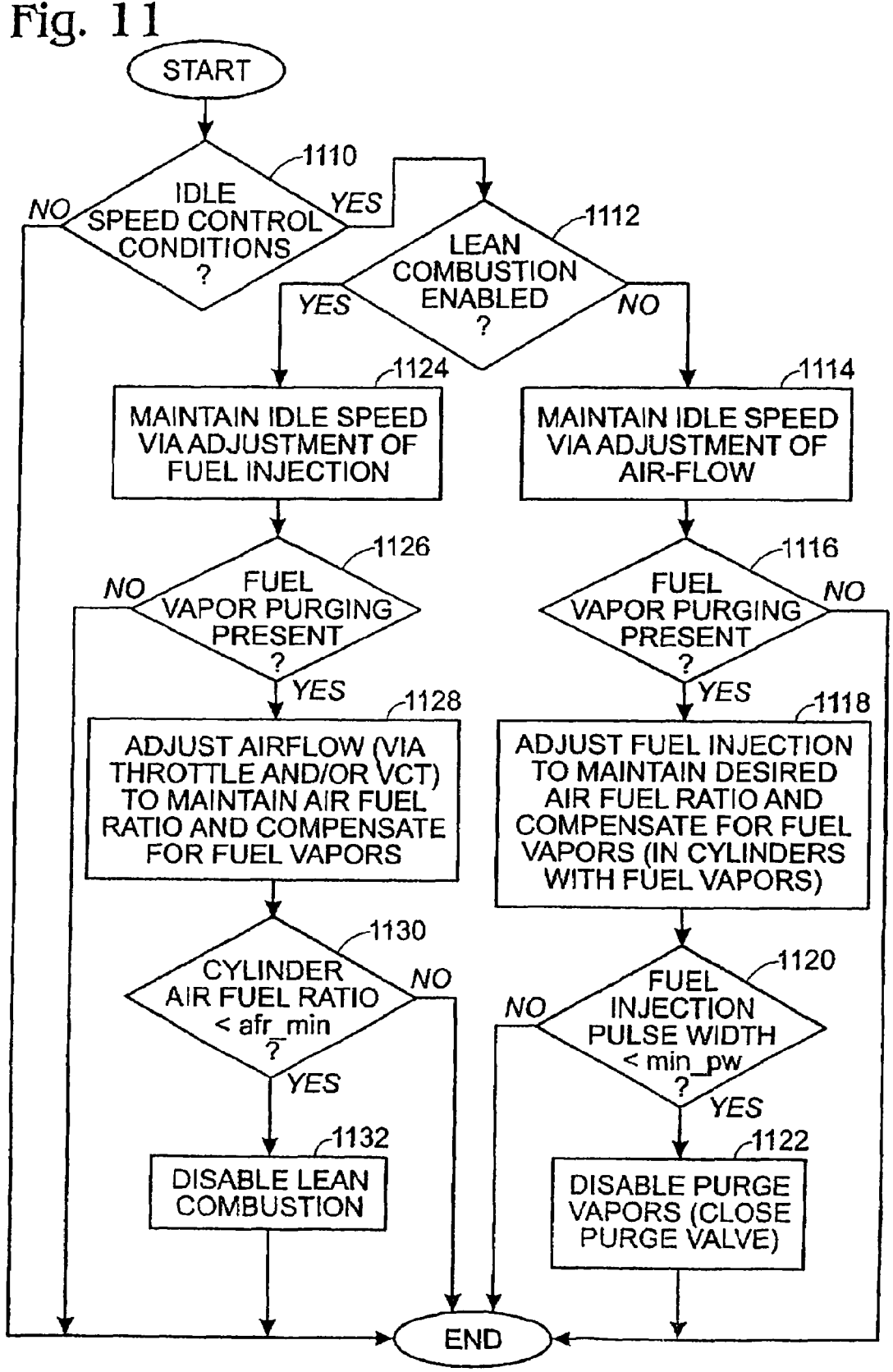

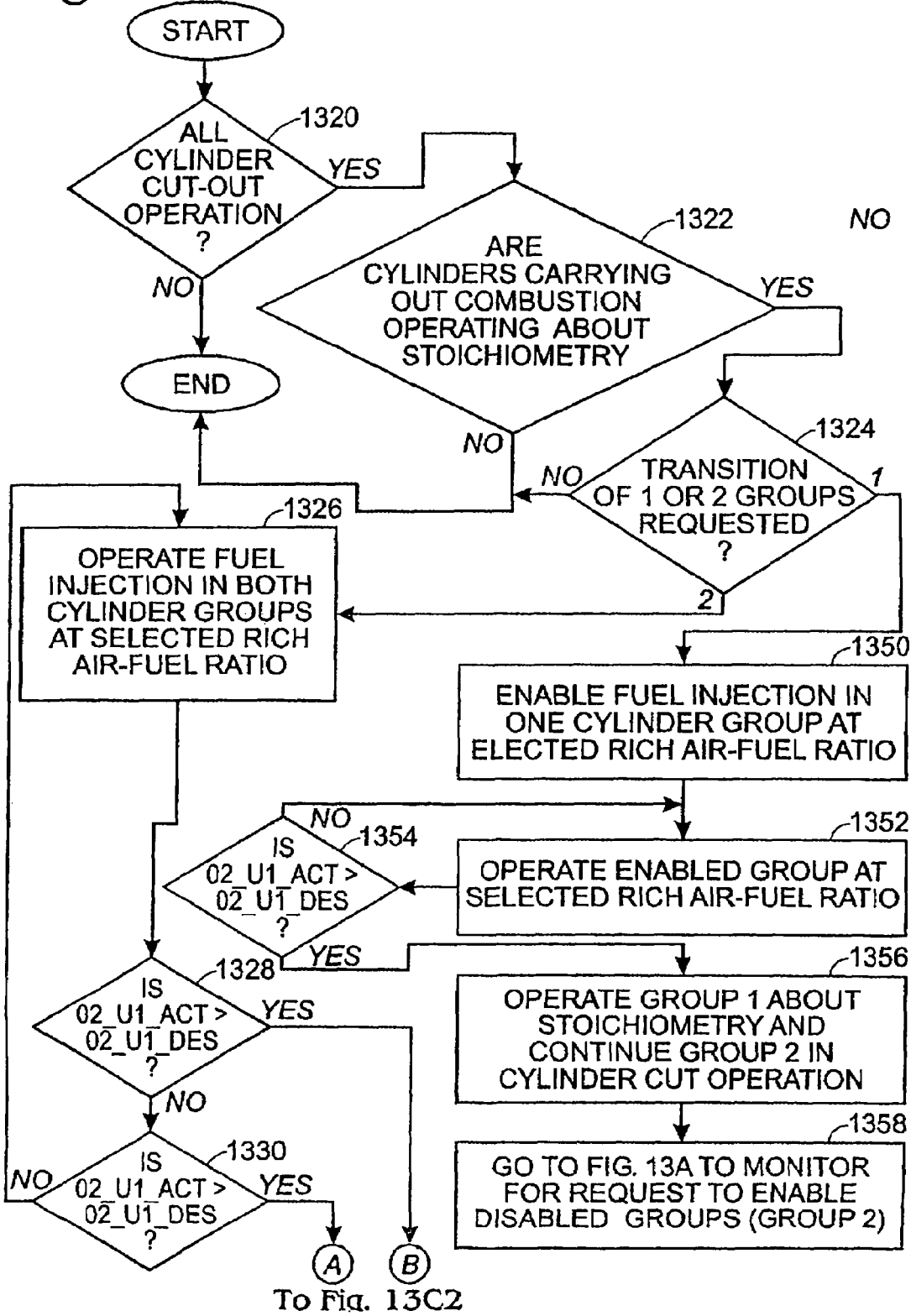
Fig. 13C1

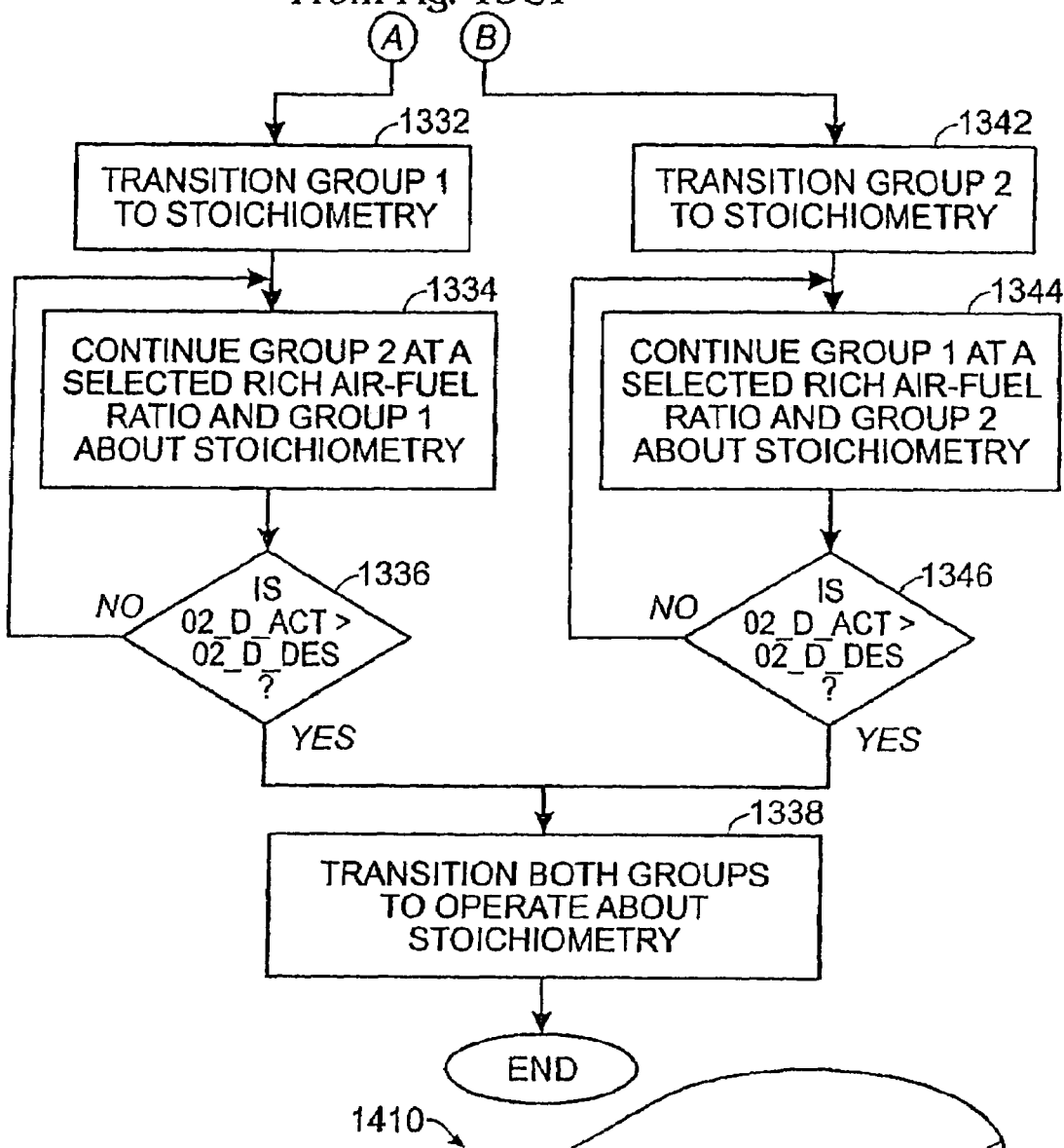
Fig. 13C2
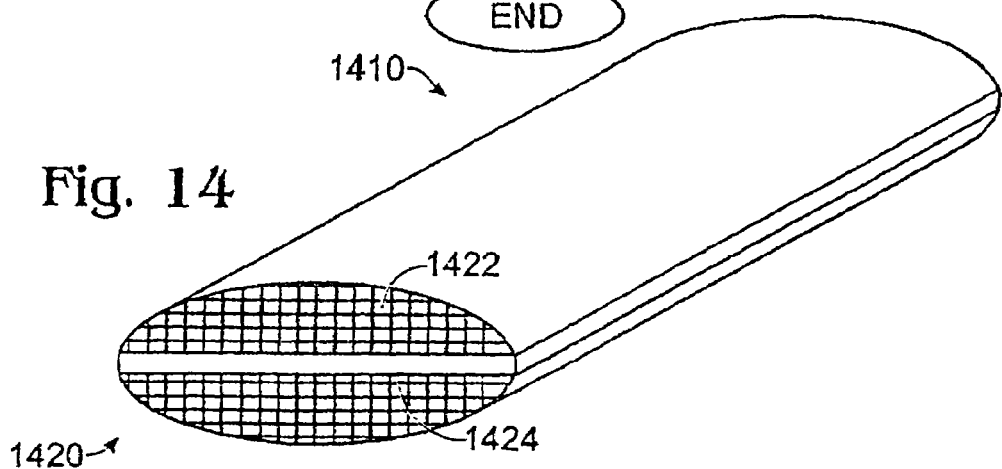
Fig. 14

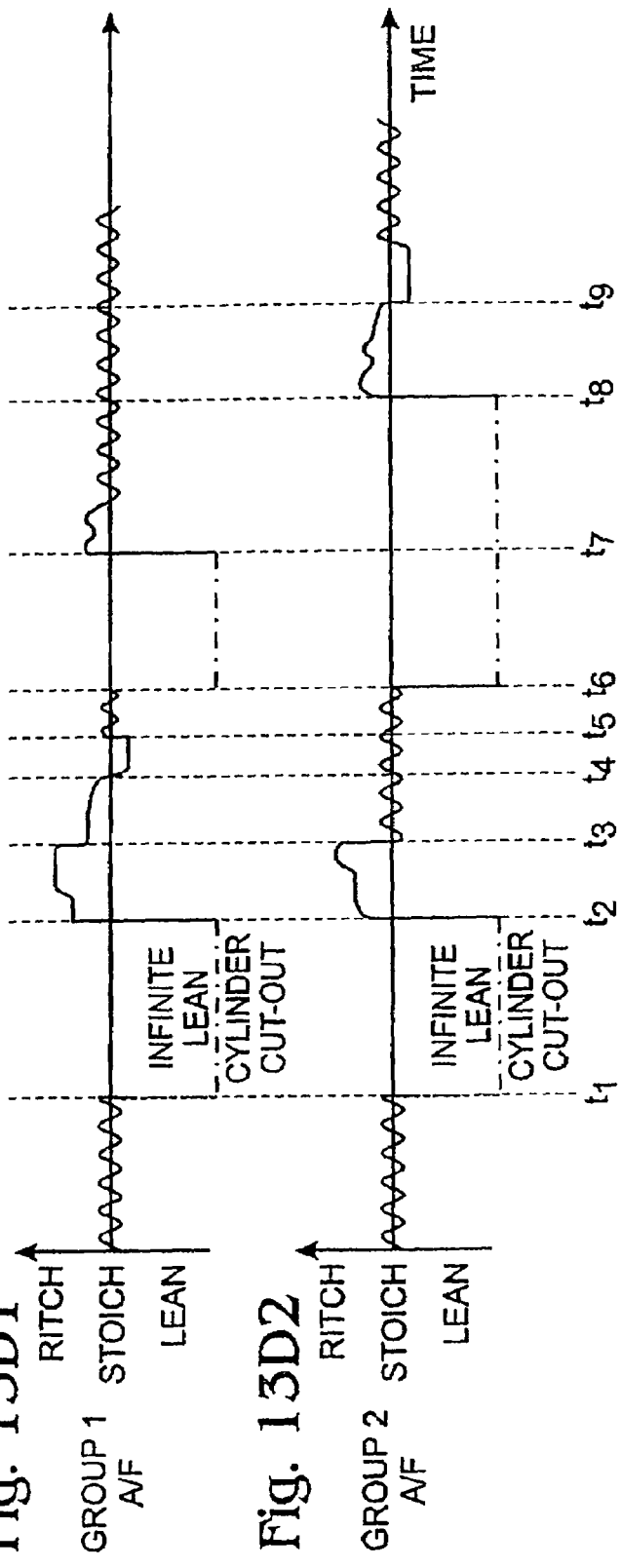
Fig. 13D1
Fig. 13D2
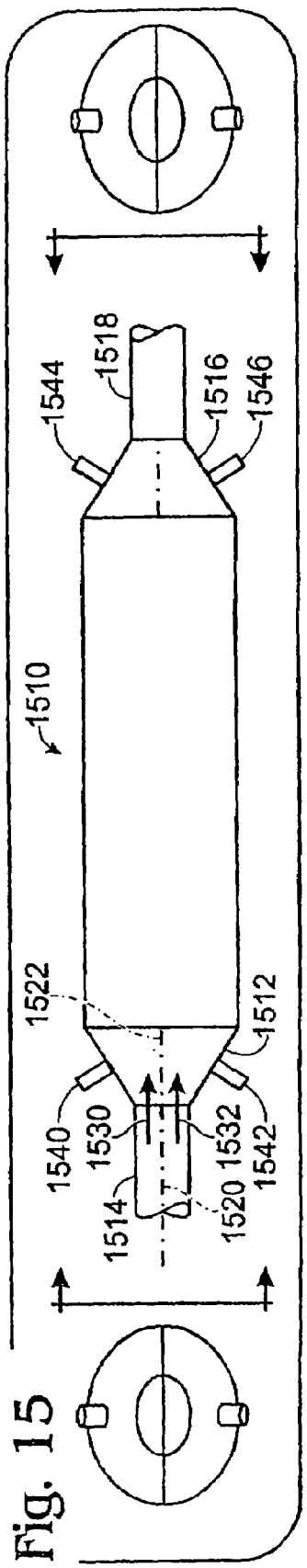
Fig. 15

TORQUE PULSATIONS FOR ALL 8 CYLINDERS FIRING

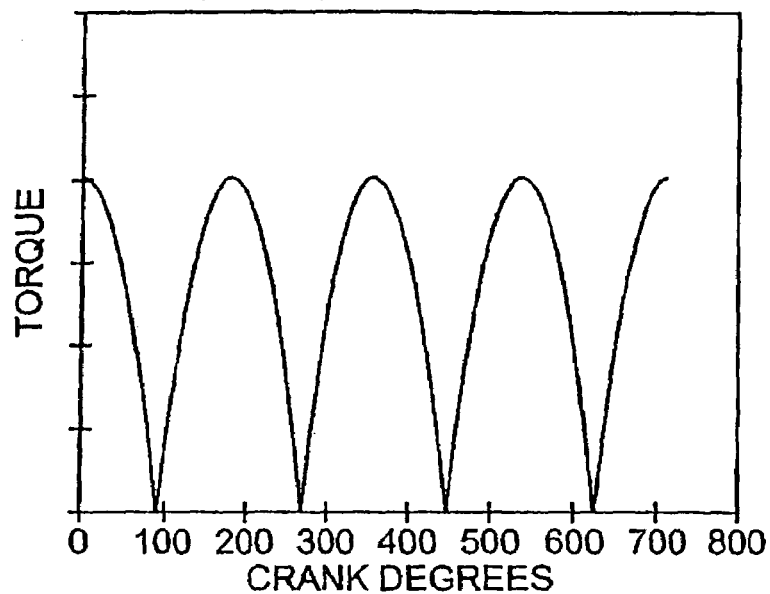
Fig. 23 TORQUE PULSATIONS FOR STEADY 4(1-3-5-7) CYLINDER MODE
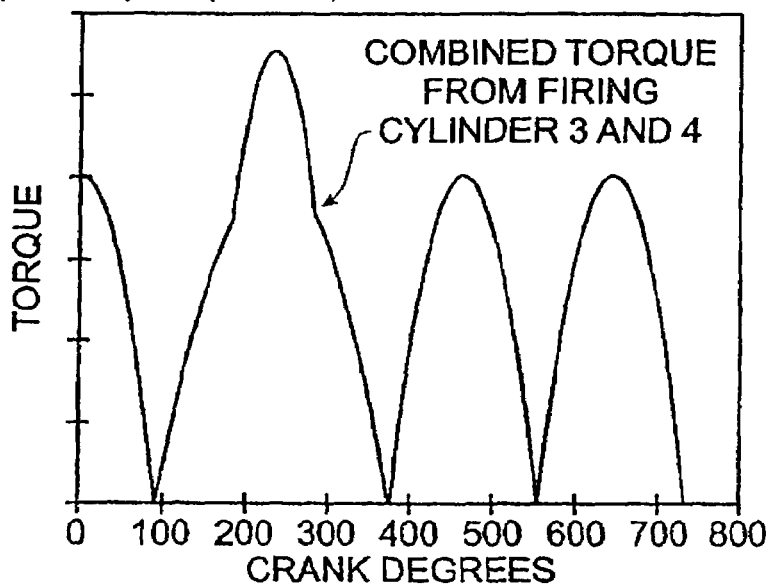
Fig. 24 TORQUE PULSATIONS FOR TRANSITION FROM (1-3-5-7) TO (2-4-6-8) WITHOUT COMPENSATION TORQUE PULSATIONS FOR TRANSITION FROM (1-3-5-7) TO (2-4-6-8) WITH COMPENSATION ALL ON LAST CYLINDER BEFORE TRANSITION TORQUE PULSATIONS FOR TRANSITION FROM (1-3-5-7) TO (2-4-6-8) WITH COMPENSATION ALL ON FIRST CYLINDER AFTER TRANSITION

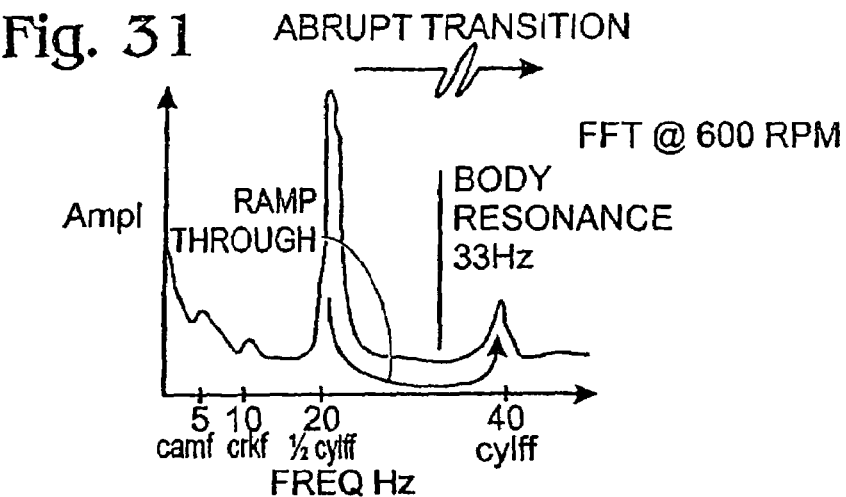
Fig. 31
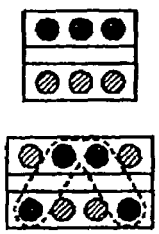
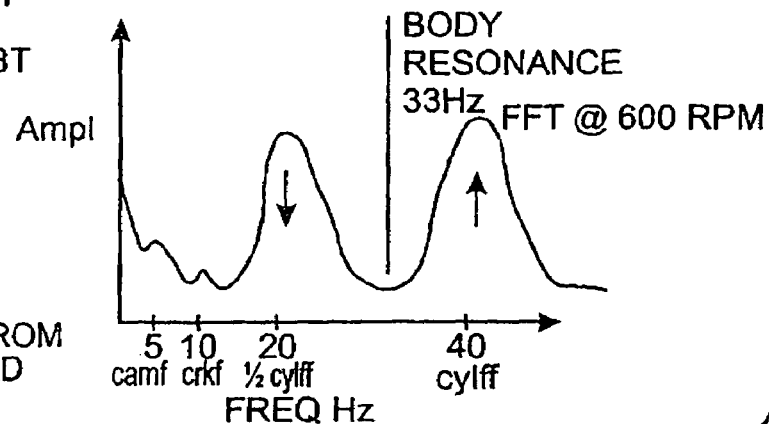
Fig. 32
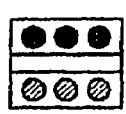
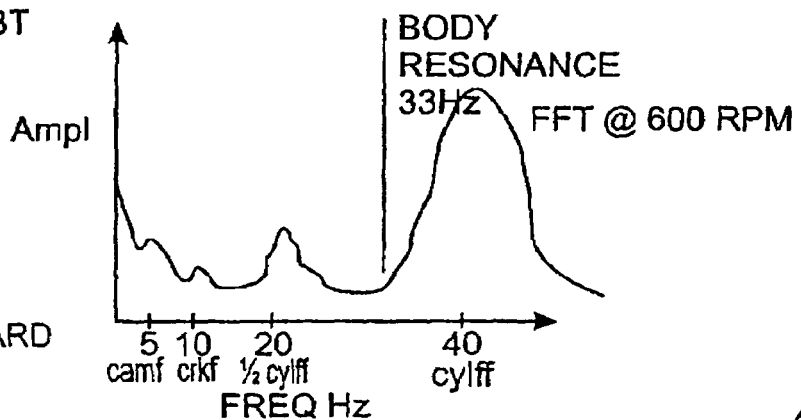
Fig. 33

ENGINE SYSTEM AND METHOD FOR EFFICIENT EMISSION CONTROL DEVICE PURGING

CROSS-REFERENCE TO RELATED APPLICATIONS

The present application is a divisional of U.S. patent application Ser. No. 10/794,494, filed Mar. 5, 2004, now U.S. Pat. No. 7,021,046 and entitled "Engine System and Method for Efficient Emission Control Device Purging," the entire contents of which are incorporated herein by reference.

BACKGROUND AND SUMMARY

Engines are usually designed with the ability to deliver a peak output, although most engine operation is performed well below this peak value. As such, it can be beneficial to operate with some cylinders inducting air without fuel injection as described in U.S. Pat. No. 6,568,177.

As described in U.S. Pat. No. 6,568,177, periodically it may be necessary to purge stored NOx by operating all of the cylinders stoichiometric or rich.

The inventors herein have recognized that such an approach may result in wasting excess fuel in configurations where there are multiple cylinder banks, each having an upstream emission control device, when it is desired to reduce NOx stored in a downstream device. Specifically, fuel is must be used to reduce stored oxidants in both upstream devices, before downstream stored NOx can be reduced.

The above disadvantage can be overcome by a method for controlling an engine having at least a first and second group of cylinders. The method comprises:

operating the engine in a first mode wherein the first cylinder group operates with air and substantially no injected fuel and the second cylinder group operates to combust air and injected fuel; and transitioning the engine to operating in a second mode wherein both the first cylinder group and the second cylinder group operate to combust air and injected fuel, combustion in one of said first and second cylinder group oscillating about stoichiometry and combustion in the other of said first and second cylinder group being rich of stoichiometry In this way, it is possible, in one embodiment, to provide the ability to operate some cylinders without fuel injection, and save still further fuel when it may be desired to purge NOx stored in a downstream emission control device. Note, however, that the above approach can be used in other situations as well to improve performance.

In another aspect, another disadvantage with prior approaches can relate to transitioning from operation with some cylinder deactivated and active cylinders combusting, to all cylinders combusting. Specifically, retarded ignition timing is used, along with throttling to reduce any torque disturbance that may result. However, throttle is generally to slow due to manifold filling effects, and as such, ignition timing retard is heavily relied upon. Significant reliance on ignition timing retard, however, can result is degraded fuel economy.

Therefore, to overcome the above disadvantage, the inventors herein have recognized that the above fuel economy degradation can be reduced by operating the re-enabled cylinders at a lean combustion limit, thereby reducing the amount of ignition timing retard that may be needed. In one example, a method for controlling an engine having at least a first and second group of cylinders comprises:

operating the engine in a first mode wherein the first cylinder group operates with air and substantially no injected fuel and the second cylinder group operates to combust air and injected fuel; and transitioning the engine to operating in a second mode wherein both the first cylinder group and the second cylinder group operate to combust air and injected fuel, combustion in both said first and second cylinder group being lean of stoichiometry at a lean combustion limit with retarded ignition timing.

BRIEF DESCRIPTION OF THE FIGURES

The above features and advantages will be readily apparent from the following detailed description of example embodiment(s). Further, these features and advantages will also be apparent from the following drawings.

FIGS. 3A1-3A2 are graphs representing different engine operating modes at different speed torque regions;

FIGS. 3B-3C, 4-5, 7-11, 12A-12B, 13A, 13C1-C2, and 16-20 and 34 are high level flow charts showing example routines and methods;

FIGS. 6A-D, 13B1-13B2 and 13D1-13D2 are graphs show example operation;

FIGS. 14 and 15 show a bifurcated catalyst;

FIGS. 22-27 show engine torque over an engine cycle during a transition between different cylinder cut-out modes;

FIGS. 28-33 show Fourier diagrams of engine torque excitation across various frequencies for different operating modes, and when transitioning between operating modes.

DETAILED DESCRIPTION OF EXAMPLE EMBODIMENT(S) OF THE INVENTION

Figure 1:
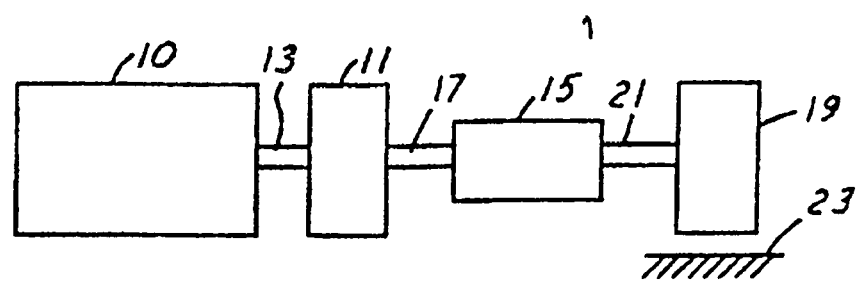
FIG. 1 is a block diagram of a vehicle illustrating various components of the powertrain system.
Figure 1A:
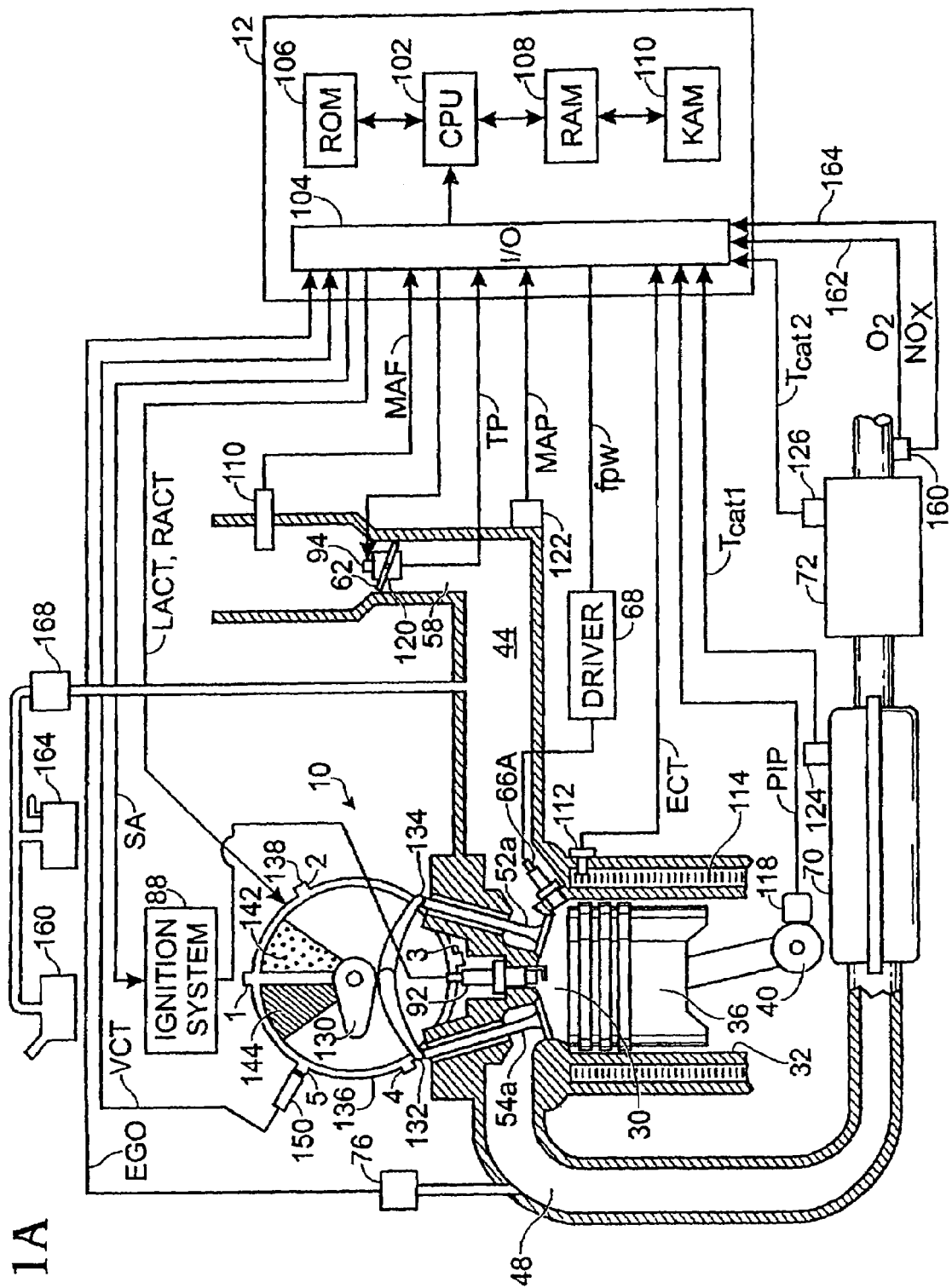
FIGS. 1A and 1B show a partial engine view.
Figure 1B:
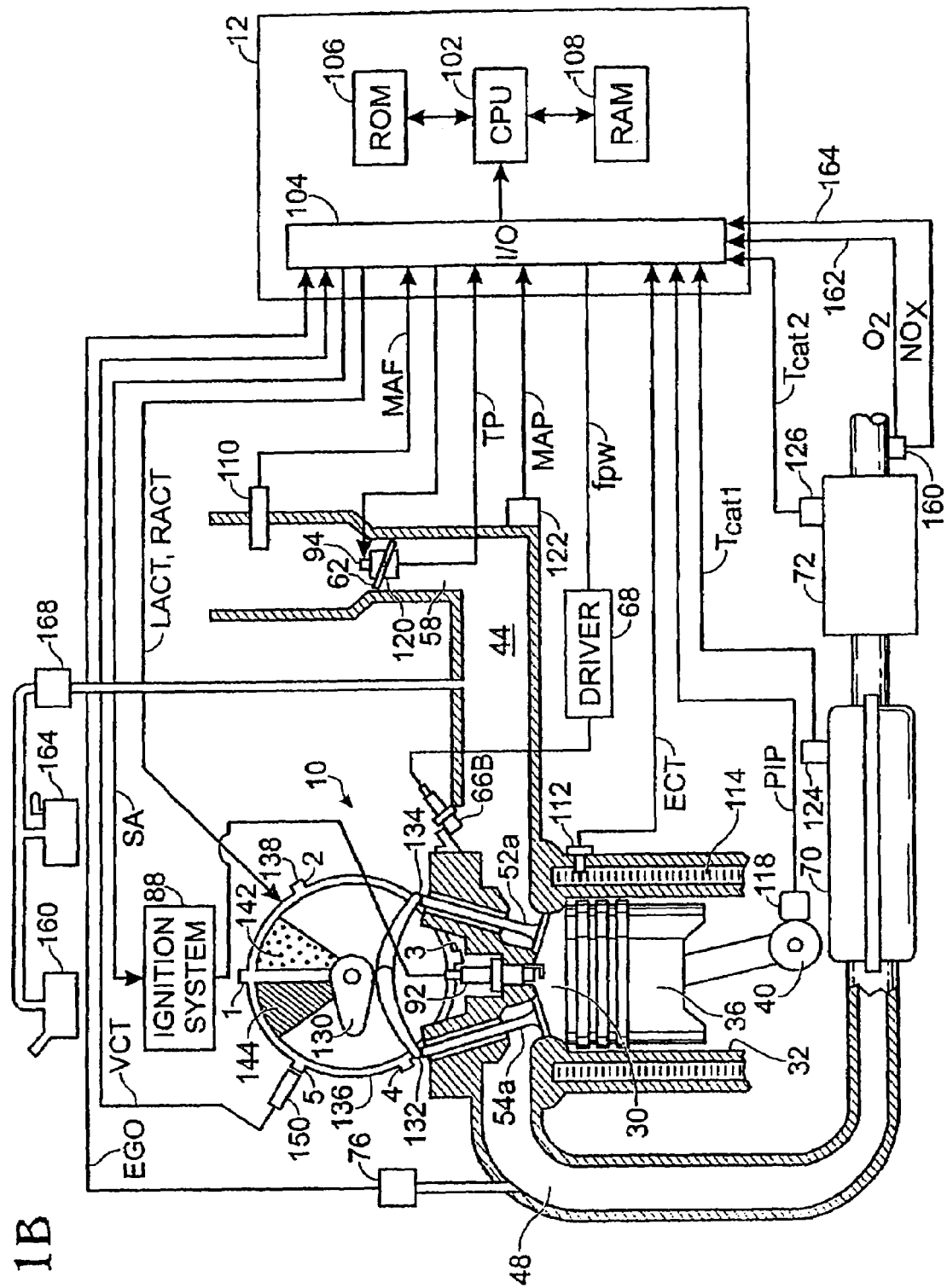

Referring to FIG. 1, internal combustion engine 10, further described herein with particular reference to FIGS. 1A and 1B, is shown coupled to torque converter 11 via crankshaft 13. Torque converter 11 is also coupled to transmission 15 via turbine shaft 17. Torque converter 11 has a bypass, or lock-up clutch 14 which can be engaged, disengaged, or partially engaged. When the clutch is either disengaged or partially engaged, the torque converter is said to be in an unlocked state. The lock-up clutch 14 can be actuated electrically, hydraulically, or electro-hydraulically, for example. The lock-up clutch 14 receives a control signal (not shown) from the controller, described in more detail below. The control signal may be a pulse width modulated signal to engage, partially engage, and disengage, the clutch based on engine, vehicle, and/or transmission operating conditions. Turbine shaft 17 is also known as transmission input shaft. Transmission 15 comprises an electronically controlled transmission with a plurality of selectable discrete gear ratios. Transmission 15 also comprises various other gears, such as, for example, a final drive ratio (not shown). Transmission 15 is also coupled to tire 19 via axle 21. Tire 19 interfaces the vehicle (not shown) to the road 23. Note that in one example embodiment, this powertrain is coupled in a passenger vehicle that travels on the road.

FIGS. 1A and 1B show one cylinder of a multi-cylinder engine, as well as the intake and exhaust path connected to that cylinder. As described later herein with particular reference to FIG. 2, there are various configurations of the cylinders and exhaust system, as well as various configuration for the fuel vapor purging system and exhaust gas oxygen sensor locations.

Continuing with FIG. 1A, direct injection spark ignited internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) is coupled to crankshaft 40 via a flywheel (not shown). In this particular example, piston 36 includes a recess or bowl (not shown) to help in forming stratified charges of air and fuel. Combustion chamber, or cylinder, 30 is shown communicating with intake manifold 44 and exhaust manifold 48 via respective intake valves 52a and 52b (not shown), and exhaust valves 54a and 54b (not shown). Fuel injector 66A is shown directly coupled to combustion chamber 30 for delivering injected fuel directly therein in proportion to the pulse width of signal fpw received from controller 12 via conventional electronic driver 68. Fuel is delivered to fuel injector 66A by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas sensor 76 is shown coupled to exhaust manifold 48 upstream of catalytic converter 70 (note that sensor 76 corresponds to various different sensors, depending on the exhaust configuration as described below with regard to FIG. 2. Sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS is used to advantage during feedback air/fuel control in a conventional manner to maintain average air/fuel at stoichiometry during the stoichiometric homogeneous mode of operation.

Conventional distributorless ignition system 88 provides ignition spark to combustion chamber 30 via spark plug 92 in response to spark advance signal SA from controller 12.

Controller 12 causes combustion chamber 30 to operate in either a homogeneous air/fuel mode or a stratified air/fuel mode by controlling injection timing. In the stratified mode, controller 12 activates fuel injector 66A during the engine compression stroke so that fuel is sprayed directly into the bowl of piston 36. Stratified air/fuel layers are thereby formed. The strata closest to the spark plug contain a stoichiometric mixture or a mixture slightly rich of stoichiometry, and subsequent strata contain progressively leaner mixtures. During the homogeneous mode, controller 12 activates fuel injector 66A during the intake stroke so that a substantially homogeneous air/fuel mixture is formed when ignition power is supplied to spark plug 92 by ignition system 88. Controller 12 controls the amount of fuel delivered by fuel injector 66A so that the homogeneous air/fuel mixture in chamber 30 can be selected to be at stoichiometry, a value rich of stoichiometry, or a value lean of stoichiometry. The stratified air/fuel mixture will always be at a value lean of stoichiometry, the exact air/fuel being a function of the amount of fuel delivered to combustion chamber 30. An additional split mode of operation wherein additional fuel is injected during the exhaust stroke while operating in the stratified mode is also possible.

Nitrogen oxide (NOx) adsorbent or trap 72 is shown positioned downstream of catalytic converter 70. NOx trap 72 is a three-way catalyst that adsorbs NOx when engine 10 is operating lean of stoichiometry. The adsorbed NOx is subsequently reacted with HC and CO and catalyzed when controller 12 causes engine 10 to operate in either a rich homogeneous mode or a near stoichiometric homogeneous mode such operation occurs during a NOx purge cycle when it is desired to purge stored NOx from NOx trap 72, or during a vapor purge cycle to recover fuel vapors from fuel tank 160 and fuel vapor storage canister 164 via purge control valve 168, or during operating modes requiring more engine power, or during operation modes regulating temperature of the omission control devices such as catalyst 70 or NOx trap 72. (Again, note that emission control devices 70 and 72 can correspond to various devices described in FIGS. 2A-R). Also note that various types of purging systems can be used, as described in more detail below with regard to FIGS. 2A-R.

Controller 12 is shown in FIG. 1A as a conventional microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; and absolute Manifold Pressure Signal MAP from sensor 122. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give and indication of engine load. Further, this sensor, along with engine speed, can provide an estimate of charge (including air) inducted into the cylinder. In a one example, sensor 118, which is also used as an engine speed sensor, produces a predetermined number of equally spaced pulses every revolution of the crankshaft.

In this particular example, temperature Tcat1 of catalytic converter 70 and temperature Tcat2 of emission control device 72 (which can be a NOx trap) are inferred from engine operation as disclosed in U.S. Pat. No. 5,414,994, the specification of which is incorporated herein by reference. In an alternate embodiment, temperature Tcat1 is provided by temperature sensor 124 and temperature Tcat2 is provided by temperature sensor 126.

Continuing with FIG. 1A, camshaft 130 of engine 10 is shown communicating with rocker arms 132 and 134 for actuating intake valves 52a, 52b and exhaust valve 54a, 54b. Camshaft 130 is directly coupled to housing 136. Housing 136 forms a toothed wheel having a plurality of teeth 138. Housing 136 is hydraulically coupled to an inner shaft (not shown), which is in turn directly linked to camshaft 130 via a timing chain (not shown). Therefore, housing 136 and camshaft 130 rotate at a speed substantially equivalent to the inner camshaft. The inner camshaft rotates at a constant speed ratio to crankshaft 40. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

Teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing is measured using the method described in U.S. Pat. No. 5,548,995, which is incorporated herein by reference. In general terms, the time, or rotation angle between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 160 provides an indication of both oxygen concentration in the exhaust gas as well as NOx concentration. Signal 162 provides controller a voltage indicative of the O2 concentration while signal 164 provides a voltage indicative of NOx concentration. Alternatively, sensor 160 can be a HEGO, UEGO, EGO, or other type of exhaust gas sensor. Also note that, as described above with regard to sensor 76, sensor 160 can correspond to various different sensors depending on the system configuration, as described in more detail below with regard to FIG. 2.

As described above, FIGS. 1A (and 1B) merely show one cylinder of a multi-cylinder engine, and that each cylinder has its own set of intake/exhaust valves, fuel injectors, spark plugs, etc.

Referring now to FIG. 1B, a port fuel injection configuration is shown where fuel injector 66B is coupled to intake manifold 44, rather than directly cylinder 30.

Also, in the example embodiments described herein, the engine is coupled to a starter motor (not shown) for starting the engine. The starter motor is powered when the driver turns a key in the ignition switch on the steering column, for example. The starter is disengaged after engine start as evidence, for example, by engine 10 reaching a predetermined speed after a predetermined time. Further, in the disclosed embodiments, an exhaust gas recirculation (EGR) system routes a desired portion of exhaust gas from exhaust manifold 48 to intake manifold 44 via an EGR valve (not shown). Alternatively, a portion of combustion gases may be retained in the combustion chambers by controlling exhaust valve timing.

The engine 10 operates in various modes, including lean operation, rich operation, and "near stoichiometric" operation. "Near stoichiometric" operation refers to oscillatory operation around the stoichiometric air fuel ratio. Typically, this oscillatory operation is governed by feedback from exhaust gas oxygen sensors. In this near stoichiometric operating mode, the engine is operated within approximately one air-fuel ratio of the stoichiometric air-fuel ratio. This oscillatory operation is typically on the order of 1 Hz, but can vary faster and slower than 1 Hz. Further, the amplitude of the oscillations are typically within 1 a/f ratio of stoichiometry, but can be greater than 1 a/f ratio under various operating conditions. Note that this oscillation does not have to be symmetrical in amplitude or time. Further note that an air-fuel bias can be included, where the bias is adjusted slightly lean, or rich, of stoichiometry (e.g., within 1 a/f ratio of stoichiometry). Also note that this bias and the lean and rich oscillations can be governed by an estimate of the amount of oxygen stored in upstream and/or downstream three way catalysts.

As described below, feedback air-fuel ratio control is used for providing the near stoichiometric operation. Further, feedback from exhaust gas oxygen sensors can be used for controlling air-fuel ratio during lean and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or VCT) is adjusted based on a desired air-fuel ratio and the air-fuel ratio from the sensor. Further still, individual cylinder air-fuel ratio control could be used, if desired.

Also note that various methods can be used to maintain the desired torque such as, for example, adjusting ignition timing, throttle position, variable cam timing position, exhaust gas recirculation amount, and a number of cylinders carrying out combustion. Further, these variables can be individually adjusted for each cylinder to maintain cylinder balance among all the cylinder groups.

Figure 2A:
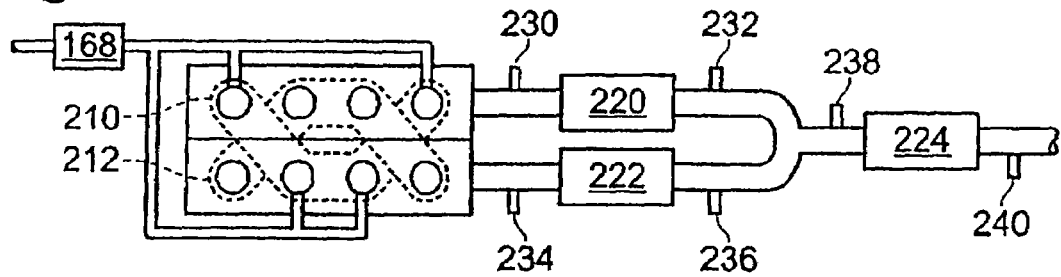
FIGS. 2A-2T show various schematic system configurations.

Referring now to FIG. 2A, a first example configuration is described using a V-8 engine, although this is simply one example, since a V-10, V-12, 14, 16, etc., could also be used. Note that while numerous exhaust gas oxygen sensors are shown, a subset of these sensors can also be used. Further, only a subset of the emission control devices can be used, and a non-y-pipe configuration can also be used. As shown in FIG. 2A, some cylinders of first combustion chamber group 210 are coupled to the first catalytic converter 220, while the remainder are coupled to catalyst 222. Upstream of catalyst 220 and downstream of the first cylinder group 210 is an exhaust gas oxygen sensor 230. Downstream of catalyst 220 is a second exhaust gas sensor 232. In this example, groups 210 and 212 each have four cylinders. However, either group 210 or group 212 could be divided into other groups, such as per cylinder bank. This would provide four cylinder groups (two on each bank, each with two cylinders in the group). In this way, two different cylinder groups can be coupled to the same exhaust gas path on one side of the engine's bank.

Similarly, some cylinders of second combustion chamber group 212 are coupled to a second catalyst 222, while the remainder are coupled to catalyst 220. Upstream and downstream are exhaust gas oxygen sensors 234 and 236 respectively. Exhaust gas spilled from the first and second catalyst 220 and 222 merge in a Y-pipe configuration before entering downstream under body catalyst 224. Also, exhaust gas oxygen sensors 238 and 240 are positioned upstream and downstream of catalyst 224, respectively.

In one example embodiment, catalysts 220 and 222 are platinum and rhodium catalysts that retain oxidants when operating lean and release and reduce the retained oxidants when operating rich. Further, these catalysts can have multiple bricks, and further these catalysts can represent several separate emission control devices.

Similarly, downstream underbody catalyst 224 also operates to retain oxidants when operating lean and release and reduce retained oxidants when operating rich. As described above, downstream catalyst 224 can be a group of bricks, or several emission control devices. Downstream catalyst 224 is typically a catalyst including a precious metal and alkaline earth and alkaline metal and base metal oxide. In this particular example, downstream catalyst 224 contains platinum and barium.

Note that various other emission control devices could be used, such as catalysts containing palladium or perovskites. Also, exhaust gas oxygen sensors 230 to 240 can be sensors of various types. For example, they can be linear oxygen sensors for providing an indication of air-fuel ratio across a broad range. Also, they can be switching type exhaust gas oxygen sensors that provide a switch in sensor output at the stoichiometric point. Also, the system can provide less than all of sensors 230 to 240, for example, only sensors 230, 234, and 240. In another example, only sensor 230, 234 are used with only devices 220 and 222. Also, while FIG. 2A shows a V-8 engine, various other numbers of cylinders could be used. For example, an I4 engine can be used, where there are two groups of two cylinders leading to a common exhaust path with and upstream and downstream emission control device.

When the system of FIG. 2A is operated in an AIR/LEAN mode, first combustion group 210 is operated at a lean air-fuel ratio (typically leaner than about 18:1) and second combustion group 212 is operated without fuel injection. Thus, in this case, and during this operation, the exhaust air-fuel ratio is a mixture of air from the cylinders without injected fuel, and a lean air fuel ratio from the cylinders combusting a lean air-fuel mixture. In this way, fuel vapors from valve 168 can be burned in group 210 cylinders even during the AIR/LEAN mode. Note that the engine can also operate in any of the 5 various modes described below with regard to FIG. 3A1, for example. Note that, as described in more detail below, the mode selected may be based on desired engine output torque, whether idle speed control is active, exhaust temperature, and various other operating conditions.

Figure 2B:
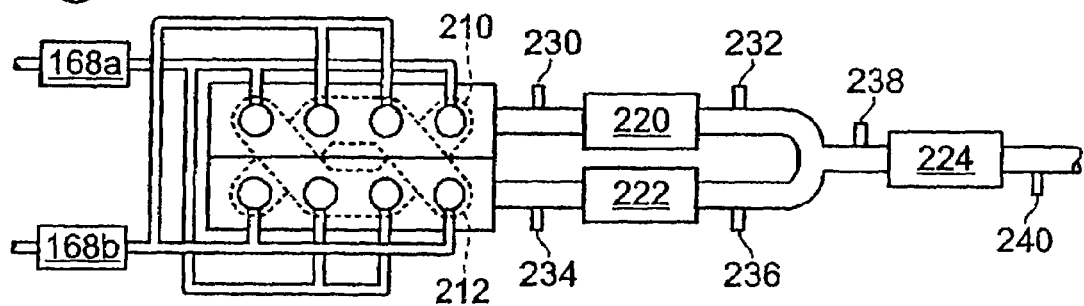

Referring now to FIG. 2B, a system similar to that in FIG. 2A is shown, however a dual fuel vapor purge system is shown with first and second purge valves 168A and 168B. Thus, independent control of fuel vapors between each of groups 210 and 212 is provided. When the system of FIG. 2B is operated in an AIR/LEAN mode, first combustion group 210 is operated at a lean air-fuel ratio (typically leaner than about 18:1), second combustion group 212 is operated without fuel injection, and fuel vapor purging can be enabled to group 210 via valve 168A (and disabled to group 212 via valve 168B). Alternatively, first combustion group 210 is operated without fuel injection, second combustion group 212 is operated at a lean air-fuel ratio, and fuel vapor purging can be enabled to group 212 via valve 168B (and disabled to group 210 via valve 168A). In this way, the system can perform the AIR/LEAN mode in different cylinder groups depending on operating conditions, or switch between the cylinder groups to provide even wear, etc.

Figure 2C:
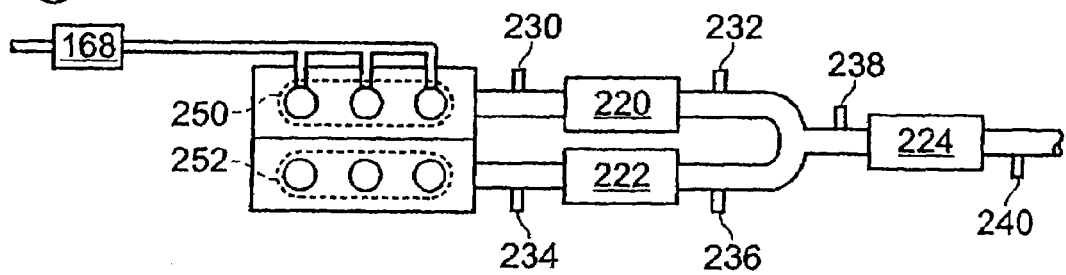

Referring now to FIG. 2C, a V-6 engine is shown with first group 250 on one bank, and second group 252 on a second bank. The remainder of the exhaust system is similar to that described above in FIGS. 2A and 2B. The fuel vapor purge system has a single control valve 168 fed to cylinders in group 250.

When the system of FIG. 2C is operated in an AIR/LEAN mode, first combustion group 250 is operated at a lean air-fuel ratio (typically leaner than about 18:1) and second combustion group 252 is operated without fuel injection. Thus, in this case, and during this operation, the exhaust air-fuel ratio is a mixture of air from the cylinders without injected fuel, and a lean air fuel ratio from the cylinders combusting a lean air-fuel mixture. In this way, fuel vapors from valve 168 can be burned in group 250 cylinders even during the AIR/LEAN mode. Note that the engine can also operate in any of the 5 various modes described below with regard to FIG. 3A1, for example.

Figure 2D:
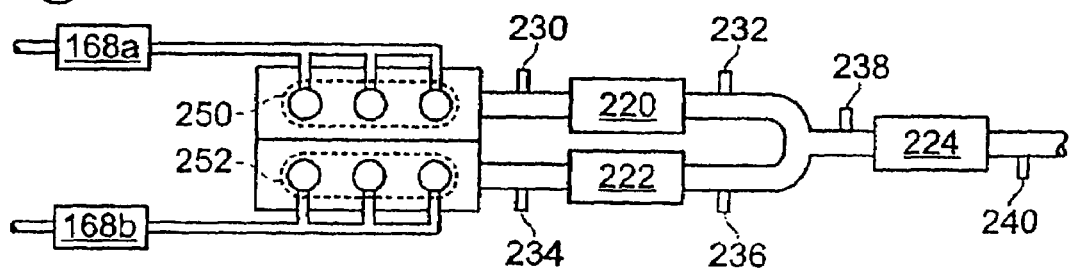

Referring now to FIG. 2D, a system similar to that in FIG. 2C is shown, however a dual fuel vapor purge system is shown with first and second purge valves 168A and 168B. Thus, independent control of fuel vapors between each of groups 250 and 252 is provided. When the system of FIG. 2D is operated in an AIR/LEAN mode, first combustion group 250 is operated at a lean air-fuel ratio (typically leaner than about 18:1), second combustion group 252 is operated without fuel injection, and fuel vapor purging can be enabled to group 250 via valve 168A (and disabled to group 212 via valve 168B). Alternatively, first combustion group 250 is operated without fuel injection, second combustion group 252 is operated at a lean air-fuel ratio, and fuel vapor purging can be enabled to group 252 via valve 168B (and disabled to group 250 via valve 168A). In this way, the system can perform the AIR/LEAN mode in different cylinder groups depending on operating conditions, or switch between the cylinder groups to provide even wear, etc. Note that the engine can also operate in any of the 5 various modes described below with regard to FIG. 3A1, for example.

Figure 2E:
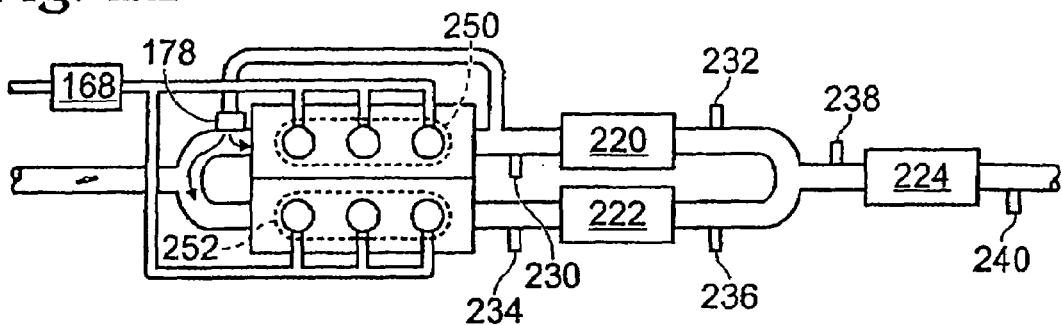

Referring now to FIG. 2E, a V-6 engine is shown similar to that of FIG. 2C, with the addition of an exhaust gas recirculation (EGR) system and valve 178. As illustrated in FIG. 2E, the EGR system takes exhaust gasses exhausted from cylinders in cylinder group 250 to be fed to the intake manifold (downstream of the throttle). The EGR gasses then pass to both cylinder groups 250 and 252 via the intake manifold. The remainder of the exhaust system is similar to that described above in FIGS. 2A and 2B. Note that, as above, the engine can also operate in any of the 5 various modes described below with regard to FIG. 3A1, for example.

Figure 2F:
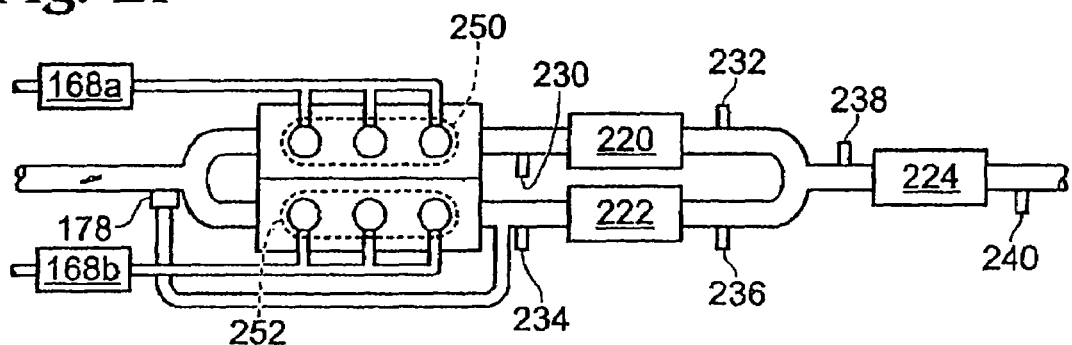

Referring now to FIG. 2F, a system similar to that in FIG. 2E is shown, however a dual fuel vapor purge system is shown with first and second purge valves 168A and 168B. Further, EGR gasses are taken from group 252, rather than 250. Again, the engine can also operate in any of the 5 various modes described below with regard to FIG. 3A1, for example.

Figure 2G:
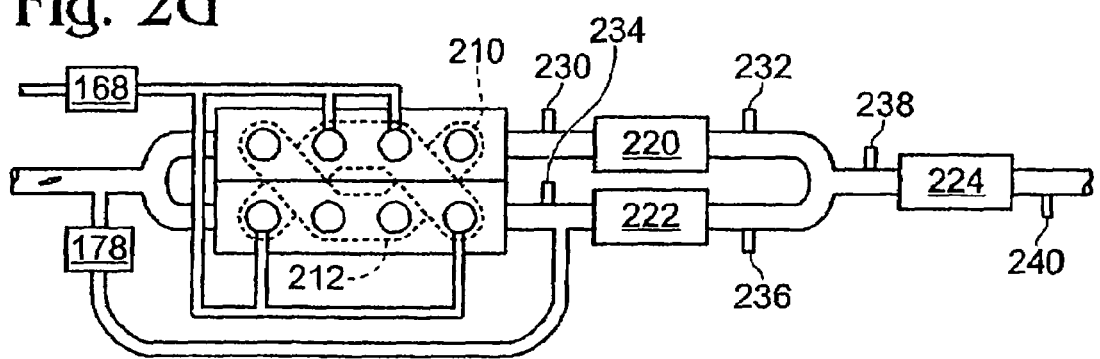

Referring now to FIG. 2G, a system similar to that in FIG. 2A is shown, however an exhaust gas recirculation system and valve 178 is shown for introducing exhaust gasses that are from some cylinders in group 210 and some cylinders in group 212 into the intake manifold downstream of the throttle valve. Again, the engine can also operate in any of the 5 various modes described below with regard to FIG. 3A1, for example.

Figure 2H:
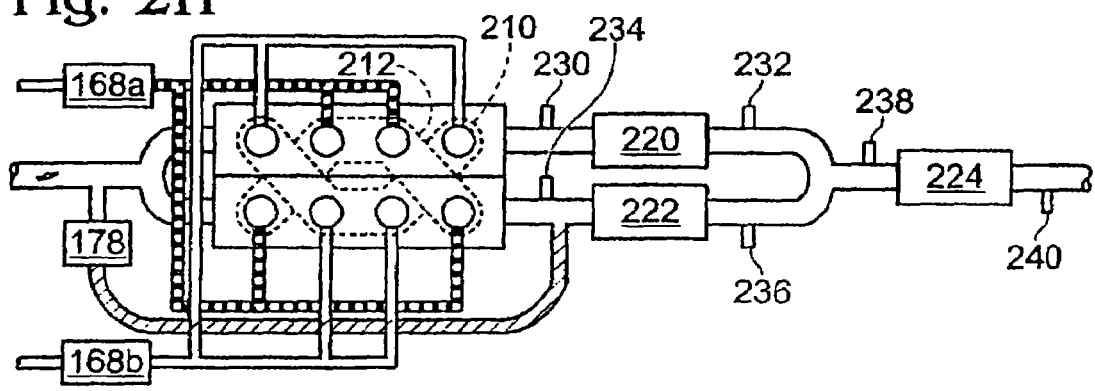

Referring now to FIG. 2H, a system similar to that in FIG. 2G is shown, however a dual fuel vapor purge system is shown with first and second purge valves 168A and 168B. Again, the engine can also operate in any of the 5 various modes described below with regard to FIG. 3A1, for example.

Figure 2I:
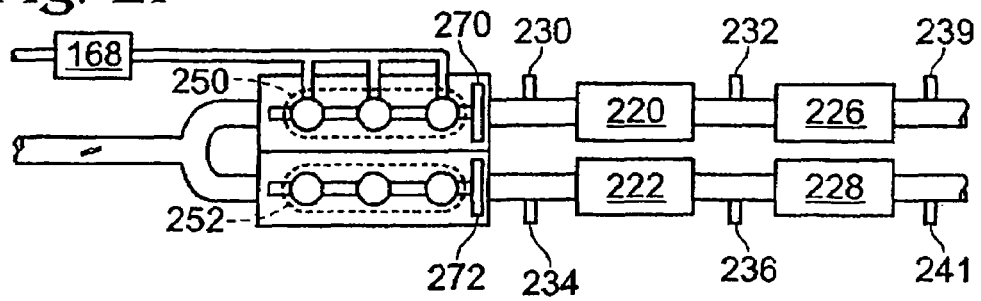

Referring now to FIG. 2I, a V-6 engine is shown with first cylinder group 250 on a first bank, and second cylinder group 252 on a second bank. Further, a first exhaust path is shown coupled to group 250 including an upstream emission control device 220 and a downstream emission control device 226. Further, an exhaust manifold sensor 230, an intermediate sensor 232 between devices 220 and 226, and a downstream sensor 239 are shown for measuring various exhaust gas air-fuel ratio values. In one example, devices 220 and 226 are three way catalysts having one or more bricks enclosed therein. Similarly, a second exhaust path is shown coupled to group 252 including an upstream emission control device 222 and a downstream emission control device 228. Further, an exhaust manifold sensor 234, an intermediate sensor 236 between devices 222 and 228, and a downstream sensor 241 are shown for measuring various exhaust gas air-fuel ratio values. In one example, devices 222 and 228 are three way catalysts having one or more bricks enclosed therein.

Continuing with FIG. 2I, both groups 250 and 252 have a variable valve actuator (270 and 272, respectively) coupled thereto to adjust operation of the cylinder intake and/or exhaust valves. In one example, these are variable cam timing actuators as described above in FIGS. 1A and 1B. However, alternative actuators can be used, such as variable valve lift, or switching cam systems. Further, individual actuators can be coupled to each cylinder, such as with electronic valve actuator systems.

Note that FIG. 2I, as well as the rest of the figures in FIG. 2 are schematic representations. For example, the purge vapors from valve 168 can be delivered via intake ports with inducted air as in FIG. 2J, rather than via individual paths to each cylinder in the group as in FIG. 2I. And as before, the engine can also operate in various engine modes, such as in FIG. 3A1, or as in the various routines described below herein.

Figure 2J:
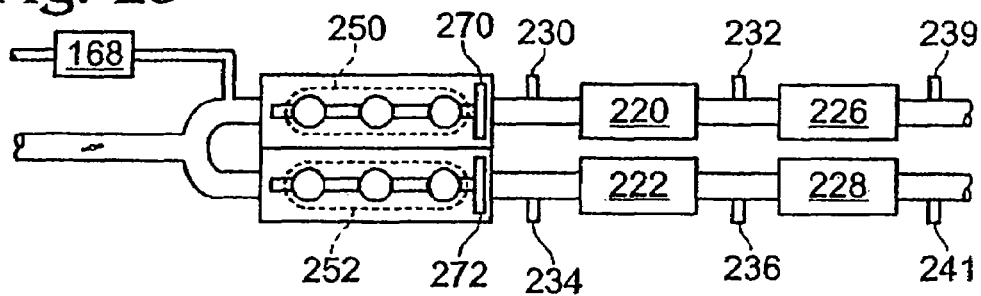

Referring now to FIG. 2J, a system similar to that of FIG. 2I is shown with an alternative fuel vapor purge delivery to the intake manifold, which delivery fuel vapors from valve 168. Note that such a system can be adapted for various systems described in FIG. 2 above and below, as mentioned with regard to FIG. 2I, although one approach may provide advantages over the other depending on the operating modes of interest.

Figure 2K:
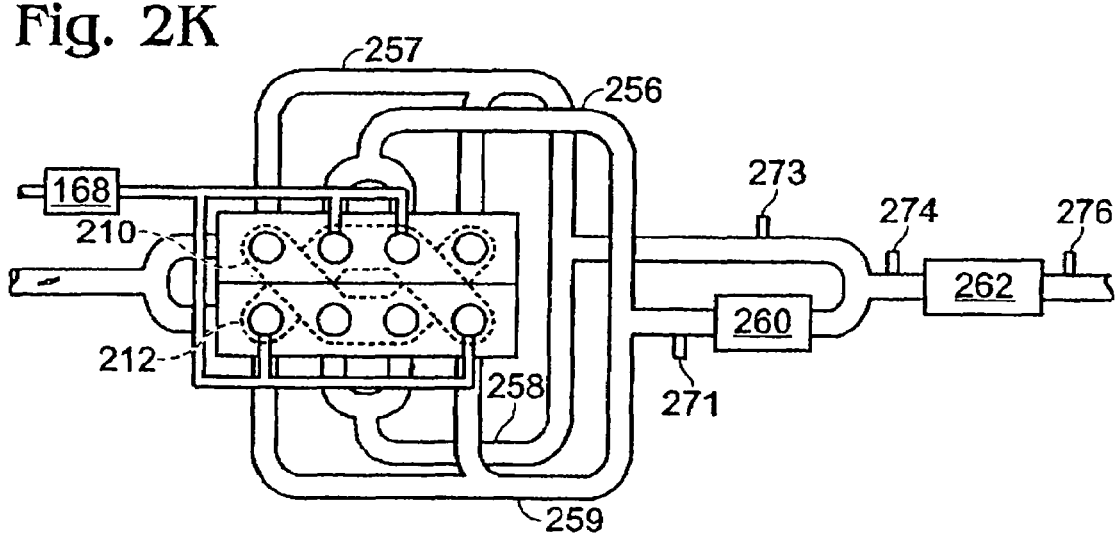

Referring now to FIG. 2K, a V-8 engine is shown with a first group of cylinders 210 spanning both cylinder banks, and a second group of cylinders 212 spanning both cylinder banks. Further, an exhaust system configuration is shown which brings exhaust gasses from the group 212 together before entering an emission control device 260. Likewise, the gasses exhausted from device 260 are mixed with untreated exhaust gasses from group 210 before entering emission control device 262. This is accomplished, in this example, via a cross-over type exhaust manifold. Specifically, exhaust manifold 256 is shown coupled to the inner two cylinders of the top bank of group 212; exhaust manifold 257 is shown coupled to the outer two cylinders of the top bank of group 210; exhaust manifold 258 is shown coupled to the inner two cylinders of the bottom bank of group 210; and exhaust manifold 259 is shown coupled to the outer two cylinders of the bottom bank of group 212. Then, manifolds 257 and 258 are fed together and then fed to mix with gasses exhausted from device 250 (before entering device 262), and manifolds 256 and 259 are fed together and fed to device 260. Exhaust gas air-fuel sensor 271 is located upstream of device 260 (after manifolds 256 and 259 join). Exhaust gas air-fuel sensor 273 is located upstream of device 262 before the gasses from the group 210 join 212. Exhaust gas air-fuel sensor 274 is located upstream of device 262 after the gasses from the group 210 join 212. Exhaust gas air-fuel sensor 276 is located downstream of device 276.

In one particular example, devices 260 and 262 are three way catalysts, and when the engine operates in a partial fuel cut operation, group 212 carries out combustion oscillating around stoichiometry (treated in device 260), while group 210 pumps are without injected fuel. In this case, device 262 is saturated with oxygen. Alternatively, when both cylinder groups are combusting, both devices 260 and 262 can operate to treat exhausted emissions with combustion about stoichiometry. In this way, partial cylinder cut operation can be performed in an odd fire V-8 engine with reduced noise and vibration.

Note that there can also be additional emission control devices (not shown), coupled exclusively to group 210 upstream of device 262.

Figure 2L:
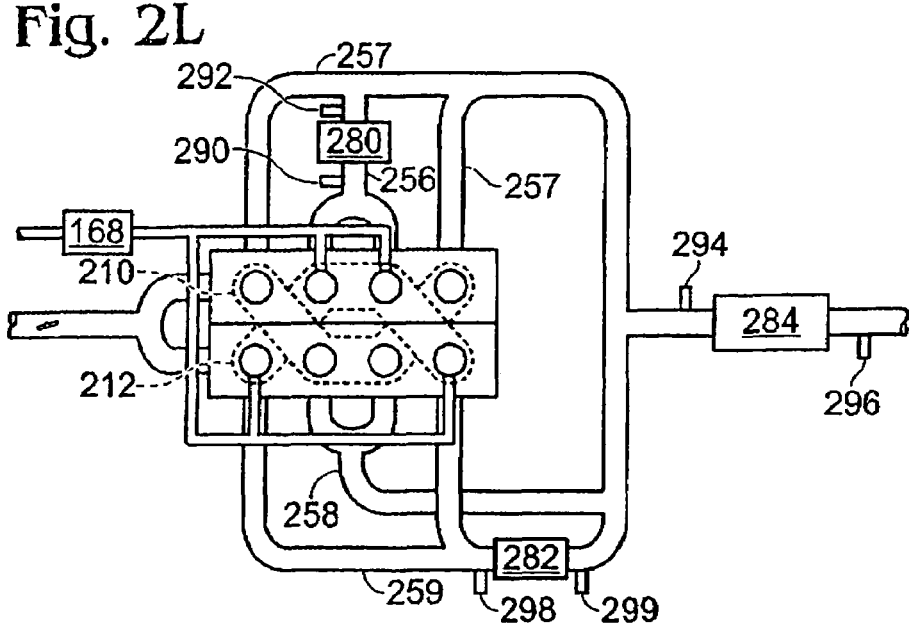

Referring now to FIG. 2L, another V-8 engine is shown with a first group of cylinders 210 spanning both cylinder banks, and a second group of cylinders 212 spanning both cylinder banks. However, in this example, a first emission control device 280 is coupled to two cylinders in the top bank (from group 212) and a second emission control device 282 is coupled to two cylinders of the bottom bank (from group 212). Downstream of device 280, manifold 257 joins exhaust gasses from the remaining two cylinders in the top bank (from group 210). Likewise, downstream of device 282, manifold 258 joins exhaust gasses from the remaining two cylinders in the bottom bank (from group 210). Then, these two gas streams are combined before entering downstream device 284.

In one particular example, devices 280, 282, and 284 are three way catalysts, and when the engine operates in a partial fuel cut operation, group 212 carries out combustion oscillating around stoichiometry (treated in devices 280 and 282), while group 210 pumps are without injected fuel. In this case, device 284 is saturated with oxygen. Alternatively, when both cylinder groups are combusting, devices 280, 282, and 284 can operate to treat exhausted emissions with combustion about stoichiometry. In this way, partial cylinder cut operation can be performed in an odd fire V-8 engine with reduced noise and vibration.

Note that both FIGS. 2K and 2L shows a fuel vapor purge system and valve 168 for delivering fuel vapors to group 210.

Figure 2M:
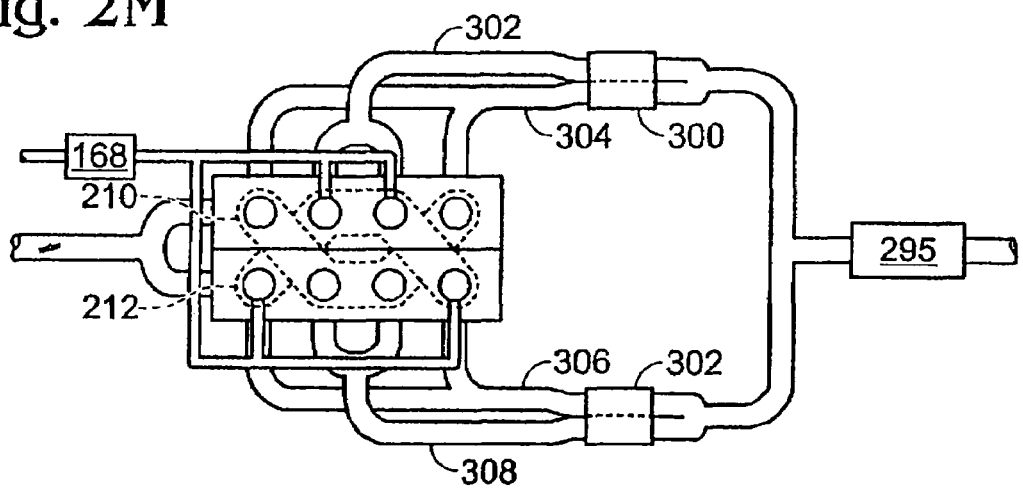

Referring now to FIG. 2M, two banks of a V8 engine are shown. The odd fire V8 engine is operated by, in each bank, running two cylinders about stoichiometry and two cylinders with air. The stoichiometric and air exhausts are then directed through a bifurcated exhaust pipe to a bifurcated metal substrate catalyst, described in more detail below with regard to FIGS. 14 and 15. The stoichiometric side of the catalyst reduces the emissions without the interference from the air side of the exhaust. The heat from the stoichiometric side of the exhaust keeps the whole catalyst above a light-off temperature during operating conditions. When the engine is then operated in 8-cylinder mode, the air side of the catalyst is in light-off condition and can reduce the emissions. A rich regeneration of the air side catalyst can also be performed when changing from 4 to 8 cylinder mode whereby the 2 cylinders that were running air would be momentarily operated rich to reduce the oxygen storage material in the catalyst prior to returning to stoichiometric operation, as discussed in more detail below. This regeneration can achieve 2 purposes: 1) the catalyst will function in 3-way operation when the cylinders are brought back to stoichiometric operation and 2) the regeneration of the oxygen storage material will result in the combustion of the excess CO/H2 in the rich exhaust and will raise the temperature of the catalyst if it has cooled during period when only air was pumped through the deactivated cylinders Continuing with FIG. 2M, exhaust manifold 302 is shown coupled to the inner two cylinders of the top bank (from group 212). Exhaust manifold 304 is shown coupled to the outer two cylinders of the top bank (from group 210). Exhaust manifold 308 is shown coupled to the inner two cylinders of the bottom bank (from group 210). Exhaust manifold 306 is shown coupled to the outer two cylinders of the bottom bank (from group 212). Exhaust manifolds 302 and 304 are shown leading to an inlet pipe (305) of device 300. Likewise, exhaust manifolds 306 and 308 are shown leading to an inlet pipe (307) of device 302, which, as indicated above, are described in more detail below. The exhaust gasses from devices 300 and 302 are mixed individually and then combined before entering device 295. Further, a fuel vapor purge system and control valve 168 are shown delivering fuel vapors to group 212.

Again, as discussed above, an I-4 engine could also be used, where the engine has a similar exhaust and inlet configuration to one bank of the V-8 engine configurations shown above and below in the various Figures.

Figure 2N:
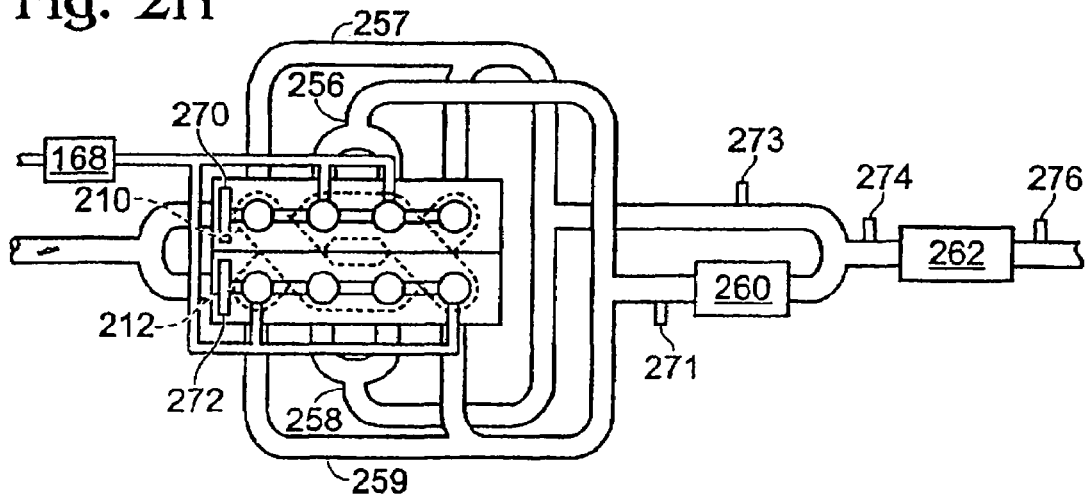
Figure 2O:
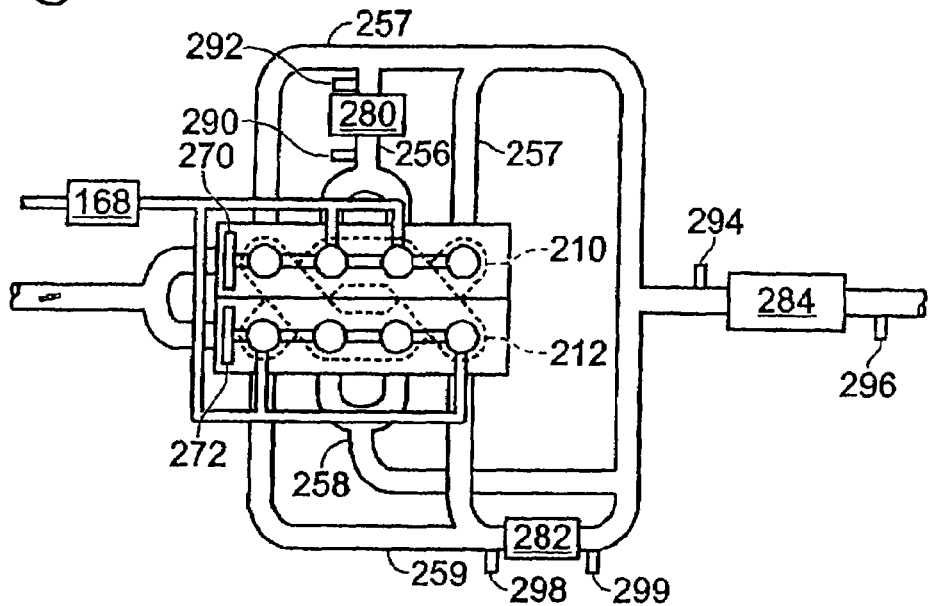
Figure 2P:
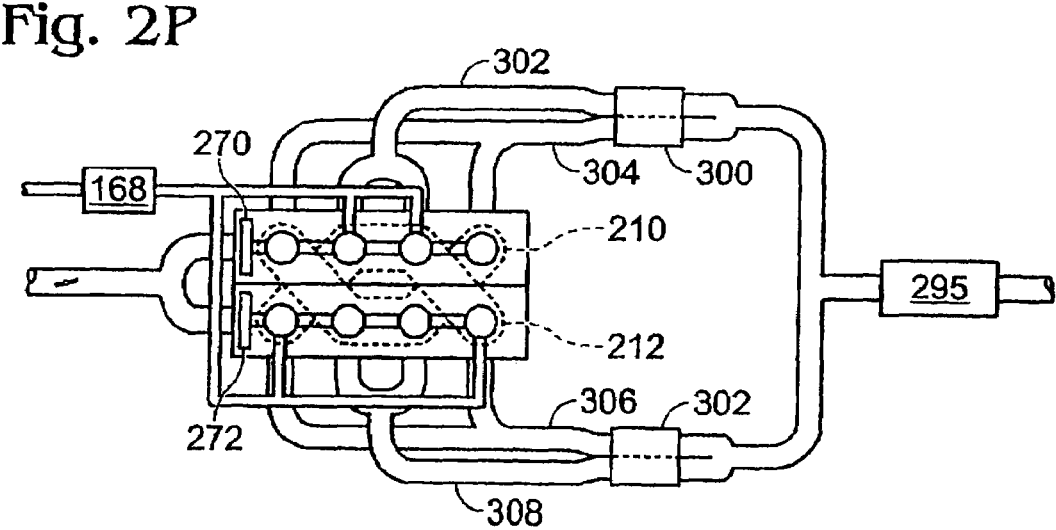

FIGS. 2N, 2O, and 2P are similar to FIGS. 2K, 2L, and 2M, respectively, except for the addition of a first and second variable valve actuation units, in this particular example, variable cam timing actuators 270 and 272.

Figure 2Q:
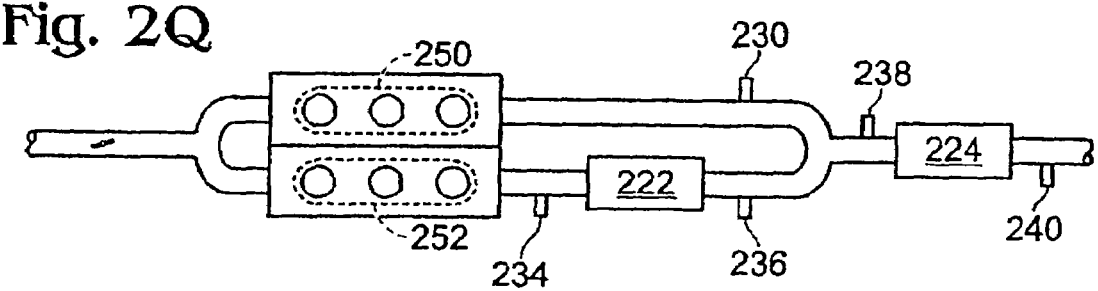

Referring now to FIG. 2Q, an example V-6 engine is shown with emission control devices 222 and 224. In this example, there is no emission control device coupled exclusively to group 250. A third emission control device (not shown) can be added downstream. Also, FIG. 2Q shows an example V-6 engine, however, others can be used in this configuration, such as a V-10, V-12, etc.

Figure 2R:
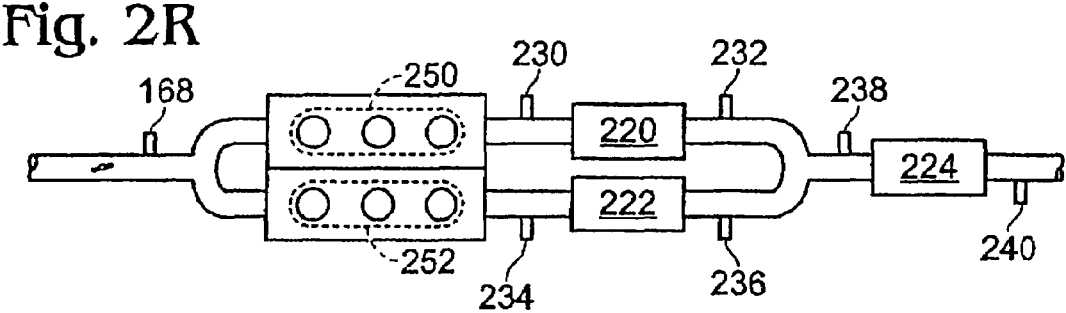

Referring now to FIG. 2R, an example system is shown where fuel vapors are passed to all of the cylinders, and in the case of cylinder fuel cut operation, fuel vapor purging operating is suspended.

Figure 2S:
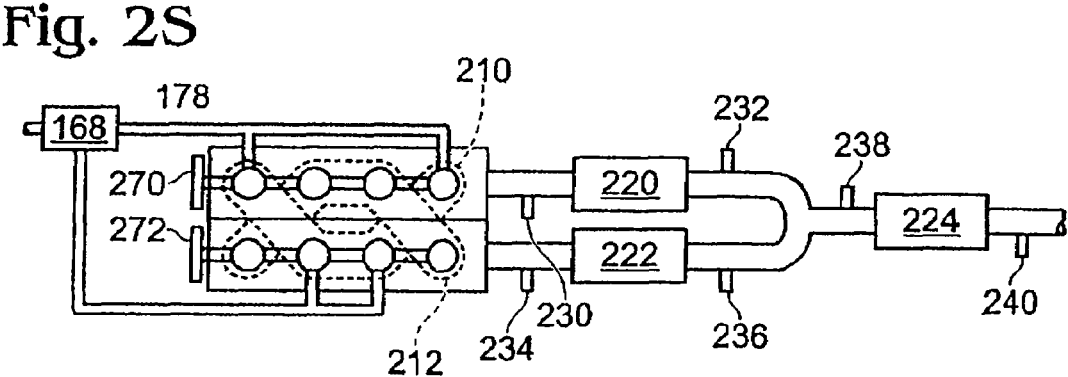
Figure 2T:
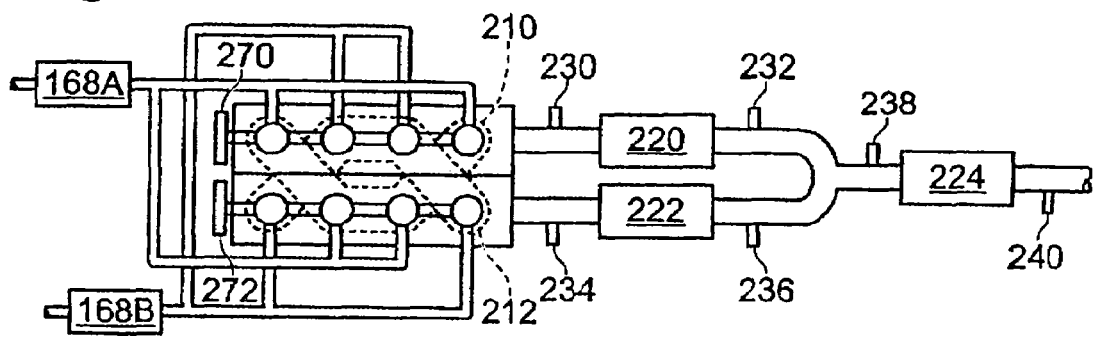

Referring now to FIGS. 2S and 2T, still another example system is shown for an engine with variable valve operation (such as variable cam timing from devices 270 and 272), along with a fuel vapor purging system having a single valve 168 in 2S, and dual purge valves 168A,B in 2T.

There are various fuel vapor modes for FIGS. 2A-2T, some of which are listed below:

operate the first group of cylinders lean with fuel vapor purge (and injected fuel), and the other group inducting gasses without injected fuel operate the first group of cylinders stoichiometric with fuel vapor purge (and injected fuel), and the other group inducting gasses without injected fuel operate the first group of cylinders rich with fuel vapor purge (and injected fuel), and the other group inducting gasses without injected fuel operate the first group of cylinders lean with fuel vapor purge (and injected fuel), and the other group stoichiometric without fuel vapors operate the first group of cylinders stoichiometric with fuel vapor purge (and injected fuel), and the other group stoichiometric without fuel vapors operate the first group of cylinders rich with fuel vapor purge (and injected fuel), and the other group stoichiometric without fuel vapors operate the first group of cylinders lean with fuel vapor purge (and injected fuel), and the other group lean without fuel vapors operate the first group of cylinders stoichiometric with fuel vapor purge (and injected fuel), and the other group lean without fuel vapors operate the first group of cylinders rich with fuel vapor purge (and injected fuel), and the other group lean without fuel vapors operate the first group of cylinders lean with fuel vapor purge (and injected fuel), and the other group rich without fuel vapors operate the first group of cylinders stoichiometric with fuel vapor purge (and injected fuel), and the other group rich without fuel vapors operate the first group of cylinders rich with fuel vapor purge (and injected fuel), and the other group rich without fuel vapors operate the first group of cylinders lean with fuel vapor purge (and injected fuel), and the other group rich with fuel vapors (and injected fuel)

operate the first group of cylinders stoichiometric with fuel vapor purge (and injected fuel), and the other group rich with fuel vapors (and injected fuel)

operate the first group of cylinders rich with fuel vapor purge (and injected fuel), and the other group rich with fuel vapors (and injected fuel)

operate the first group of cylinders lean with fuel vapor purge (and injected fuel), and the other group lean with fuel vapors (and injected fuel)

operate the first group of cylinders stoichiometric with fuel vapor purge (and injected fuel), and the other group lean with fuel vapors (and injected fuel)

operate the first group of cylinders rich with fuel vapor purge (and injected fuel), and the other group lean with fuel vapors (and injected fuel)

operate the first group of cylinders lean with fuel vapor purge (and injected fuel), and the other group stoichiometric with fuel vapors (and injected fuel)

operate the first group of cylinders stoichiometric with fuel vapor purge (and injected fuel), and the other group stoichiometric with fuel vapors (and injected fuel)

operate the first group of cylinders rich with fuel vapor purge (and injected fuel), and the other group stoichiometric with fuel vapors (and injected fuel)

Each of these modes can include further variation, such as different VCT timing between cylinder banks, etc. Also note that operation at a cylinder cut condition provides a practically infinite air-fuel ratio, since substantially no fuel is being injected by the fuel injectors for that cylinder (although there may be some fuel present due to fuel around the intake valves and in the intake port that will eventually decay away). As such, the effective air-fuel ratio is substantially greater than about 100:1, for example. Although, depending on the engine configuration, it could vary between 60:1 to practically an infinite value.

Regarding the various systems shown in FIGS. 2A-R, different system configurations can present their own challenges that are addressed herein. For example, V-8 engines, such as in FIG. 2A, for example, can have uneven firing order, so that if it is desired to disable a group of 4 cylinders, then two cylinders on each bank are disabled to provide acceptable vibration. However, this presents challenges since, as shown in FIG. 2A, some exhaust system configurations treat emissions from the entire bank together. Further, as shown in FIGS. 2S-2T, a single valve actuator can be used to adjust all of the valves of cylinders in a bank, even though some cylinders in the bank are disabled, while others are operating. Unlike such V-8 engines, some V-6 engines can be operated with a cylinder bank disabled, thus allowing an entire cylinder bank to be a group of cylinders that are operated without fuel injection. Each of these different types of systems therefore has its own potential issues and challenges, as well as advantages, as discussed and addressed by the routines described in more detail below.

Note a bifurcated induction system (along firing order groups) can also be used for the fresh air. Such a system would be similar to the system of FIG. 2T, except that the valves 168A and 168B would be replaced by electronically controlled throttles. In this way, fuel vapor purge could be fed to these two bifurcated induction systems, along with airflow, so that separate control of fuel vapor purge and airflow could be achieved between groups 210 and 212. However, as discussed above with regard to FIGS. 2I and 2J, for example, the VCT actuators can be used to obtain differing airflows (or air charges) between the cylinders of groups 250 and 252, without requiring a split induction system.

Several control strategies may be used to take advantage of the ability to provide differing air amounts to differing cylinder groups, as discussed in more detail below. As one example, separate control of airflow to different cylinder groups (e.g., via VCT actuators 270 and 272 in FIGS. 2I and 2J), can be used in split ignition operation to allow more (or less) air flow into a group of cylinders. Also, under some conditions there may be no one air amount that satisfies requirements of combustion stability, heat generation, and net power/torque. For example, the power producing cylinder group may have a minimum spark advance for stability, or the heat producing cylinder group may have a maximum heat flux due to material constraints. Bank-VCT and/or bifurcated intake could be used to achieve these requirements with different air amounts selected for different cylinder groups.

Another control strategy example utilizing a bifurcating inlet (or using VCT in a V6 or V10) would allow lower pumping losses in cylinder cut-out mode by changing the air flow to that group, where VCT is not solely associated with a firing group.

Further details of control routines are included below which can be used with various engine configurations, such as those described in FIGS. 2A-2T. As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated steps or functions may be repeatedly performed depending on the particular strategy being used. Further, these figures graphically represent code to be programmed into the computer readable storage medium in controller 12.

Referring now to FIG. 3A1, a graph is shown illustrating engine output versus engine speed. In this particular description, engine output is indicated by engine torque, but various other parameters could be used, such as, for example: wheel torque, engine power, engine load, or others. The graph shows the maximum available torque that can be produced in each of five operating modes. Note that a percentage of available torque, or other suitable parameters, could be used in place of maximum available torque. Further note that the horizontal line does not necessarily correspond to zero engine brake torque. The five operating modes in this embodiment include:

Operating all cylinders with air pumping through and substantially no injected fuel (note: the throttle can be substantially open, or closed, during this mode), illustrated as line 3A1-8 in the example presented in FIG. 3A1;

Operating some cylinders lean of stoichiometry and remaining cylinders with air pumping through and substantially no injected fuel (note: the throttle can be substantially open during this mode), illustrated as line 33ba in the example presented in FIG. 3A1;

Operating some cylinders at stoichiometry, and the remaining cylinders pumping air with substantially no injected fuel (note: the throttle can be substantially open during this mode), shown as line 3A1-4 in the example presented in FIG. 3A1;

Operating all cylinders lean of stoichiometry (note: the throttle can be substantially open during this mode, shown as line 3A1-2 in the example presented in FIG. 3A1;

Operating all cylinders substantially at stoichiometry (or slightly rich of stoichiometry) for maximum available engine torque, shown as line 3A1-0 in the example presented in FIG. 3A1.

Described above is one exemplary embodiment where an 8-cylinder engine is used and the cylinder groups are broken into two equal groups. However, various other configurations can be used, as discussed above and below. In particular, engines of various cylinder numbers can be used, and the cylinder groups can be broken down into unequal groups as well as further broken down to allow for additional operating modes. For the example presented in FIG. 3A1 in which a V-8 engine is used, lines 3A1-16 shows operation with 4 cylinders operating with air and substantially no fuel, line 3A1-14 shows operation with four cylinders operating at stoichiometry and four cylinders operating with air, line 3A1-12 shows 8 cylinders operating lean, line 3A1-10 shows 8 cylinders operating at stoichiometry, and line 3A1-18 shows all cylinders operating without injected fuel.

The above described graph illustrates the range of available torques in each of the described modes. In particular, for any of the described modes, the available engine output torque can be any torque less than the maximum amount illustrated by the graph. Also note that in any mode where the overall mixture air-fuel ratio is lean of stoichiometry, the engine can periodically switch to operating all of the cylinders stoichiometric or rich. This is done to reduce the stored oxidants (e.g., NOx) in the emission control device(s). For example, this transition can be triggered based on the amount of stored NOx in the emission control device(s), or the amount of NOx exiting the emission control device(s), or the amount of NOx in the tailpipe per distance traveled (mile) of the vehicle.

To illustrate operation among these various modes, several examples of operation are described. The following are simply exemplary descriptions of many that can be made, and are not the only modes of operation. As a first example, consider operation of the engine along trajectory A. In this case, the engine initially is operating with all cylinders in the fuel-cut mode. Then, in response to operating conditions, it is desired to change engine operation along trajectory A. In this case, it is desired to change engine operation to operating with four cylinders operating lean of stoichiometry, and four cylinders pumping air with substantially no injected fuel. In this case, additional fuel is added to the combusting cylinders to commence combustion, and correspondingly increase engine torque. Likewise, it is possible to follow the reverse trajectory in response to a decrease in engine output.

As a second example, consider the trajectory labeled B. In this example, the engine is operating with all cylinders combusting at substantially stoichiometry. In response to a decrease in desired engine torque, 8 cylinders are operated in a fuel cut condition to provide a negative engine output torque.

As a third example, consider the trajectory labeled C. In this example, the engine is operating with all cylinders combusting at a lean air-fuel mixture. In response to a decrease in desired engine torque, 8 cylinders are operated in a fuel cut condition to provide a negative engine output torque. Following this, it is desired to change engine operation to operating with four cylinders operating lean of stoichiometry, and four cylinders pumping air with substantially no injected fuel. Finally, the engine is again transitioned to operating with all cylinders combusting at a lean air-fuel mixture.

As a fourth example, consider the trajectory labeled D. In this example, the engine is operating with all cylinders combusting at a lean air-fuel mixture. In response to a decrease in desired engine torque, 8 cylinders are operated in a fuel cut condition to provide a negative engine output torque. Likewise, it is possible to follow the reverse trajectory in response to an increase in engine output Continuing with FIG. 3A1, and lines 3A1-10 to 3A1-18 in particular, an illustration of the engine output, or torque, operation for each of the exemplary modes is described. For example, at engine speed N1, line 3A1-10 shows the available engine output or torque output that is available when operating in the 8-cylinder stoichiometric mode. As another example, line 3A1-12 indicates the available engine output or torque output available when operating in the 8-cylinder lean mode at engine speed N2. When operating in the 4-cylinder stoichiometric and 4-cylinder air mode, line 3A1-14 shows the available engine output or torque output available when operating at engine speed N3. When operating in the 4-cylinder lean, 4-cylinder air mode, line 3A1-16 indicates the available engine or torque output when operating at engine speed N4. Finally, when operating in the 8-cylinder air mode, line 3A1-18 indicates the available engine or torque output when operating at engine speed N5.

Referring now to FIG. 3A2, another graph is shown illustrating engine output versus engine speed. The alternative graph shows the maximum available torque that can be produced in each of 3 operating modes. As with regard to FIG. 3A1, note that the horizontal line does not necessarily correspond to zero engine brake torque. The three operating modes in this embodiment include:

Operating all cylinders with air pumping through and substantially no injected fuel (note: the throttle can be substantially open, or closed, during this mode), illustrated as line 3A2-6 in the example presented in FIG. 3A2;

Operating some cylinders at stoichiometry, and the remaining cylinders pumping air with substantially no injected fuel (note: the throttle can be substantially open during this mode), shown as line 3A2-4 in the example presented in FIG. 3A2;

Operating all cylinders substantially at stoichiometry (or slightly rich of stoichiometry) for maximum available engine torque, shown as line 3A2-2 in the example presented in FIG. 3A2.

Referring now to FIG. 3B, a routine for controlling the fuel vehicle purge is described. In general terms, the routine adjusts valve 168 to control the fuel vapor purging supplied to the cylinder group 210 to be combusted therein. As illustrated in FIG. 2A, the fuel vapor can be purged to cylinders in group 210 while these cylinders are carrying out stoichiometric, rich, or lean combustion. Furthermore, the cylinders in group 212 can be carrying out combustion at stoichiometric, rich, or lean, or operating with air and substantially no injector fuel. In this way, it is possible to purge fuel vapor while operating in the air-lean mode. Further, it is possible to purge fuel vapors while operating in a stoichiometric-air mode.

Referring now specifically to FIG. 3B, in step 310, the routine determines whether fuel vapor purging is requested. This determination can be based on various parameters, such as whether the engine is in a warmed up state, whether the sensors and actuators are operating without degradation, and/or whether the cylinders in group 210 are operating under feedback air-fuel ratio control. When the answer to step 310 is yes, the routine continues to step 312 to activate valve 168. Then, in step 314, the routine estimates the fuel vapor purge amount in the fuel vapors passing through valve 168. Note that there are various ways to estimate fuel vapor purging based on the valve position, engine operating conditions, exhaust gas air-fuel ratio, fuel injection amount and various other parameters. One example approach is described below herein with regard to FIG. 4. Next, in step 316, the routine adjusts the opening of valve 168 based on the estimated purge amount to provide a desired purge amount. Again, there are various approaches that can be used to produce this control action such as, for example: feedback control, feed-forward control, or combinations thereof. Also, the desired purge amount can be based on various parameters, such as engine speed and load, and the state of the charcoal canister in the fuel vapor purging system. Further, the desired purge amount can be based on the amount of purge time completed.

From step 316, the routine continues to step 318 to determine whether the estimated purge amount is less than a minimum purge value (min_prg). Another indication of whether fuel vapor purging is substantially completed is whether the purge valve 168 has been fully opened for a predetermined amount of operating duration. When the answer to step 318 is no, the routine continues to end. Alternatively, when the answer to step 318 is yes, the routine continues to step 320 to disable fuel vapor purging and close valve 168. Also, when the answer to step 310 is no, the routine also continues to step 322 to disable the fuel vapor purging.

In this way, it is possible to control the fuel vapor purging to a subset of the engine cylinders thereby allowing different operating modes between the cylinder groups.

Figure 3C:
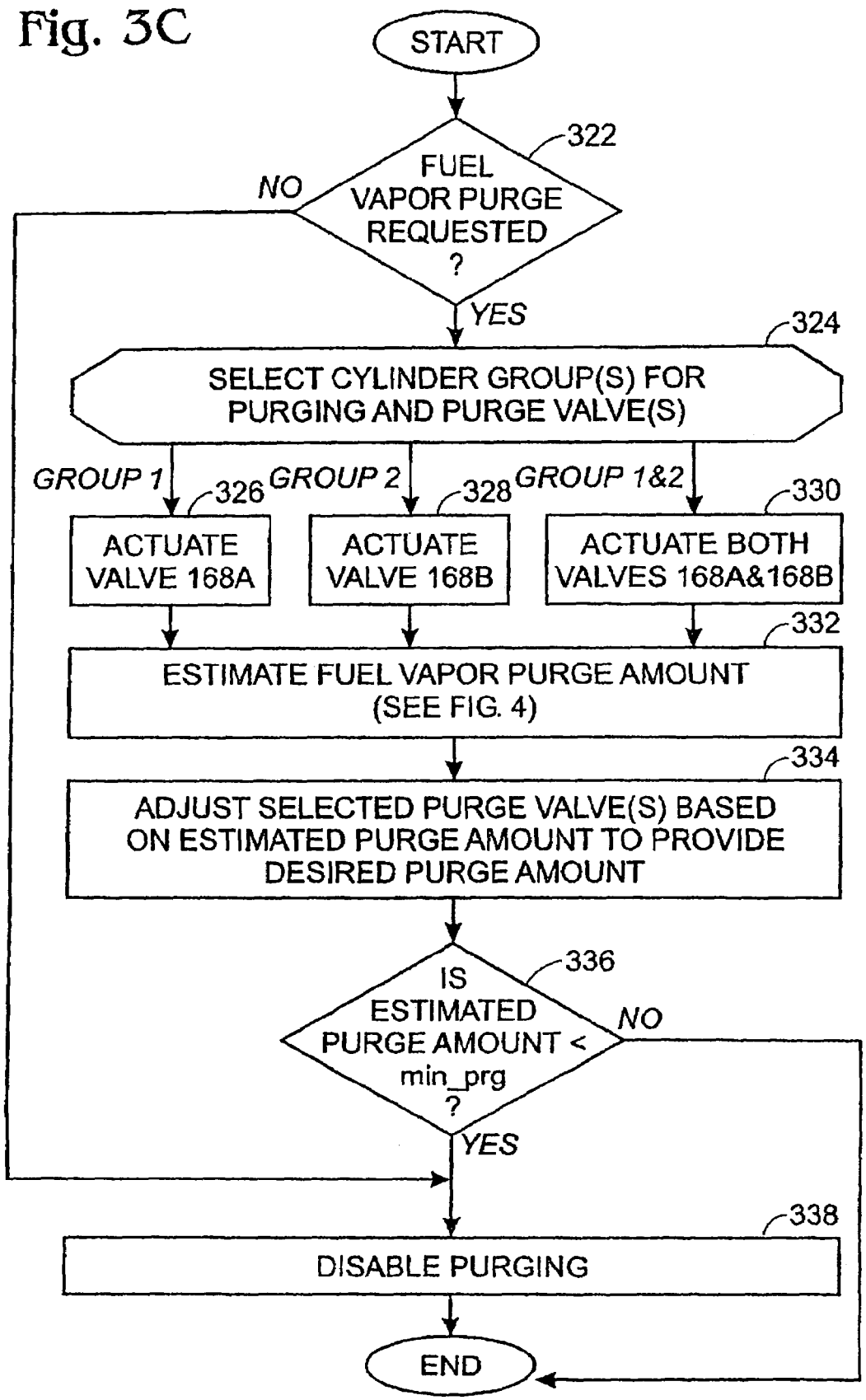

Referring now to FIG. 3C, an example routine for controlling the system as shown in FIG. 2B is described. In general, the routine controls the fuel vapor purge valves 168a and 168b to selectively control fuel vapor purge in cylinder groups 210, or 212, or both. In this way, different sets of cylinders can be allowed to operate in different operating modes with fuel vapor purging, thereby providing for more equalized cylinder operation between the groups.

Referring now specifically to FIG. 3C, in step 322, the routine determines whether fuel vapor purging is requested as described above with regard to step 310 of FIG. 3B. When the answer to step 322 is yes, the routine continues to step 324 to select the cylinder group, or groups, for purging along with selecting the purge valve or valves to actuate. The selection of cylinder groups to provide fuel vapor purging is a function of several engine and/or vehicle operating conditions. For example, based on the quantity of fuel vapor purge that needs to be processed through the cylinders, the routine can select either one cylinder group or both cylinder groups. In other words, when greater fuel vapor purging is required, both cylinder groups can be selected. Alternatively, when lower amounts of fuel vapor purging are required, the routine can select one of groups 210 and 212. When it is decided to select only one of the two cylinder groups due to, for example, low fuel vapor purging requirements, the routine selects from the two groups based on various conditions. For example, the decision of which group to select can be based on providing equal fuel vapor purging operation for the two groups. Alternatively, the cylinders operating at the more lean air-fuel ratio can be selected to perform the fuel vapor purging to provide improved combustion stability for the lean operation. Still other selection criteria could be utilized to select the number and which groups to provide fuel vapor purging. Another example is that the when only a single cylinder group is selected, the routine alternates between which group is selected to provide more even wear between the groups. For example, the selection could attempt to provide a consistent number of engine cycles between the groups. Alternatively, the selection could attempt to provide a consistent amount of operating time between the groups.

When the first group is selected, the routine continues to step 326 to actuate valve 168a. Alternatively, when the second group is selected, the routine continues to step to actuate valve 168b in step 328. Finally, when both the first and second groups are selected, the routine continues to step 330 to actuate both valves 168a and 168b.

From either of steps 326, 328, or 330, the routine continues to step 332 to estimate the fuel vapor purging amount. As described above, there are various approaches to estimate fuel vapor purge amount, such as described below herein with regard to FIG. 4. Next, in step 334, the routine continues to adjust the selected purge valve (or valves) based on the estimated purge amount to provide the desired purge amount. As described above, there are various approaches to providing feedback and/or feedforward control to provide the desired purge amount. Further, the desired purge amount can be selected based on various operating conditions, such as, for example: engine speed and engine load.

Continuing with FIG. 3C, in step 336, the routine determines whether the estimated purge amount is less than the minimum purge amount (min_prg). As discussed above herein with regard to step 318 of FIG. 3B. As discussed above, when the answer to step 336 is yes, the routine ends. Alternatively, when the answer to step 336 is no, the routine also continues to step 338 to disable fuel vapor purging. When the answer to step 336 is no, the routine continues to the end.

In this way, it is possible to provide both cylinder groups with the ability to operate in the air/lean, or air/stoichiometric mode and combust fuel vapors, or the other group operates with air and substantially no injected fuel.

Note also that the routines of FIGS. 3A and 3B could be modified to operate with the configurations of FIGS. 2C-2T.

Referring now to FIG. 4, a routine for estimating fuel vapor purge amounts is described. Note that this example shows calculations for use on a V8 type engine with four cylinders per bank and with two cylinders purging and two cylinders without purge on a bank as illustrated in FIG. 2A, for example. However, the general approach can be expanded to other system configurations as is illustrated in detail below.

The following equations describe this example configuration.

The measured air-fuel ratio in the exhaust manifold ($\lambda_{meas}$) can be represented as:

$$\lambda_{meas} = (0.5 dm_{aprg}/dt + 0.5 dm_{air}/dt)/(0.5 dm_{fprg}/dt + dm_{finj1}/dt + dm_{finj2}/dt + dm_{finj3}/dt + dm_{finj4}/dt)$$

where:

$dm_{aprg}/dt$ = is the mass air flow rate in the total fuel vapor purge flow;

$dm_{air}/dt$ = is the mass air flow rate measured by the mass air flow sensor flowing through the throttle body;

$dm_{fprg}/dt$ = is the fuel flow rate in the total fuel vapor purge flow;

$dm_{finj1}/dt$ = is the fuel injection in the first cylinder of the bank coupled to the air-fuel sensor measuring $\lambda_{meas}$;

$dm_{finj2}/dt$ = is the fuel injection in the second cylinder of the bank coupled to the air-fuel sensor measuring $\lambda_{meas}$;

$dm_{finj3}/dt$ = is the fuel injection in the third cylinder of the bank coupled to the air-fuel sensor measuring $\lambda_{meas}$;

$dm_{finj4}/dt$ = is the fuel injection in the fourth cylinder of the bank coupled to the air-fuel sensor measuring $\lambda_{meas}$;

When operating in with two cylinders inducting air with substantially no injected fuel, and fuel vapors delivered only to two cylinders carrying out combustion in that bank, this reduces to:

$$\lambda_{meas} = (0.5 dm_{aprg}/dt + 0.5 dm_{air}/dt)/(0.5 dm_{fprg}/dt + dm_{finj2}/dt + dm_{finj3}/dt)$$

Then, using an estimate of $dm_{aprg}/dt$ based on manifold pressure and purge valve position, the commanded values for $dm_{finj2}/dt$ and $dm_{finj3}/dt$, the measured air-fuel ratio from the sensor for $\lambda_{meas}$, and the measure airflow from the mass air flow sensor for $dm_{air}/dt$, an estimate of $dm_{fprg}/dt$ can be obtained. As such, the concentration of fuel vapors in the purge flow can then be found as the ratio of $dm_{fprg}/dt$ to $dm_{aprg}/dt$. Also, as discussed in more detail below, the fuel injection is adjusted to vary $dm_{finj2}/dt$ and $dm_{finj3}/dt$ to provide a desired air-fuel ratio of the exhaust gas mixture as measured by $\lambda_{meas}$. Finally, in the case where cylinders 1 and 4 are combusting injected fuel, the commanded injection amounts can be used to determine the amount of fuel injected so that the first equation can be used to estimate fuel vapors.

In this way, it is possible to estimate the fuel vapor purge content from a sensor seeing combustion from cylinders with and without fuel vapor purging.

Referring now specifically to FIG. 4, first in step 410, the routine calculates a fresh air amount to the cylinders coupled to the measurement sensor from the mass air flow sensor and fuel vapor purging valve opening degree. Next, in step 412, the routine calculates the fuel flow from the fuel injectors. Then, in step 414, the routine calculates concentration of fuel vapors from the air and fuel flows.

Note that if there are two fuel vapor purge valves, each providing vapors to separate cylinder banks and sensor sets, then the above calculations can be repeated and the two averaged to provide an average amount of vapor concentration from the fuel vapor purging system.

Referring now to FIG. 5, a routine is described for controlling a mixture air-fuel ratio in an engine exhaust during fuel vapor purging. Specifically, the example routine of FIG. 5 can be used when a sensor measures exhaust gases that are mixed from cylinders with and without fuel vapor purging.

First, in step 510, the routine determines a desired air-fuel ratio ($\lambda_{des}$) for the cylinders. Then, in step 512, the routine calculates an open loop fuel injection amount based on the estimated purge flow and estimated purge concentration to provide an air-fuel mixture in the cylinders with fuel vapor purging at the desired value. Then, in step 514, the routine adjusts fuel injection to the cylinders receiving fuel vapor purging to provide the desired mixture air-fuel ratio that is measured by the exhaust air-fuel ratio sensor. In this way, the adjustment of the fuel injection based on the sensor feedback can not only be used to maintain the mixture air-fuel ratio at a desired value, but also as an estimate of fuel vapor purging in the cylinders receiving fuel vapors. Further, the cylinders without fuel vapors can be operated either with air and substantially no injected fuel, or at a desired air-fuel ratio independent of the fuel vapors provided to the other cylinders.

As described above herein, there are various operating modes that the cylinders of engine 10 can experience. In one example, the engine can be operated with some cylinders combusting stoichiometric or lean gases, with others operating to pump air and substantially no injected fuel. Another operating mode is for all cylinders to be combusting stoichiometric or lean gases. As such, the engine can transition between these operating modes based on the current and other engine operating conditions. As described below, under some conditions when transitioning from less than all the cylinders combusting to all the cylinders combusting, various procedures can be used to provide a smooth transition with improved engine operation and using as little fuel as possible.

Figure 6A:
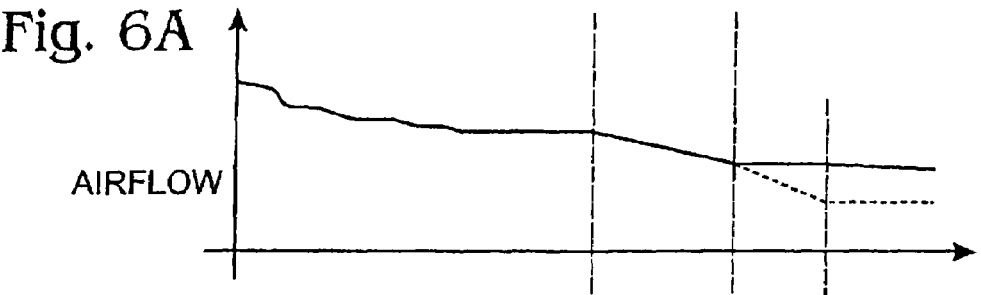
Figure 6B:
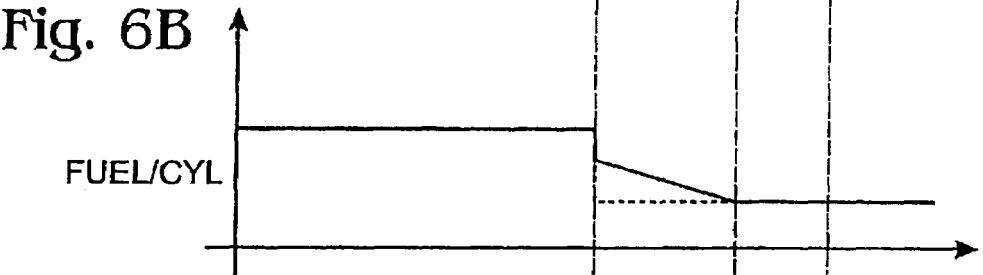
Figure 6C:
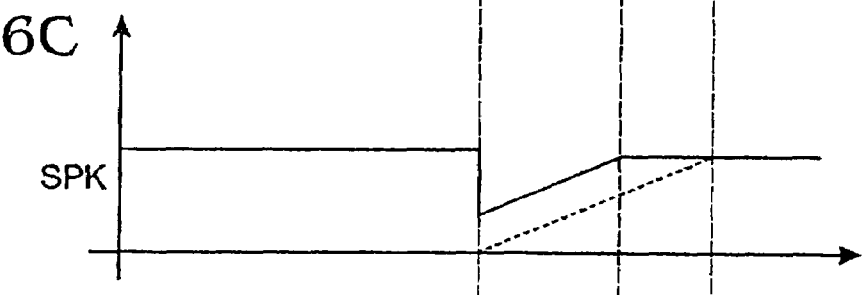
Figure 6D:
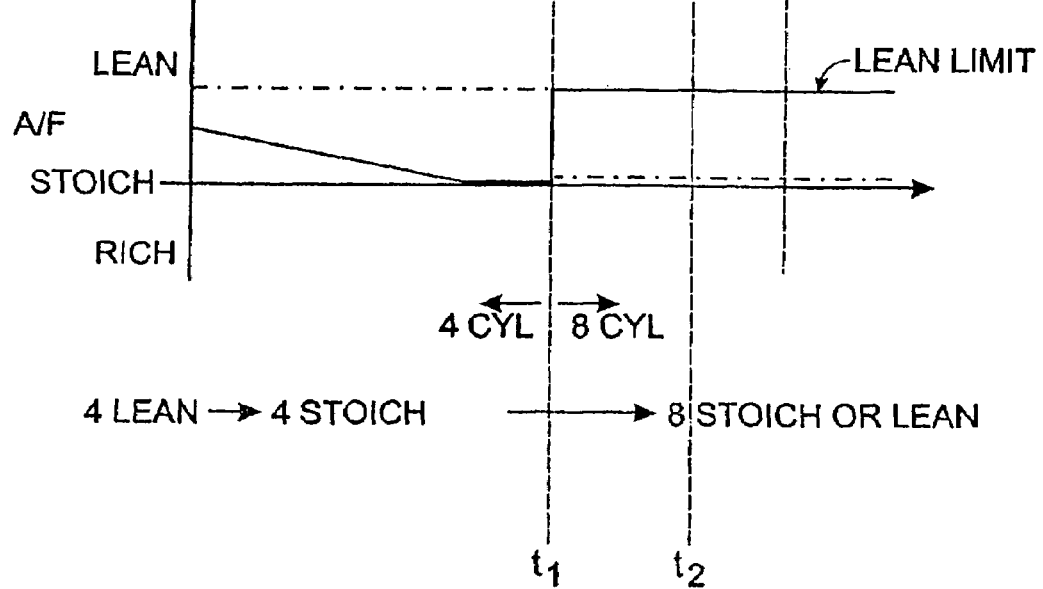

As illustrated in the graphs of FIGS. 6A-D, one specific approach to transition from four cylinder operation to eight cylinder operation is illustrated. Note that the particular example of four cylinder to eight cylinder operation could be adjusted based on the number of cylinders in the engine such as, for example: from three cylinders to six cylinders, from five cylinders to ten cylinders, etc. Specifically, FIG. 6A shows total engine air flow, FIG. 6B shows the fuel charge per cylinder, FIG. 6C shows ignition (spark) angle, and FIG. 6D shows the air-fuel ratio of combusting cylinders.

As shown in FIGS. 6A-D, before time T1, four cylinders are initially combusting a lean air-fuel ratio and providing a desired engine output torque. Then, as engine airflow is decreased, the air-fuel ratio approaches the stoichiometric value and the engine is operating with four cylinders combusting a stoichiometric air-fuel ratio and pumping air with substantially no injected fuel. Then, at time T1, the engine transitions to eight cylinders combusting. At this time, the desire is to operate all engine cylinders as lean as possible to minimize the torque increase by doubling the number of combusting cylinders. However, since the engine typically has a lean combustion air-fuel ratio limit (as indicated by the dashed dot line in FIG. 6D), it is not possible to compensate all the increased torque by combusting a lean air-fuel ratio in all the cylinders. As such, not only is the fuel charge per cylinder decreased, but the ignition angle is also decreased until the airflow can be reduced to the point at which all the cylinders can be operated at the lean limit.

In other words, from time T1 to T2, engine torque is maintained by decreasing engine airflow and retarding ignition timing until the engine can be operated with all the cylinders at the air-fuel ratio limit to provide the same engine output as was provided before the transition from four cylinders to eight cylinders. In this way, it is possible to provide a smooth transition, while improving fuel economy by using lean combustion in the enabled cylinders, as well as the previously stoichiometric combusting cylinders and thus reducing the amount of ignition timing retard after the transition that is required.

This improved operation can be compared to the case where the transition is from four cylinders to eight cylinders, with the eight cylinders combusting at stoichiometry. In this case, which is illustrated by the dashed lines in FIGS. 6A-6D, a greater amount of ignition timing retard for a longer duration, is required to maintain engine torque substantially constant during the transition. As such, since this requires more ignition timing retard, over a longer duration, more fuel is wasted to produce engine output than with the approach of the solid lines in FIGS. 6A-6D, one example of which is described in the routine of FIG. 7.

Figure 7:
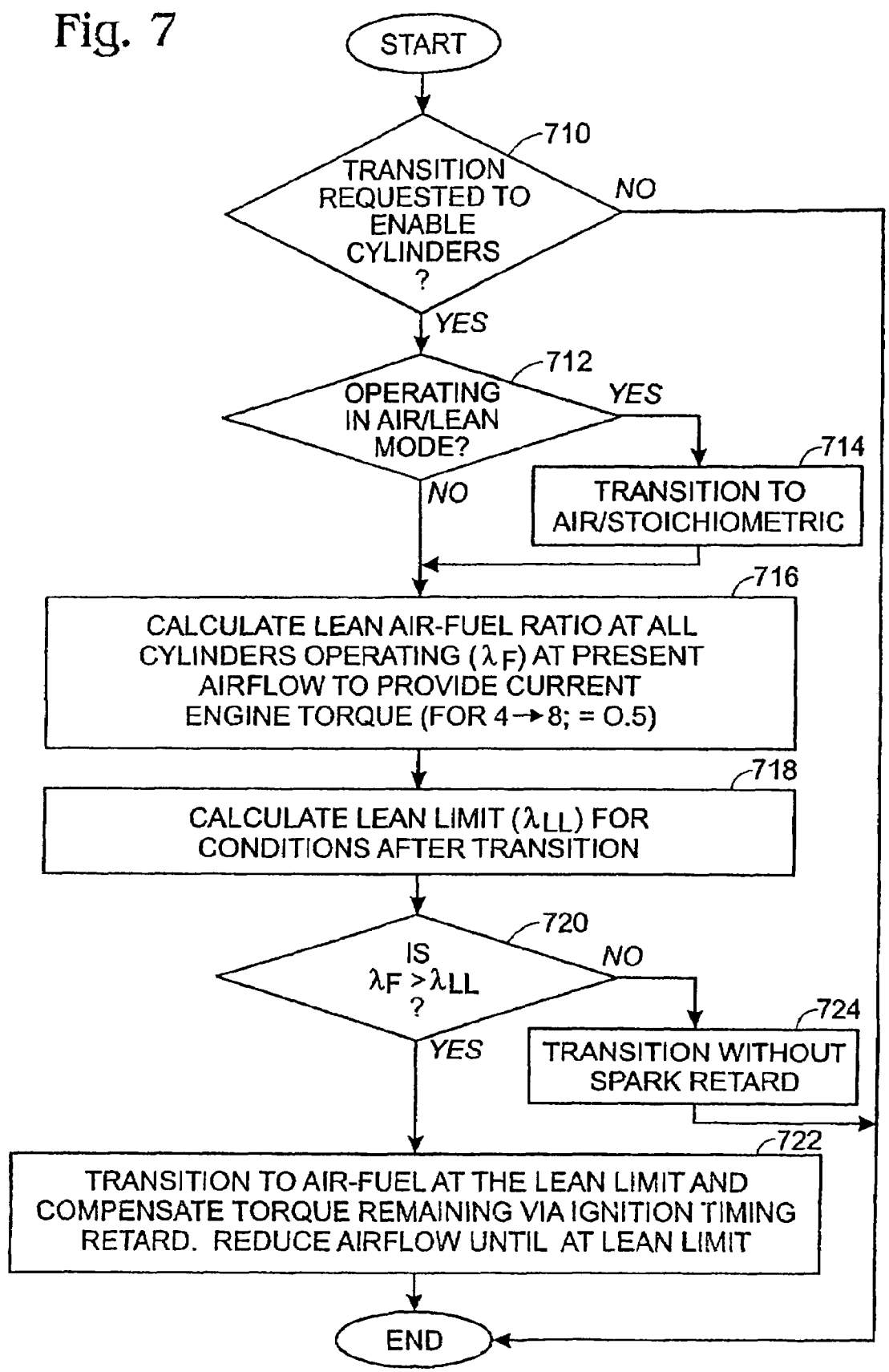

Referring now to FIG. 7, a routine is described for controlling a transition from less than all the cylinders combusting to all the cylinders combusting, such as the example from four cylinders to eight cylinders illustrated in FIGS. 6A-D.

First, in step 710, the routine determines whether a transition has been requested to enable the cylinders operating to pump air and substantially no injected fuel. When the answer to step 710 is yes, the routine continues to step 712 to determine whether the system is currently operating in the air-lean mode. When the answer to step 712 is yes, the routine transitions the engine to the air-stoichiometric mode by decreasing engine airflow. Next, from step 714, or when the answer to step 712 is no, the routine continues to step 716. In step 716, the routine calculates a lean air-fuel ratio with all cylinders operating ($\lambda_f$) at the present airflow to provide the current engine torque. In the example of transitioning from four cylinders to eight cylinders, this air-fuel ratio is approximately 0.5 if the current operating conditions are in the air-stoichiometric mode. In other words, all the cylinders would require half the fuel to produce the same torque as half the cylinders at the current amount of fuel.

Next, in step 718, the routine calculates the lean limit air-fuel ratio ($\lambda_{LL}$) for the conditions after the transition. In other words, the routine determines the combustion stability lean limit which is available after the transition for the operating conditions present. Then, in step 720, the routine determines whether the calculated lean air-fuel ratio to maintain engine torque ($\lambda_f$) is greater than the lean limit air-fuel ratio. If the answer to step 720 is no, the transition is enabled without ignition timing retard. In this case, the routine transitions the cylinders to the new air-fuel ration calculated in step 716 to maintain engine torque.

However, the more common condition is that the required air-fuel ratio to maintain engine torque is greater than the lean limit for the operating conditions. In this case, the routine continues to step 722 to transition the air-fuel ratio at the lean air-fuel limit and compensate the torque difference via the ignition timing retard. Further, the airflow is reduced until the engine can operate at the lean air-fuel ratio limit (or within a margin of the limit) without ignition timing retard.

In this way, the transition to enabling cylinders with lean combustion can be utilized to improve fuel economy and maintain engine torque during the transition. Thus, not only is the torque balanced over the long term, but also over the short term using air-fuel enleanment in addition to ignition timing retard, if necessary. Further, this transition method achieves the a synergistic effect of rapid catalyst heating since the ignition timing retard and enleanment help increase heat to the exhaust system to rapidly heat any emission control devices coupled to deactivated cylinders. Note that various modifications can be made to this transition routine. For example, if transitioning to enable purging of NOx stored in the exhaust system, rich operation can follow the enleanment once airflow has been reduced.

Figure 8:
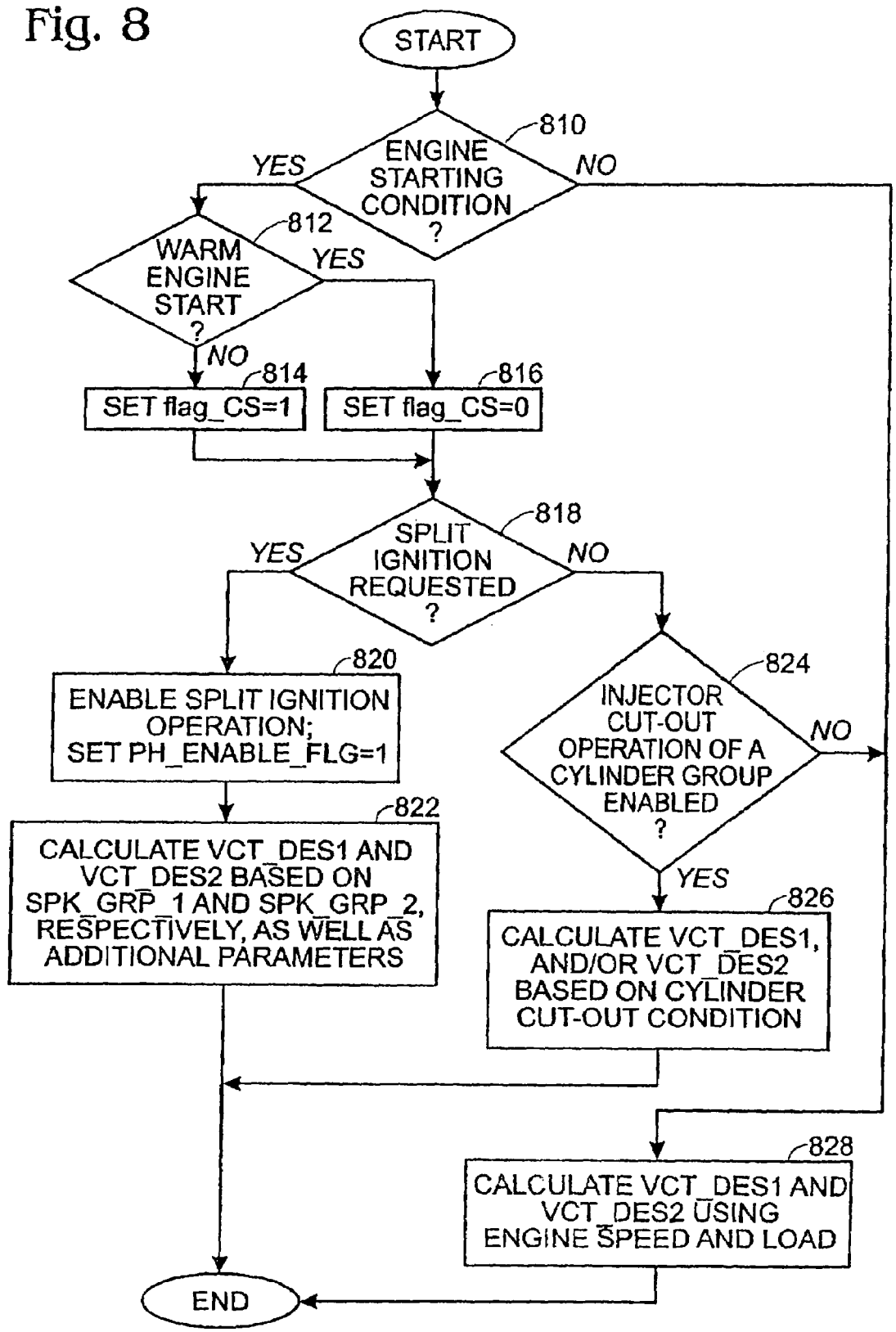

Referring now to FIG. 8, a routine is described for controlling engine cylinder valve operation (intake and/or exhaust valve timing and/or lift, including variable cam timing, for example) depending on engine conditions and engine operating modes. In general terms, the routine of FIG. 8 allows engine cylinder valve operation for different groups of cylinders during engine starting to help compensate for variations in ignition timing between the groups.

First, in step 810, the routine determines whether the present conditions represent an engine starting condition. This can be determined by monitoring if the engine is being turned by a starting motor. Note however, that engine starting can include not only the initial cranking by the starter, but also part of the initial warm up phase from a cold engine condition. This can be based on various parameters, such as engine speed, time since engine start, or others. Thus, when the answer to step 810 is yes, the routine then determines whether the engine is already in a warmed up condition in step 812. This can be based on, for example, engine coolant temperature.

When the answer to step 812 is no, the routine sets the flag (flag_LS) to one. Otherwise, the flag is set to zero at 816. Next, the routine continues to step 818 where a determination is made as to whether split ignition operation is requested. One example of split ignition operation includes the following method for rapid heating of the emission control device when an emission control device(s) is below a desired operating temperature. Specifically, in this approach, the ignition timing between two cylinders (or two or more cylinder groups) is set differently. In one example, the ignition timing for the first group (spk_grp_1) is set equal to a maximum torque, or best, timing (MBT_spk), or to an amount of ignition retard that still provides good combustion for powering and controlling the engine. Further, the ignition timing for the second group (spk_grp_2) is set equal to a significantly retarded value, for example −29°. Note that various other values can be used in place of the 29° value depending on engine configuration, engine operating conditions, and various other factors. Also, the power heat flag (ph_enable) is set to zero.

The amount of ignition timing retard for the second group (spk_grp_2) used can vary based on engine operating parameters, such as air-fuel ratio, engine load, and engine coolant temperature, or catalyst temperature (i.e., as catalyst temperature rises, less retard in the first and/or second groups, may be desired). Further, the stability limit value can also be a function of these parameters.

Also note, as described above, that the first cylinder group ignition timing does not necessarily have to be set to maximum torque ignition timing. Rather, it can be set to a less retarded value than the second cylinder group, if such conditions provide acceptable engine torque control and acceptable vibration. That is, it can be set to the combustion stability spark limit (e.g., −10 degrees). In this way, the cylinders on the first group operate at a higher load than they otherwise would if all of the cylinders were producing equal engine output. In other words, to maintain a certain engine output (for example, engine speed, engine torque, etc.) with some cylinders producing more engine output than others, the cylinders operating at the higher engine output produce more engine output than they otherwise would if all cylinders were producing substantially equal engine output.

An advantage to the above aspect is that more heat can be created by operating some of the cylinders at a higher engine load with significantly more ignition timing retard than if operating all of the cylinders at substantially the same ignition timing retard. Further, by selecting the cylinder groups that operate at the higher load, and the lower load, it is possible to minimize engine vibration. Thus, the above routine starts the engine by firing cylinders from both cylinder groups. Then, the ignition timing of the cylinder groups is adjusted differently to provide rapid heating, while at the same time providing good combustion and control.

Also note that the above operation provides heat to both the first and second cylinder groups since the cylinder group operating at a higher load has more heat flux to the catalyst, while the cylinder group operating with more retard operates at a high temperature.

Note that in such operation, the cylinders have a substantially stoichiometric mixture of air and fuel. However, a slightly lean mixture for all cylinders, or part of the cylinders, can be used.

Also note that all of the cylinders in the first cylinder group do not necessarily operate at exactly the same ignition timing. Rather, there can be small variations (for example, several degrees) to account for cylinder to cylinder variability. This is also true for all of the cylinders in the second cylinder group. Further, in general, there can be more than two cylinder groups, and the cylinder groups can have only one cylinder.

Further note that, as described above, during operation according to one example embodiment, the engine cylinder air-fuel ratios can be set at different levels. In one particular example, all the cylinders can be operated substantially at stoichiometry. In another example, all the cylinders can be operated slightly lean of stoichiometry. In still another example, the cylinders with more ignition timing retard are operated slightly lean of stoichiometry, and the cylinders with less ignition timing retard are operated slightly rich of stoichiometry. Further, in this example, the overall mixture of air-fuel ratio is set to be slightly lean of stoichiometry. In other words, the lean cylinders with the greater ignition timing retard are set lean enough such that there is more excess oxygen than excess rich gasses of the rich cylinder groups operating with less ignition timing retard.

Continuing with FIG. 8, when the answer to step 818 is yes, the routine enables the split ignition operations in step 820 by setting the flag (PH_ENABLE_Flg) to one.

Then, in step 822, the desired valve operation (in this case valve timing) for the first and second group of cylinders is calculated separately and respectively based on the conditions of the cylinder groups, including the air flow, air/fuel ratio, engine speed, engine torque (requested and actual), and ignition timing. In this way, an appropriate amount of air charge and residual charge can be provided to the different cylinder groups to better optimize the conditions for the respective ignition timing values used in the cylinders.

The desired variable cam timings for the cylinder groups can also be based on various other parameters, such as catalyst temperature(s) and/or whether flag_CS is set to zero or one. When operating in the split ignition operation, at least during some conditions, this results in different VCT settings between different cylinder groups to provide improved engine operation and catalyst heating. In this way, the air flow to the cylinder with more advanced ignition timing can be used to control engine output torque, as well as the torque imbalance between the cylinder groups. Further, the airflow to the cylinder with more retarded ignition timing can be used to control the combustion stability, or heat flux produced. Also, if the engine is not equipped with VCT, but rather variable valve lift, or electrically actuated valves, then different airflow can be provided to different cylinders via valve lift, or variation of timing and/or lift of the electrically actuated valves. Furthermore, if the engine is equipped with multiple throttle valves (e.g., one per bank), then airflow to each group can be adjusted via the throttle valve, rather than via variations in VCT.

Continuing with FIG. 8, when the answer to step 818 is no, the routine continues to step 824 where a determination is made as to whether fuel injector cut-out operation of a cylinder, or cylinder groups, is enabled. When the answer to step 824 is yes, the routine continues to step 826 to calculate the desired cam timing (s) for operating cylinder group(s) taking into account the cylinder cut-out operation. In other words, different valve timings can be selected, at least during some conditions, based on whether cylinder cut-out operation is engaged. Thus, the VCT timing for the respective cylinder groups is based on the air-fuel ratio of combustion in the group combusting air and injected fuel, while the VCT timing for the group without fuel injection is selected to, in one example, minimize engine pumping losses. Alternatively, when transitioning into, or out of, the partial or total cylinder cut-out operation, the VCT timing for the respective cylinder groups is adjusted based on this transition. For example, when enabling combustion of cylinder previous in cylinder cut-out operation, the VCT timing is adjusted to enable efficient and low emission re-starting of combustion, which can be a different optimal timing for the cylinders which were already carrying out combustion of air and injected fuel. This is described in more detail below with regard to FIG. 12, for example.

Alternatively, when the answer to step 824 is no, the valve timing for the cylinder groups is selected based on engine speed and load, for example.

In this way, it is possible to select appropriate valve timing to improve cylinder cut-out operation. When firing groups coincide with VCT (or bifurcated intake groups), it is possible to optimize the amount of catalyst heating (or efficient engine operation) depending on the vehicle tolerance to different types of excitation (NVH) given the operating conditions.

Specifically, in one example, NVH performance can be improved by reducing the airflow to cylinders with significantly retarded ignition timing to reduce any effect of combustion instability that may occur. Likewise, in another example, engine torque output can be increased, without exacerbating combustion instability, by increasing airflow to the cylinder(s) with more advanced ignition timing. This can be especially useful during idle speed control performed via an idle bypass valve, or via the electronic throttle, where even though total airflow is being increased, that increased airflow can be appropriately allocated to one cylinder group or another depending on the ignition timing split used.

Figure 34:
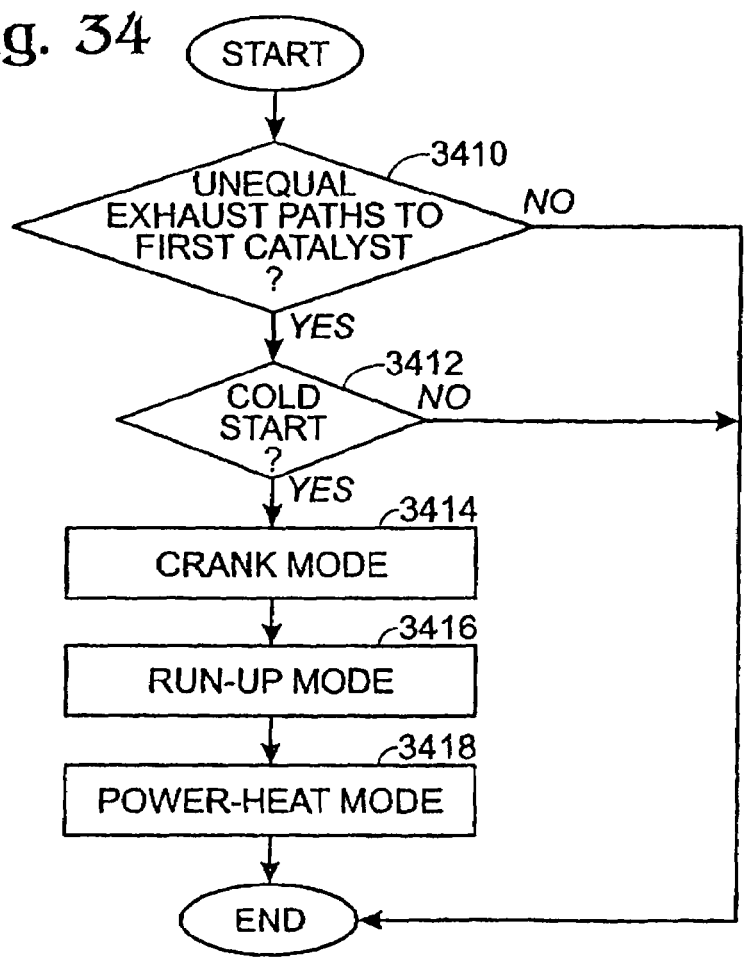

Note that an alternative starting routine is described in FIG. 34.

Referring now to FIG. 9, a routine is described for identifying pedal tip-out conditions, and using such information to enable or disable fuel injection to cylinders, or cylinder groups, of the engine. First, in step 910, the routine identifies whether a tip-out condition has been detected. Note that there are various approaches to detecting a tip-out condition, such as, for example: detecting if whether the pedal has been released by the vehicle driver's foot, whether a requested engine output has decreased below a threshold value (for example, below zero value engine brake torque), whether a requested wheel torque has decreased below a threshold level, or various others. When the answer to step 910 is yes and a tip-out condition has been detected, the routine continues to step 912. In step 912, the routine determines whether the requested engine output is less than threshold T1. In one example, this threshold is the minimum negative engine output that can be achieved with all the cylinders combusting. This limit can be set due to various engine combustion phenomena, such as engine misfires, or significantly increased emissions. Also note that various types of requested engine output can be used, such as, for example: engine torque, engine brake torque, wheel torque, transmission output torque, or various others. When the answer to step 912 is yes, the routine continues to step 914. In step 914, the routine enables a fuel cut operation, which is discussed in more detail below with regard to FIG. 10. Alternatively, when the answer to either step 910 or 912 is no, the routine continues to step 916 in which combustion in all the cylinders of the engine is continued.

Note that the fuel cut operation enabled in step 914 can be various types of cylinder fuel cut operation. For example, only a portion of the engine's cylinders can be operated in the fuel cut operation, or a group of cylinders can be operated in the fuel cut operation, or all of the engine cylinders can be operated in the fuel cut operation. Furthermore, the threshold T1 discussed above with regard to step 912 can be a variable value that is adjusted based on the current engine conditions, including engine load and temperature.

Figure 10:
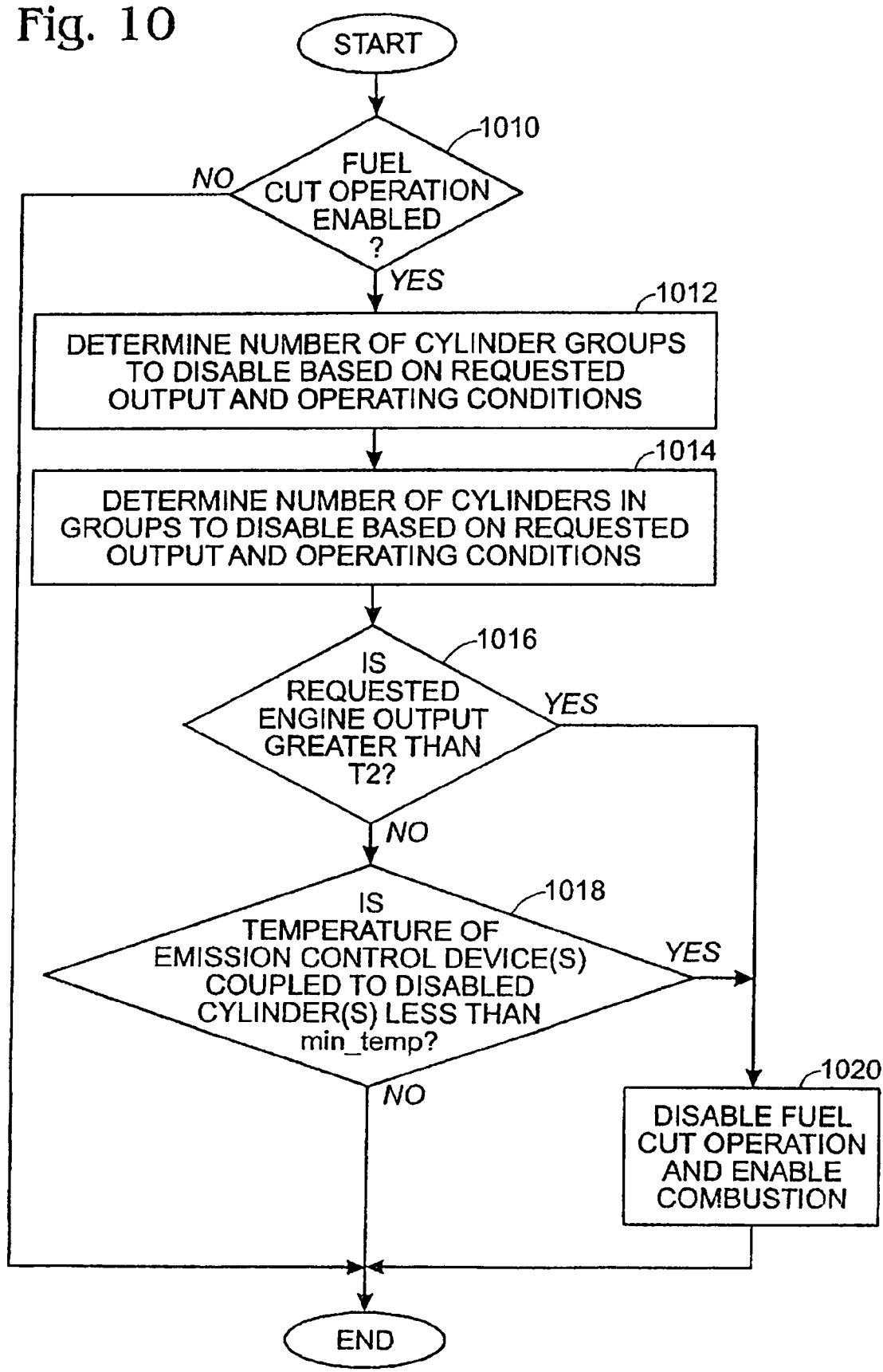

Referring now to FIG. 10, an example routine is described for controlling fuel cut operation, which can be used with a variety of system configurations, such as, for example, FIGS. 2A-2H. First, in step 1010, the routine determines whether fuel cut operation has been enabled as discussed above with regard to step 914 of FIG. 9. When the answer to step 1010 is yes, the routine continues to step 1012. In step 1012, the routine determines the number of cylinder groups to disable based on the requested engine output and current engine and vehicle operating conditions. These operating conditions include the catalyst operating conditions, temperature (engine temperature and/or catalyst temperature) and engine speed. Next, in step 1014, the routine determines the number of cylinders in the groups to be disabled based on the requested engine output and engine and vehicle operating conditions. In other words, the routine first determines the number of cylinder groups to be disabled, and then determines within those groups, the number of cylinders of the groups to be disabled. These determinations are also selected depending on the engine and exhaust catalyst configuration. For example, in cases using a downstream lean NOx trap, in addition to disabling cylinders, the remaining active cylinders can be operated at a lean air-fuel ratio.

Continuing with FIG. 10, in step 1016, the routine determines whether the requested engine output is greater than a threshold T2, such as when a vehicle driver tips-in to the vehicle pedal. When the answer to step 1016 is no, the routine continues to step 1018 to determine whether temperature of the emission control devices coupled to disabled cylinders is less than a minimum temperature (min_temp). As such, the routine monitors the requested engine output and the temperature of the emission control devices to determine whether to re-enable cylinder combustion in the activated cylinders. Thus, when the answer to either step 1016 or 1018 is yes, the routine continues to step 1020 to disable fuel cut operation and enable combustion. This enabling can enable all the cylinders to return to combustion or only a part of the activated cylinders to return to combustion. Whether all or only a portion of the cylinders are reactivated depends on various engine operating conditions and on the exhaust catalyst configuration. For example, when three-way catalysts are used without a lean NOx trap, all of the cylinders may be enabled to carry out combustion. Alternatively, when a downstream lean NOx trap is used, all or only a portion of the cylinders may be re-enabled at a lean air-fuel ratio, or some of the cylinders can be re-enabled to carry out stoichiometric combustion.

Note that before the fuel cut operation is enabled, the engine can be operating with all the cylinders carrying out lean, stoichiometric, or rich engine operation.

Referring now to FIG. 11, a routine is described for performing idle speed control of the engine, taking into account fuel vapor purging. First, in step 1110, the routine determines whether idle speed control conditions are present. Idle speed conditions can be detected by monitoring whether the pedal position is lower than a preselected threshold (indicating the driver's foot is off the pedal) and the engine speed is below a threshold speed (for example 1000 RPM). When the answer to step 1110 is yes, the routine continues to step 1112. In step 1112, the routine determines whether lean combustion is enabled based on the current engine operating conditions, such as exhaust temperature, engine coolant temperature, and other conditions, such as whether the vehicle is equipped with a NOx trap. When the answer to step 1112 is no, the routine continues to step 1114.

In step 1114, the routine maintains the desired idle speed via the adjustment of air flow to the engine. In this way, the air flow is adjusted so that the actual speed of the engine approaches the desired idle speed. Note that the desired idle speed can vary depending on operating conditions such as engine temperature. Next, in step 1116, the routine determines whether fuel vapors are present in the engine system. In one example, the routine determines whether the purge valve is actuated. When the answer to step 1116 is yes, the routine continues to step 1118. In step 1118, the routine adjusts the fuel injection amount (to the cylinders receiving fuel vapors) to maintain the desired air-fuel ratio, as well as compensate for the fuel vapors, while fuel injected to cylinders combusting without fuel vapors (if any) can be set to only a feed-forward estimate, or further adjusted based on feedback from the exhaust gas oxygen sensor. Thus, both cylinders with and without fuel vapor are operated at a desired air-fuel ratio by injecting less fuel to the cylinders with fuel vapors. In one example, the desired combustion air-fuel ratio oscillates about the stoichiometric air-fuel ratio, with feedback from exhaust gas oxygen sensors from the engine's exhaust. In this way, the fuel injection amount in the cylinders with fuel vapors is compensated, while the fuel injection amount to cylinders operating without fuel vapors is not affected by this adjustment, and all of the cylinders combusting are operated about stoichiometry.

Next, in step 1120, the routine determines whether the fuel injection pulse width (to the cylinders with fuel vapors) is less than a minimum value (min_pw). When the answer to step 1120 is yes, the routine continues to step 1122 to disable fuel vapor purging and close the purge valve (s). In this way, the routine prevents the fuel injection pulse width from becoming lower than a minimum allowed pulse width to operate the injectors.

When the answer to either step 1116, or 1120 is no, the routine continues to the end.

When the answer to step 1112 is yes, the routine continues to step 1124. Then, in step 1124, the routine maintains the desired idle speed via adjustment of fuel injection. In this way, the fuel injection amount is adjusted, so that the actual speed of the engine approaches the desired idle speed. Note that this lean combustion conditions includes conditions where some cylinders operate with a lean air-fuel ratio, and other cylinders operate without injected fuel. Next, in step 1126, the routine determines whether fuel vapors are present in the engine (similar to that in step 1116). When the answer is yes, the routine continues to step 1128 where air flow is adjusted to maintain the air-fuel ratio in the combusting cylinders and compensate for the fuel vapors. Note that there are various ways to adjust the air flow to the cylinders carrying out combustion, such as by adjusting the throttle position of the electronically controlled throttle plate. Alternatively, air flow can be adjusted by changing valve timing and/or lift, such as by adjusting a variable cam timing actuator.

Next, in step 1130, a routine determines whether the cylinder air-fuel ratio (of cylinders carrying out combustion) is less than a minimum value (afr_min). In one example, this is a minimum lean air-fuel ratio, such as 18:1. In addition, the routine monitors whether air flow is at the maximum available air flow for the current engine operating conditions. If not, the engine first attempts to increase air flow by further opening the throttle, or adjusting valve timing and/or lift. However, when air flow is already at a maximum available amount, the routine continues to step 1132 to disable lean combustion. The routine may still allow continued cylinder fuel cut-out operation since this operation provides for maximum fuel vapor purging in a stoichiometric condition as will be discussed below.

When the answer to either step 1110, 1126, or 1130, is no, the routine continues to the end.

In this way, it is possible to operate with fuel vapor purging and improve operation of both lean and stoichiometric combustion. Specifically, by using fuel injection to maintain idle speed during lean conditions, and air flow to maintain idle speed during non-lean conditions, it is possible to provide accurate engine idle speed control during both conditions. Also, by disabling lean operation, yet continuing to allow cylinder fuel cut-out operation, when the fuel vapors are too great to allow lean combustion, it is possible to improve the quantity of fuel vapor purge that can be processed. In other words, during cylinder fuel cut-out operation, all the fuel vapors are fed to a portion of the cylinders, for example as shown in FIG. 2C. However, since less than all the cylinders are carrying out the combustion to generate engine output, these cylinders operate at a higher load, and therefore a higher total requirement of fuel to be burned. As such, the engine is less likely to experience conditions where the fuel injectors are less than the minimum pulse width than compared if all the cylinders were carrying out combustion with fuel vapors. In this way, improved fuel vapor purging capacity can be achieved.

Figure 12A:
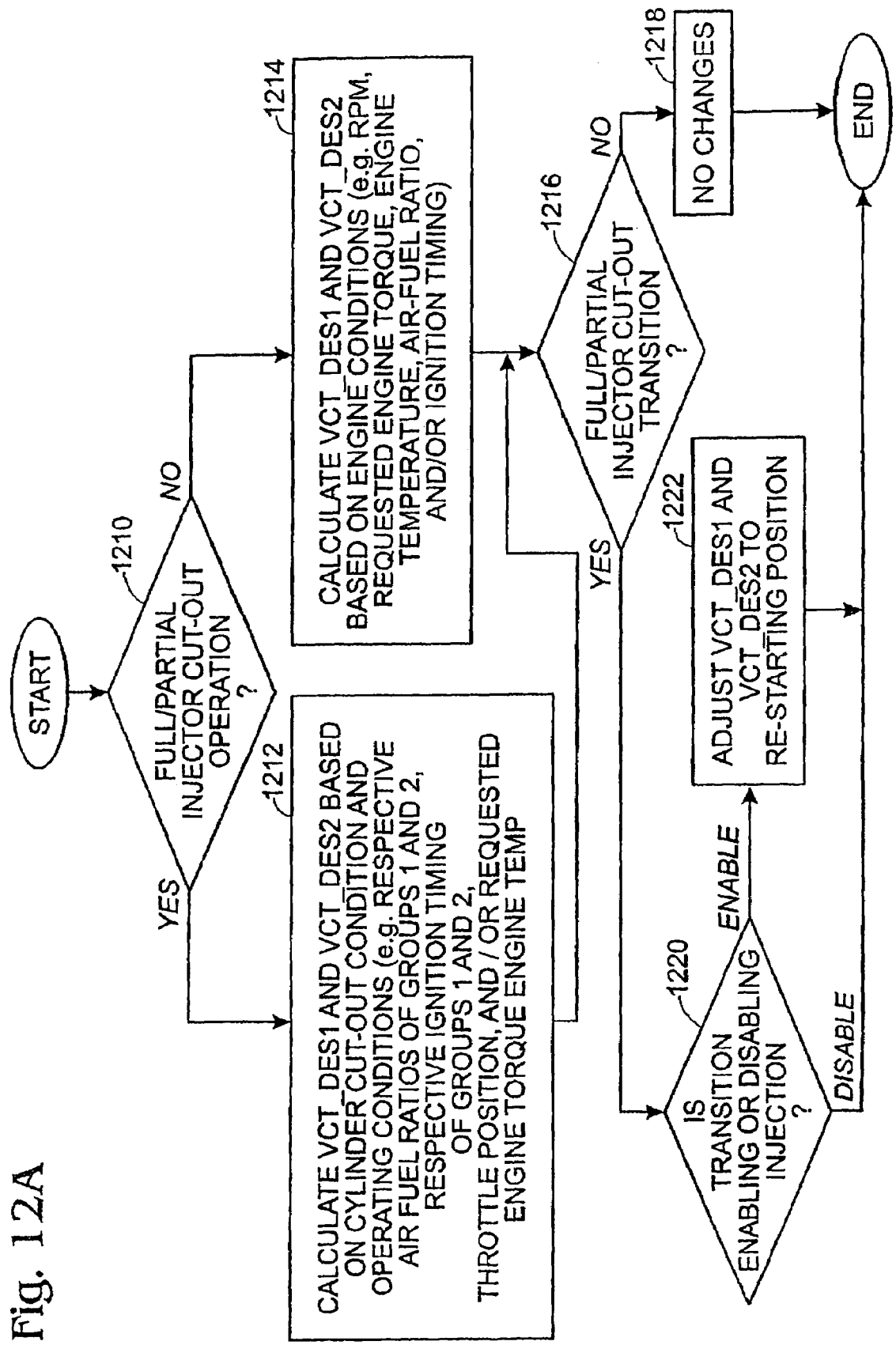
Figure 12B:
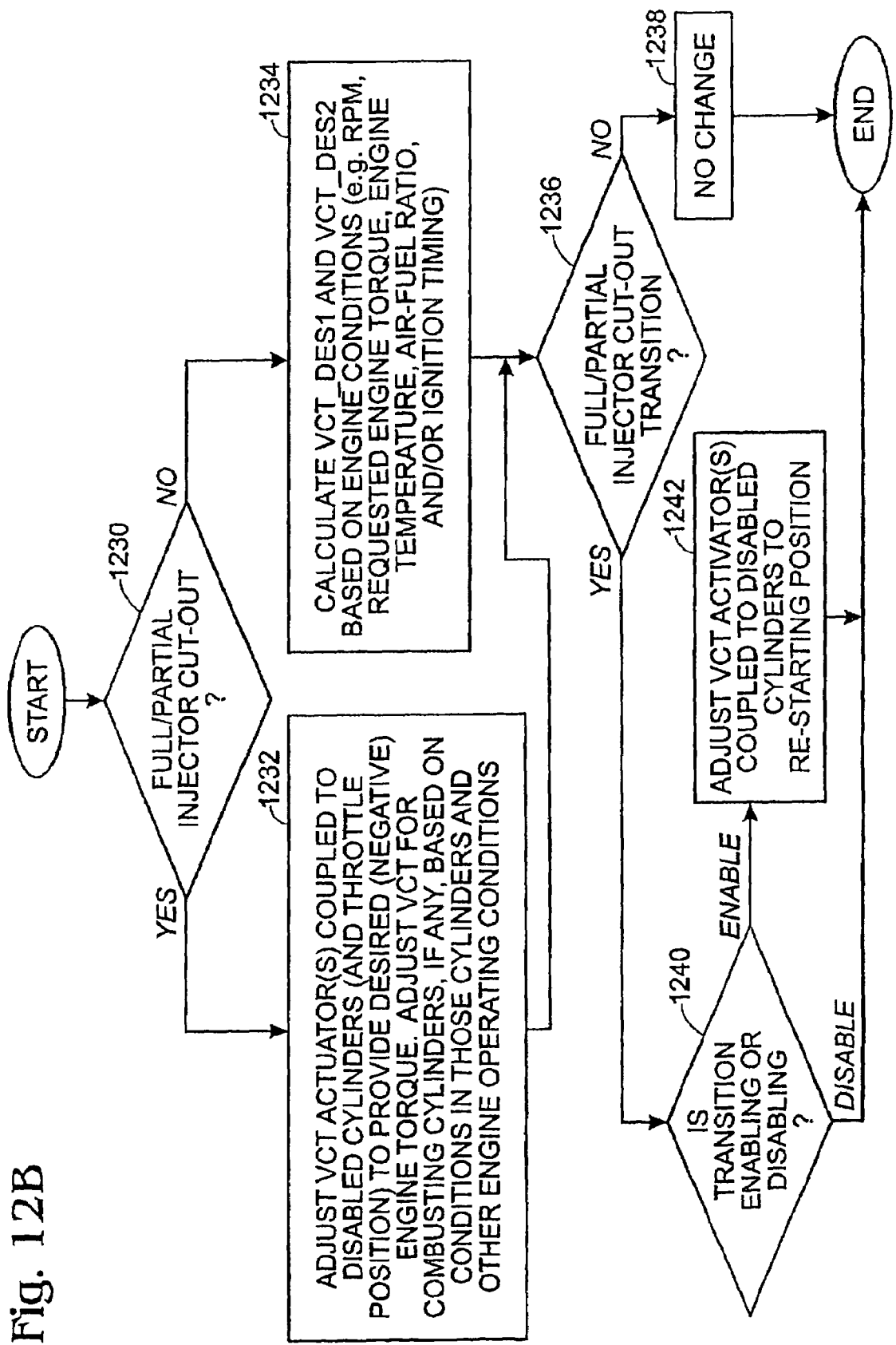

Referring now to FIGS. 12A and 12B, routines are described for controlling cylinder valve adjustment depending, in part, on whether some or all of the cylinders are operating an a fuel-cut state. In general, the routine adjusts the cylinder valve timing, and/or valve lift, based on this information to provide improved operation. Also, the routine of FIG. 12A is an example routine that can be used for system configurations such as those shown in FIGS. 2N, 2O, 2P, 2S and/or 2T. The routine of FIG. 12B is an example routine that can be used for system configurations such as those shown in FIGS. 2I and 2J.

First, in step 1210, the routine determines whether the engine is operating in a full or partial fuel injector cut-out operation. When the answer to step 1210 is yes, the routine continues to step 1212. In step 1212, the routine determines a desired cylinder valve actuation amount for a first and second actuator. In this particular example, where a first and second variable cam timing actuator are used to adjust cam timing of cylinder intake and/or exhaust valves, the routine calculates a desired cam timing for the first and second actuator (VCT_DES1 and VCT_DES2). These desired cam timing values are determined based on the cylinder cut-out condition, as well as engine operating conditions such as the respective air-fuel ratios and ignition timing values between different cylinder groups, throttle position, engine temperature, and/or requested engine torque. In one embodiment, the operating conditions depend on operating mode. Specifically, in addition to engine speed versus torque, the following conditions are considered in an idle speed mode: engine speed, closed pedal, crank start, engine temperature, and air charge temperature. In addition to engine speed versus torque, the following conditions are considered in a part throttle or wide open throttle condition: rpm, desired brake torque, and desired percent torque.

In one example, where the routine is applied to a system such as in FIG. 2S or 2T, the routine can further set a cam timing per bank of the engine, where the cylinder groups have some cylinders from each bank in the group. Thus, a common cam timing is used for both cylinders with and without combustion from injected fuel. As such, the desired cam timing must not only provide good combustion in the cylinders carrying out combustion, but also maintain a desired manifold pressure by adjusting airflow though the engine, along with the throttle. Note that in many conditions, this results in a different cam timing for the combusting cylinders than would be obtained if all of the cylinders were carrying out combustion in the cylinder group.

Alternatively, when the answer to step 1210 is no, the routine continues to step 1214 to calculate the desired valve actuator settings (VCT_DES1 and VCT_DES2) based on engine conditions, such as engine speed, requested engine torque, engine temperature, air-fuel ratio, and/or ignition timing.

From either of steps 1212 or 1214, the routine continues to step 1216 where a determination is made as to whether the engine is transitioning into, or out of, full or partial fuel injector cut-out operation. When the answer to step 1216 is no, the routine continues to step 1218 where no adjustments are made to the determined desired cylinder valve values.

Otherwise, when the answer to step 1216 is yes, the routine continues to step 1220 where the routine determines whether the transition is to re-enable fuel injection, or cut fuel injection operation. When it is determined that a cylinder, or group of cylinders, is to be re-enabled, the routine continues to step 1222. Otherwise, the routine continues to the end.

In step 1222, the routine adjusts the desired cam timing values (VCT_DES1 and/or VCT_DES2) of cylinder valves coupled to cylinders being re-enabled to a re-starting position (determine based on engine coolant temperature, airflow, requested torque, and/or duration of fuel-cut operation). In this way, it is possible to have improved re-starting of the cylinders that were in fuel-cut operation. In the case where both cylinders are operated in a fuel cut operation, all of the cylinders can be restarted at a selected cam timing that provides for improved starting operation.

Note that due to different system configurations, this may also adjust cam timing of cylinders already carrying out combustion. As such, additional compensation via throttle position or ignition timing can be used to compensate for increases or decreases engine output due to the adjustment of cam timing before the transition. The details of the transition are discussed in more detail above and below, such as regarding FIG. 6, for example.

Referring now to FIG. 12B, an alternative embodiment for controlling cylinder valve actuation based on fuel-cut operation is described. First, in step 1230, the routine determines whether the engine is operating in a full or partial fuel injector cut-out operation. When the answer to step 1230 is yes, the routine continues to step 1232. In step 1232, the routine determines a desired cylinder valve actuation amount for an actuator coupled to a group of cylinders in which fuel injection is disabled. In one example, this is a desired cam timing value. Further, the routine also calculates an adjustment to throttle position, along with the cam timing, to adjust the engine output to provide a requested engine output. In one example, the requested engine output is a negative (braking) engine torque value. Further, in step 1232, the routine adjusts the cam timing for the combusting cylinders (if any) based on conditions in those combusting cylinders.

Alternatively, the routine can set the desired cylinder valve actuation amount for deactivated cylinders to provide a desired engine pumping loss amount, since adjusting the cam timing of the cylinders will vary the intake manifold pressure (and airflow), thus affecting engine pumping losses. Note that in some cases, this results in a different cam timing being applied to the group of cylinders combusting than the group of cylinders in fuel-cut operation.

Alternatively, when the answer to step 1230 is no, the routine continues to step 1234 to calculate the desired valve actuator settings (VCT_DES1 and VCT_DES2) based on engine conditions, such as engine speed, requested engine torque, engine temperature, air-fuel ratio, and/or ignition timing as shown in step 1214.

From either of steps 1232 or 1234, the routine continues to step 1236 where a determination is made as to whether the engine is transitioning into, or out of, full or partial fuel injector cut-out operation. When the answer to step 1236 is no, the routine continues to step 1238 where no adjustments are made to the determined desired cylinder valve values.

Otherwise, when the answer to step 1236 is yes, the routine continues to step 1240 where the routine determines whether the transition is to re-enable fuel injection, or cut fuel injection operation. When it is determined that a cylinder, or group of cylinders, is to be re-enabled, the routine continues to step 1242. Otherwise, the routine continues to the end.

In step 1242, the routine adjusts the cam timing actuators coupled to disabled cylinders to a re-starting position. Note that the cylinders can re-start at a lean air-fuel ratio, a rich air-fuel ratio, or at stoichiometry (or to oscillate about stoichiometry). In this way, by moving the cam timing that provides for improved starting, while optionally leaving the cam timing of cylinders already combusting at its current condition, it is possible provide improved starting operation.

Figure 13A:
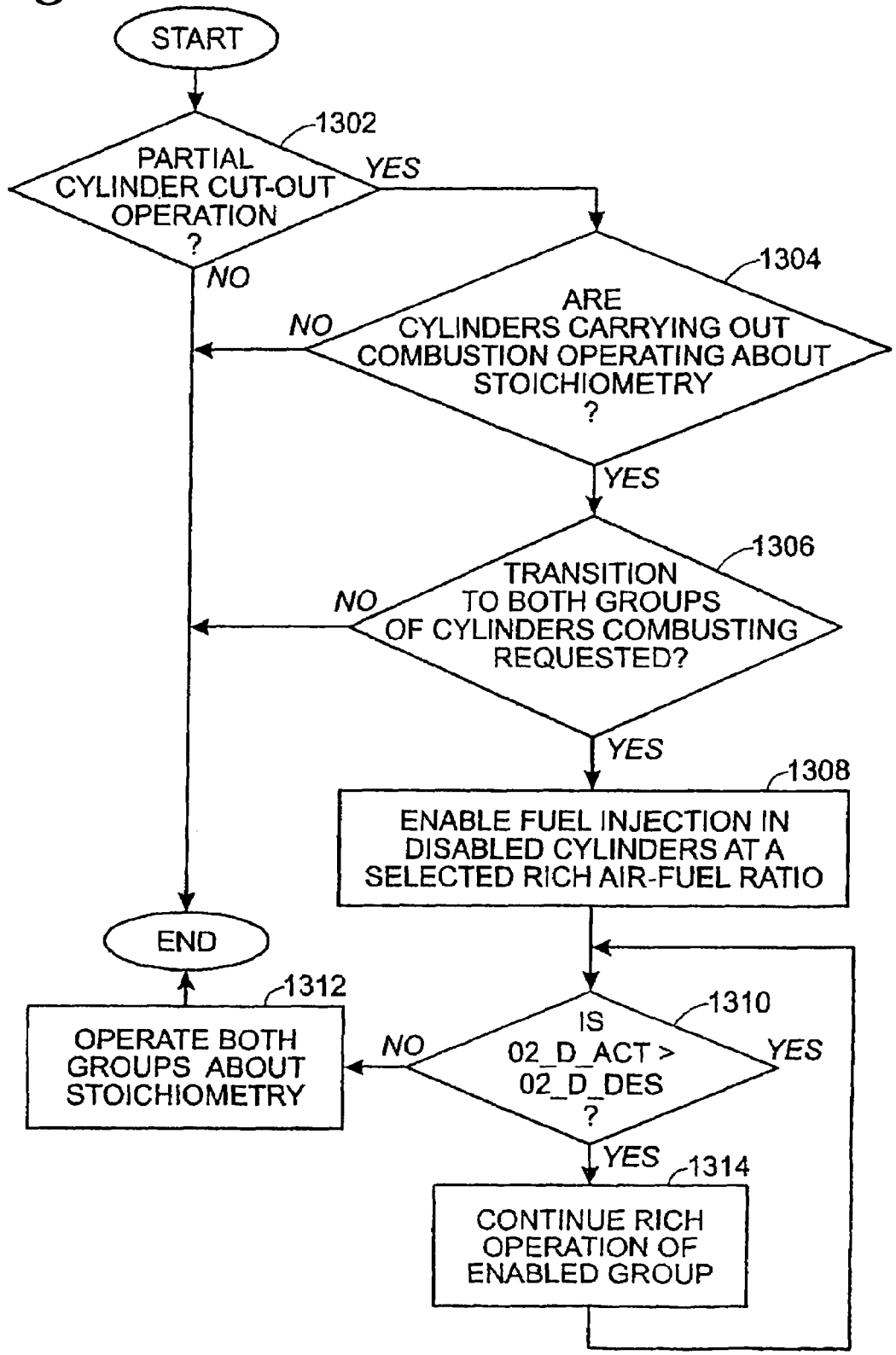

Referring now to FIGS. 13A and 13B, routines and corresponding example results are described for controlling partial and full cylinder cut operation to reestablish the oxygen storage amount in the downstream three-way catalyst, as well as to reestablish the fuel puddle in the intake manifold to improve transient fuel control. Note that the routines FIGS. 13A and 13C can be carried out with various system configurations as represented in FIG. 2. For example, the routine of FIG. 13A can be utilized with the system of FIG. 2Q, for example. Likewise, the routine of FIG. 13C can be utilized with the system of FIG. 2R. Referring now specifically to FIG. 13A, in step 1302, the routine determines whether partial cylinder fuel cut-out operation is present. When the answer to step 1302 is yes, the routine continues to step 1304. In step 1304, the routine determines whether the cylinders carrying out combustion are operating about stoichiometry. When the answer to step 1304 is yes, the routine continues to step 1306. In step 1306, the routine determines whether transition to operate both cylinder groups to combust an air-fuel ratio that oscillates about stoichiometry has been requested by the engine control system. When the answer to any of steps 1302, 1304, or 1306 are no, the routine continues to the end.

When the answer to step 1306 is yes, the routine continues to step 1308. In step 1308, the routine enables fuel injection in the disabled cylinder group at a selected rich air-fuel ratio, while continuing operation of the other cylinder carrying out combustion about stoichiometry. The selected rich air-fuel ratio for the re-enabled cylinders is selected based on engine operating conditions such as, for example: catalyst temperature, engine speed, catalyst space velocity, engine load, and such or requested engine torque. From step 1308, the routine continues to step 1310, where a determination is made as to whether the estimated actual amount of oxygen stored in the downstream three-way catalyst (O2_d_act) is greater than a desired amount of oxygen (O2_d_des). When the answer to step 1310 is yes, the routine continues to step 1312 to continue the rich operation of the re-enabled cylinder group at a selected rich air-fuel ratio, and the oscillation about stoichiometry of the air-fuel ratio of the already combusting cylinders. As discussed above with regard to step 1308, the rich air-fuel ratio is selected based on engine operating conditions, and various depending upon them. From step 1312, the routine returns to step 1310 to again monitor the amount of oxygen stored in the downstream three-way catalyst. Alternatively, the routine of FIG. 13A can also monitor a quantity of fuel in the puddle in the intake manifold of the cylinders that are being re-enabled in step 1310.

When the answer to step 1310 is no, the routine continues to step 1314 which indicates that the downstream three-way catalyst has been reestablished at a desired amount of stored oxygen between the maximum and minimum amounts of oxygen storage, and/or that the fuel puddle in the intake manifold of the various enabled cylinders has been reestablished. As such, in step 1314, the routine operates both groups about stoichiometry. In this way, it is possible to re-enable the cylinders from a partial cylinder cut-out operation and reestablish the emission control system to a situation in which improved emission control can be achieved.

The operation of FIG. 13A is now illustrated via an example as shown in FIGS. 13B1 and 13B2. FIG. 13B1 shows the air-fuel ratio of group 1, while FIG. 13B2 shows the air-fuel ratio of group 2. At time T0, both cylinder groups operate to carry out combustion about the stoichiometric value. Then, at time T1, it is requested to transition the engine to partial cylinder cut operation, and therefore the cylinder group 1 is operating at a fuel cut condition. As shown in FIG. 13B1, the air-fuel ratio is infinitely lean and designated via the dashed line that is at a substantially lean air-fuel ratio. Then, at time T2, it is desired to re-enable the partially disabled cylinder operation, and therefore the cylinder group 1 is operated at a rich air-fuel ratio as shown in FIG. 13B1, this rich air-fuel ratio varies as engine operating conditions change. The rich operation of group 1 and the stoichiometric operation of group 2 continues until time T3, at which point it is determined that the downstream emission control device has been reestablished to an appropriate amount of oxygen storage. As described elsewhere herein, the identification of when to discontinue the rich regeneration operation can be based on estimates of stored oxygen, and/or based on when a sensor downstream of the downstream emission control device switches. At time T3, both cylinder groups are returned to stoichiometric operation, as shown in FIGS. 13B1 and 13B2.

As such, improved engine operation is achieved since the second cylinder group can remain combusting at stoichiometry throughout these transitions, yet the downstream emission control device can have its oxygen storage reestablished via the rich operation of the first cylinder group. This reduces the amount of transitions in the second cylinder group, thereby further improving exhaust emission control.

Referring now to FIG. 13C, a routine is described for controlling cylinder cut-out operation where both cylinder groups are disabled. First, in step 1320, the routine determines whether all cylinders are presently in the cylinder cut operation. When the answer to step 1320 is yes, the routine continues to step 1322 to determine whether the cylinders will be carrying out stoichiometric combustion when enabled. When the answer to step 1322 is yes, the routine continues to step 1324 to determine whether the transition of one or two groups is requested to be enabled. In other words, the routine determines whether it has been requested to enable only one cylinder group, or to enable two cylinder groups to return to combustion. When the answer to step 1324, or step 1322, or step 1320, is no, the routine ends.

Alternatively, when in step 1324, it is requested to enable both cylinder groups, the routine continues to step 1326. In step 1326, the routine operates fuel injection in both cylinder groups at a selected rich air-fuel ratio. Note that the groups can be operated at the same rich air-fuel ratio, or different rich air-fuel ratios. Likewise, the individual cylinders in the groups can be operated at different rich air-fuel ratios. Still further, in an alternative embodiment, only some of the cylinders are operated rich, with the remaining cylinders operating about stoichiometry.

From step 1326, the routine continues to step 1328. In step 1328, the routine determines whether the estimated amount of oxygen stored in the upstream three-way catalyst coupled to the first group (O2_u1_act) is greater than a desired amount of stored oxygen for that catalyst (O2_u1_des). When the answer to step 1320 is no, indicating that the oxygen storage amount has not yet been reestablished in that device, the routine continues to step 1330 to calculate whether the estimated actual amount of oxygen stored in the emission upstream three-way catalyst coupled to the second group (O2_u2_act) is greater than its desired amount of stored oxygen (O2_u2_des). When the answer to step 1330 is no, indicating that neither upstream three-way catalyst coupled to the respective first and second groups' cylinders has been reestablished to their respective desired amounts of stored oxygen, the routine continues to step 1326, where rich operation in both cylinder groups is continued at the selected air-fuel ratio. Also note that the selected rich air-fuel ratio is adjusted based on engine operating conditions as described above herein with regard to step 1308, for example.

When the answer to step 1328 is yes, indicating that the upstream three-way catalyst coupled to the first cylinder group has had its oxygen amount reestablished, the routine continues to step 1332 to transition the first group to operate about stoichiometry. Next, the routine continues to step 1334 where it continues operation of the second at the selected rich air-fuel ratio and the second group to combust an air-fuel mixture that oscillates about stoichiometry. Then, the routine continues to step 1336, where a determination is made as to whether the estimated amount of stored oxygen in a downstream three-way catalyst (which is coupled to at least one of the upstream three-way catalysts, if not both) is greater than its desired amount of stored oxygen. When the answer to step 1336 is no, the routine returns to step 1334 to continue the rich operation in the second group, and the stoichiometric operation in the first group. Alternatively, when the answer to step 1336 is yes, the routine continues to step 1338 to transition both cylinder groups to operate about stoichiometry.

Continuing with FIG. 13C, when the answer to step 1330 is yes, indicating that the oxygen amount has been reestablished in the emission upstream three-way catalyst coupled to the second group, the routine transitions the second group to stoichiometry in step 1342. Then, in step 1344, the routine continues to operate the first cylinder group at the rich air-fuel ratio and the second cylinder group about stoichiometry. Then, the routine continues to step 1346 to again monitor the oxygen storage amount in the downstream three-way catalyst. From step 1346, when the downstream fuel catalyst has not yet had enough oxygen depleted to reestablish the oxygen amount, the routine returns to step 1344. Alternatively, when the answer to step 1346 is yes, the routine also transitions to step 1338 to have both cylinder groups operating about stoichiometry.

From step 1324, when it is desired to transition only one cylinder group to return to combustion, the routine continues to step 1350 to enable fuel injection in one cylinder group at the selected rich air-fuel ratio and continue fuel cut operation in the other cylinder group. This operation is continued in step 1352. Note that for this illustration, it is assumed that in this case the first cylinder group has been enabled to carry out combustion, while the second cylinder group has continued operating at fuel cut operation. However, which cylinder group is selected to be enabled can vary depending on engine operating conditions, and can be alternated to provide more even cylinder ware.

From step 1352, the routine continues to step 1354, where a determination is made as to whether the estimated actual amount of stored oxygen in the upstream three-way catalyst coupled to the first cylinder group (O2_u1_act) is greater than the desired amount (O2_u1_des). When the answer to step 1354 is no, the routine returns to step 1352. Alternatively, when the answer to step 1354 is yes, the routine continues to step 1356 to operate a first cylinder group about stoichiometry and continue the operation of the second cylinder group in the fuel cut operation. Finally, in step 1358, the routine transfers to FIG. 13A to monitor further requests to enable the second cylinder group.

In this way, it is possible to allow for improved re-enablement of cylinder fuel cut operation to properly establish the oxygen storage not only in the upstream three-way catalyst, but also in the downstream three-way catalyst without operating more cylinders rich than is necessary. As described above, this can be accomplished using an estimate of stored oxygen in an exhaust emission control device. However, alternatively, or in addition, it is also possible to use information from a centrally mounted air-fuel ratio sensor. For example, a sensor that is mounted at a location along the length of the emission control device, such as before the last brick in the canister, can be used. In still another approach, downstream sensor(s) can be used to determine when regeneration of the oxygen storage is sufficiently completed.

Example operation of FIG. 13C is illustrated in the graphs of FIGS. 13D1 and 13D2. Like FIGS. 13B1 and B2, FIG. 13D1 shows the air-fuel ratio of the first cylinder group and FIG. 13D2 shows the air-fuel ratio of the second cylinder group. At time T0, both cylinder groups are operating to carry out combustion about the stoichiometric air-fuel ratio. Then, at time T1, it is requested to disable fuel injection in both cylinder groups. As such, both cylinder groups are shown to operate at a substantially infinite lean air-fuel ratio until time T2. At time T2, it is requested to enable combustion in both cylinder groups. As such, both cylinder groups are shown operating at a rich air-fuel ratio. As illustrated in the figures, the level richness of this air-fuel ratio can vary depending on operating conditions. From times T2 to T3, the oxygen saturated upstream first and second three-way catalysts are having the excess oxygen reduced to establish a desired amount of stored oxygen in both the catalysts. At time T3, the upstream three-way catalyst coupled to the second group has reached the desired amount of stored oxygen and therefore the second cylinder is transitioned to operate about stoichiometry. However, since the downstream three-way catalyst has not yet had its excess oxygen reduced, the first cylinder group continues at a rich air-fuel ratio to reduce all the stored oxygen in the upstream three-way catalyst coupled to the first group, and therefore provide reductants to reduce some of the stored oxygen in the downstream three-way catalyst. Thus, at time T4, the rich operation of the first cylinder group has ended since the downstream three-way catalyst has reached its desired amount of stored oxygen. However, at this point, since the upstream three-way catalyst is saturated at substantially no oxygen storage, the first cylinder groups operate slightly lean for a short duration until T5 to reestablish the stored oxygen in the upstream three-way catalyst. At time T5, then both cylinder groups operate about stoichiometry until time T6, at which time again is desired to operate both cylinders without fuel injection. This operation continues to time T7 at which point it is desired to re-enable only one of the cylinder groups to carry out combustion. Thus, the first cylinder group is operated at a rich air-fuel ratio for a short duration until the oxygen storage has been reestablished in the first upstream three-way catalyst coupled to the first cylinder group. Then, the first cylinder group returns to stoichiometric operation until time T8. At time T8, it is desired to re-enable the second cylinder group. At this time, the second cylinder group operates at a rich air-fuel ratio that varies depending on the engine operating conditions to reestablish the stored oxygen in the downstream three-way catalyst. Then, at time T9, the second cylinder group operates slightly lean for a short duration to reestablish some stored oxygen in the upstream three-way catalyst coupled to the second group. Then, both cylinder groups are operated to oscillate above stoichiometry.

In this way, improved operation into and out of cylinder fuel cut conditions can be achieved.

Note that regarding the approach taken in FIG. 13—by re-enabling with rich combustion, any NOx generated during the re-enablement can be reacted in the three way catalyst with the rich exhaust gas, further improving emission control.

Referring now to FIGS. 14 and 15, example emission controls device are described which can be used as devices 300 and/or 302 from FIG. 2. As discussed above, fuel economy improvements can be realized on engines (for example, large displacement engines) by disabling cylinders under conditions such as, for example, low load, or low torque request conditions. Cylinder deactivation can take place by either deactivating valves so the cylinders do not intake or exhaust air or by deactivating fuel injectors to the inactive cylinders pumping air. In the latter scheme, the bifurcated catalyst described in FIGS. 14 and 15 has the advantage that they can keep the exhaust from the firing cylinders separate from the non-firing cylinders so that the emission control device (such as, for example, a 3-way catalyst) can effectively convert the emissions from the firing cylinders. This is true even when used on an uneven firing V8 engine (where disabling cylinders to still give a torque pulse every 180 crank angle degrees requires disabling half of the cylinders on one bank and half of the cylinders on the other bank). The bifurcated catalyst approach thus avoids the need to pipe the air cylinders to one catalyst and the firing cylinders to another catalyst with a long pipe to cross the flow from one side of the engine to the other. As such, it is possible, if desired, to maintain current catalyst package space without requiring complicated crossover piping.

Specifically, FIG. 14 shows a bifurcated catalyst substrate 1410 with a front face 1420 and a rear face (not shown). The substrate is divided into an upper portion 1422 and a lower portion 1424. The substrate is generally oval in cross-sectional shape; however, other shapes can be used, such as circular. Further, the substrate is formed with a plurality of flow paths formed from a grid in the substrate. In one particular example, the substrate is comprised of metal, which helps heat conduction from one portion of the device to the other, thereby improving the ability to operate one group of cylinders in a fuel-cut state. However, a ceramic substrate can also be used.

The substrate is constructed with one or more washcoats applied having catalytic components, such as ceria, platinum, palladium, rhodium, and/or other materials, such as precious metals (e.g., metals from Group-8 of the periodic table). However, in one example, a different washcoat composition can be used on the upper portion of the substrate and the lower portion of the substrate, to accommodate the different operating conditions that may be experienced between the two portions. In other words, as discussed above, one or the other of the upper and lower portions can be coupled to cylinders that are pumping air without injected fuel, at least during some conditions. Further, one portion or the other may be heated from gasses in the other portion, such as during the above described cylinder fuel-cut operation. As such, the optimal catalyst washcoat for the two portions may be different.

In this example, the two portions are symmetrical. This may allow for the situation where either group of cylinders coupled to the respective portions can be deactivated if desired. However, in an alternative embodiment, the portions can be asymmetrical in terms of volume, size, length, washcoats, or density.

Referring now to FIG. 15, an emission control device 1510 is shown housing substrate 1410. The device is shown in this example with an inlet cone 1512 an inlet pipe 1514, an exit cone 1516, and an exit pipe 1618. The inlet pipe and inlet cone are split into two sides (shown here as a top and bottom portion; however, any orientation can be used) each via dividing plates 1520 and 1522. The two sides may be adjacent, as shown in the figure, but neither portion encloses the other portion, in this example. The dividing plates keep a first and second exhaust gas flow stream (1530 and 1532) separated up to the point when the exhaust gas streams reach the substrate portions 1422 and 1424, respectively. The dividing plates are located so that a surface of the plate is located parallel to the direction of flow, and perpendicular to a face of the substrate 1410. Further, as discussed above, because the paths through the substrate are separated from one another, the two exhaust gas streams stay separated through substrate 1410. Also, exit cone 1516 can also have a dividing plate, so that the exhaust streams are mixed after entering exit pipe 1518.

Continuing with FIG. 15, four exhaust gas oxygen sensors are illustrated (1540, 1542, 1544, and 1546), however only a subset of these sensors can be used, if desired. As shown by FIG. 15, sensor 1540 measures the oxygen concentration, which can be used to determine an indication of air-fuel ratio, of exhaust stream 1530 before it is treated by substrate 1410. Sensor 1542 measures the oxygen concentration of exhaust stream 1532 before it is treated by substrate 1410. Sensor 1544 measures the oxygen concentration of exhaust stream 1530 after it is treated by substrate 1410, but before it mixes with stream 1532. Likewise, sensor 1546 measures the oxygen concentration of exhaust stream 1532 after it is treated by substrate 1410, but before it mixes with stream 1530. Additional downstream sensors can also be used to measure the mixture oxygen concentration of streams 1530 and 1532, which can be formed in pipe 1518.

FIG. 15 also shows cut-away views of the device showing an oval cross-section of the catalyst substrate, as well as the inlet and outlet cones and pipes. However, circular cross-sectional pipe, as well as substrate, can also be used.

Figure 16:
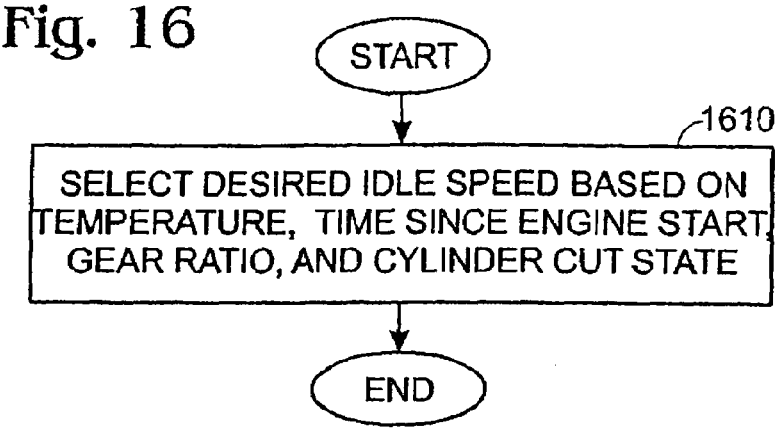

Referring now to FIG. 16, a routine is described for selecting a desired idle speed control set-point for idle speed control which takes into account whether cylinders are deactivated, or whether split ignition timing is utilized. Specifically, as shown in step 1610, the routine determines a desired idle speed set-point, used for feedback control of idle speed via fuel and/or airflow adjustment, based on the exhaust temperature, time since engine start, and/or the cylinder cut state. This allows for improved NVH control, and specifically provides, at least under some conditions, a different idle speed set-point depending on cylinder cut-operation to better consider vehicle resonances. The control strategy of desired idle rpm may also be manipulated to improve the tolerance to an excitation type. For example, in split ignition mode, a higher rpm set-point may reduce NVH by moving the excitation frequency away from that which the vehicle is receptive. Thus, the split ignition idle rpm may be higher than that of a non-split ignition mode.

Figure 17:
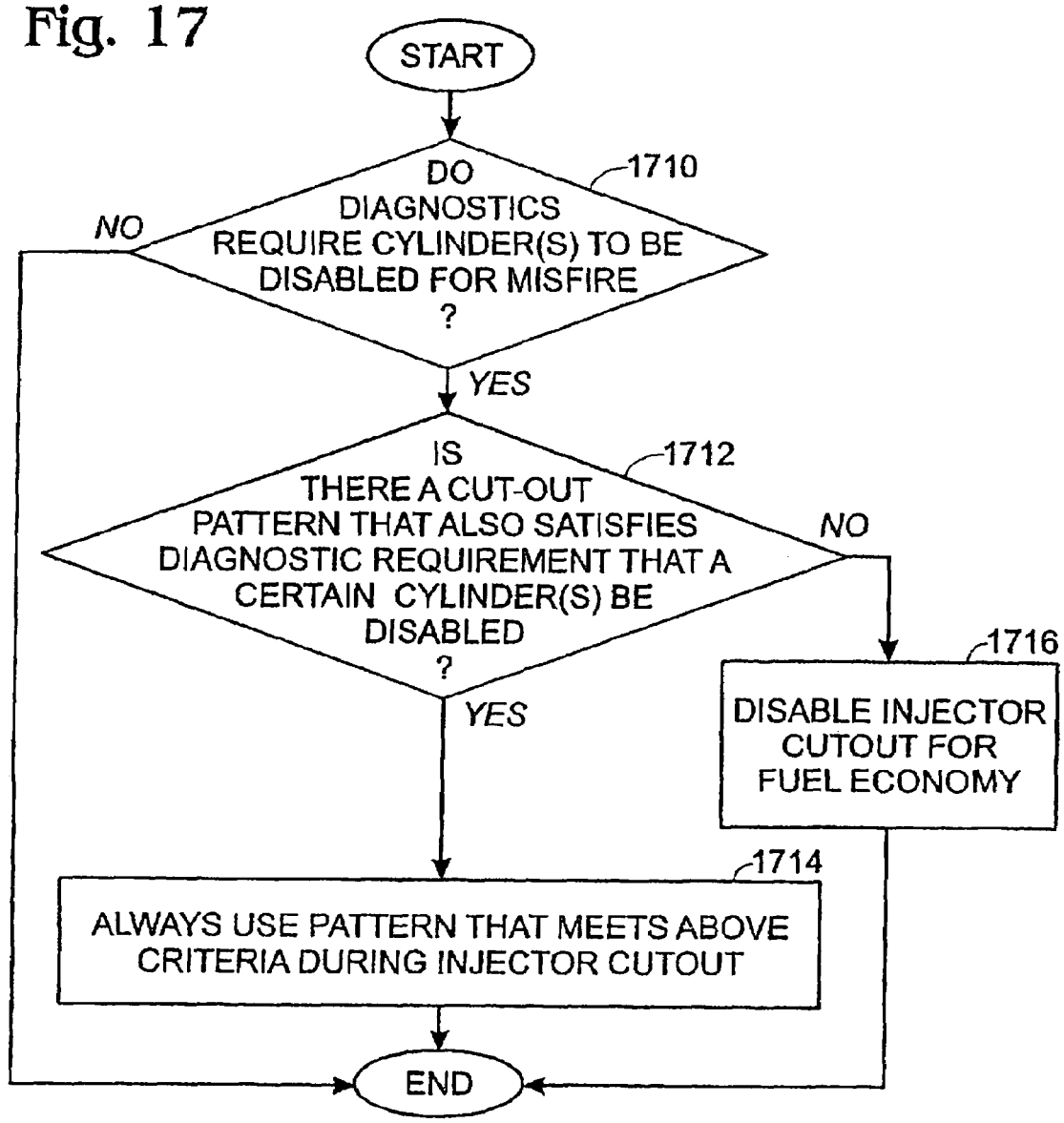

Referring now to FIG. 17, a routine is described for coordinating cylinder deactivation with diagnostics. Specifically, cylinder deactivation is enabled and/or affected by a determination of whether engine misfires have been identified in any of the engine cylinders.

For example, in the case of a V-6 engine as shown in FIG. 2F, if it is determined that an ignition coil has degraded in one of the cylinders in group 250, then this information can be utilized in enabling, and selecting, cylinder deactivation. Specifically, if the control routine alternatively selects between group 250 and 252 to be deactivated, then the routine could modify this selection based on the determination of degradation of a cylinder in group 250 to select cylinder deactivation of group 250 repeatedly. In other words, rather than having the ability to deactivate ether group 250 or group 252, the routine could deactivate the group which has a cylinder identified as being degraded (and thus potentially permanently deactivated until repair). In this way, the routine could eliminate, at least under some conditions, the option of deactivating group 252. Otherwise, if group 252 were selected to be deactivated, then potentially four out of six cylinders would be deactivated, and reduced engine output may be experienced by the vehicle operator.

Likewise, if diagnostics indicate that at least one cylinder from each of groups 250 and 252 should be disabled due to potential misfires, the cylinder cut-out operation is disabled, and all cylinders (except those disabled due to potential misfires) are operated to carry out combustion.

Thus, if the control system has the capability to operate on less than all the engine's cylinders and still produce driver demanded torque in a smooth fashion, then such a mode may be used to disable misfiring cylinders with minimal impact to the driver. This decision logic may also include the analysis of whether an injector cutout pattern would result in all the required cylinders being disabled due to misfire.

FIG. 17 describes an example routine for carryout out this operation. Specifically, in step 1710, the routine determines whether the engine diagnostics have identified a cylinder or cylinders to have potential misfire. In one example, when the diagnostic routines identify cylinder or cylinders to have a potential misfire condition, such as due to degraded ignition coils, those identified cylinders are disabled and fuel to those cylinders is deactivated until serviced by a technician. This reduces potential unburned fuel with excess oxygen in the exhaust that can generate excessive heat in the exhaust system and degrade emission control devices and/or other exhaust gas sensors.

When the answer to step 1710 is no, the routine ends. Alternatively, when the answer to step 1710 is yes, the routine continues to step 1712, where a determination is made as to whether there is a cylinder cutout pattern for improved fuel economy that also satisfies the diagnostic requirement that a certain cylinder, or cylinders, be disabled. In other words, in one example, the routine determines whether there is a cylinder cutout mode that can be used for fuel economy in which all of the remaining active cylinders are able to be operated with fuel and air combusting. When the answer to step 1712 is yes, the routine continues to step 1714 in which the patterns that meet the above criteria are available for injector cutout operation. Patterns of cylinder cutout in which cylinders that were selected to remain active have been identified to have potential misfire, are disabled.

In this way, it is possible to modify the selection and enablement of cylinder cutout operation to improve fuel economy, while still allowing proper deactivation of cylinders due to potential engine misfires.

As described in detail above, various fuel deactivation strategies are described in which some, or all, of the cylinders are operated in a fuel-cut state depending on a variety of conditions. In one example, all or part of the cylinders can be operated in a fuel-cut state to provide improved vehicle deceleration and fuel economy since it is possible to provide engine braking beyond closed throttle operation. In other words, for improved vehicle deceleration and improved fuel economy, it may be desirable to turn the fuel to some or all of the engine cylinders engine off under appropriate conditions.

However, one issue that may be encountered is whether the engine speed may drop too much after the fuel is disabled due to the drop in engine torque. Depending on the state of accessories on the engine, the state of the torque converter, the state of the transmission, and other factors discussed below, the fuel-off torque can vary.

In one example, an approach can be used in which a threshold engine speed can be used so that in worst case conditions, the resulting engine speed is greater than a minimum allowed engine speed. However, in an alternative embodiment, if desired, a method can be used that calculates, or predicts, the engine speed after turning off the fuel for a vehicle in the present operating conditions, and then uses that predicted speed to determine whether the resulting engine speed will be acceptable (e.g., above a minimum allowed speed for those conditions). For example, the method can include the information of whether the torque converter is locked, or unlocked. When unlocked, a model of the torque converter characteristics may be used in such predictions. Further, the method may use a minimum allowed engine speed to determine a minimum engine torque that will result from fuel shut off operation to enable/disable fuel shut off. Examples of such control logic are described further below with regard to FIG. 18. Such a method could also be used to screen other control system decisions that will affect production of engine torque in deceleration conditions, such as whether to enable/disable lean operation in cylinders that remain combusting when others are operated without fuel injection. Examples of such control logic are described further below with regard to FIG. 19.

Furthermore, such an approach can be useful during tip-out conditions in still other situations, other than utilizing full or partial cylinder fuel deactivation, and other than enabling/disabling alternative control modes. Specifically, it can also be used to adjust a requested engine torque during deceleration conditions in which other types of transitions may occur, such as transmission gear shifts. This is described in further detail below with regard to FIGS. 20-21.

Figure 18:
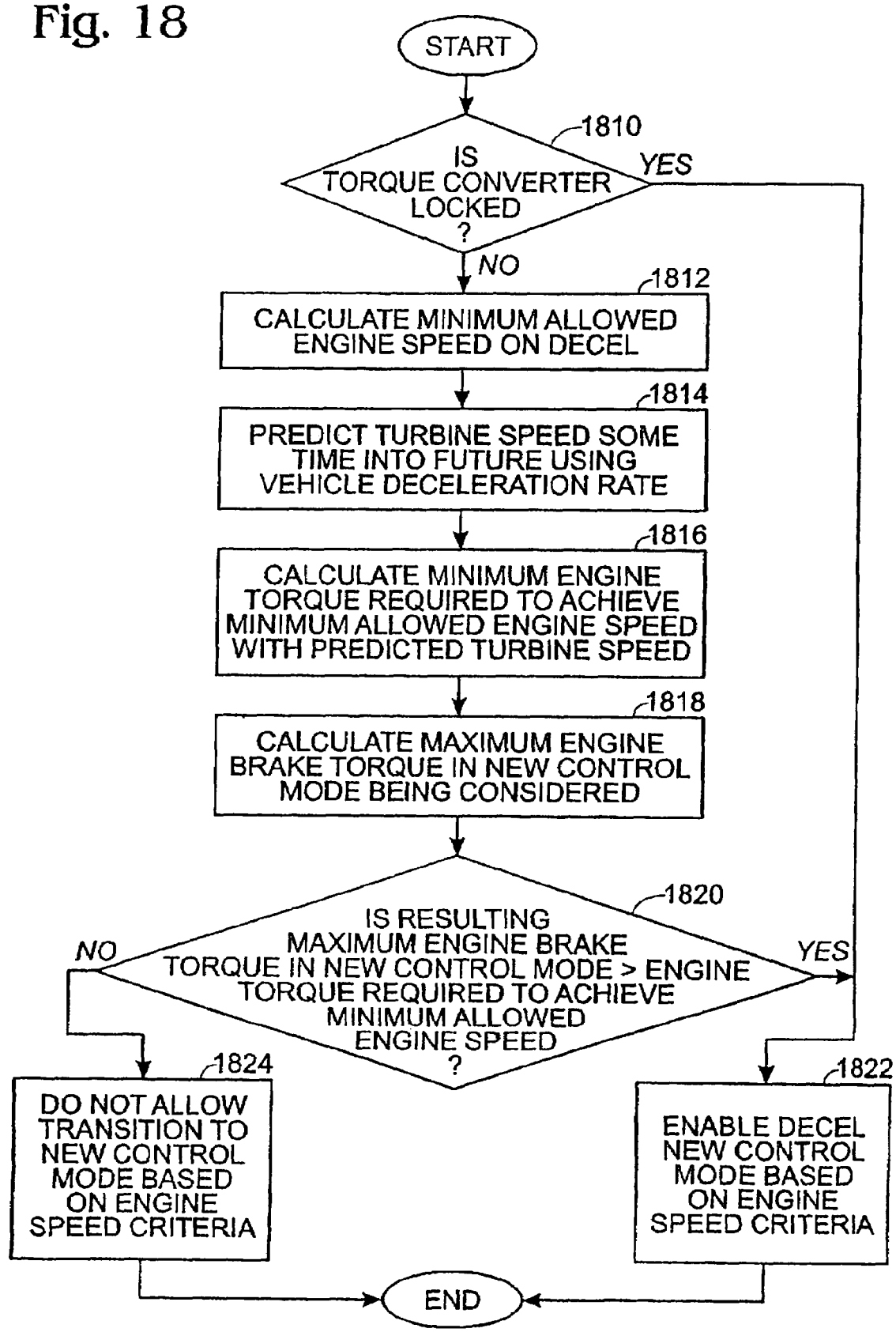

Referring now to FIG. 18, a model based screening (via a torque converter model, for example) for whether to enable (full or partial) fuel shut off operation to avoid excessive engine speed drop is described. First, in step 1810, the routine determines whether the torque converter is in the locked or partially locked condition. The partially locked condition can be encountered when the lock up clutch is being applied across the torque converter, yet has not fully coupled the torque converter input and output. In one example, the determination of step 1810 is based upon whether the slip ratio between the input torque converter speed and the output torque converter speed is approximately one. When the answer to step 1810 is yes, the routine continues to step 1822, as discussed in further detail below. When the answer to step 1810 is no, the routine continues to step 1812. In step 1812, the routine calculates the minimum allowed engine speed during a deceleration condition. In one example, deceleration condition is indicated by a driver tipout of the accelerator pedal (i.e., an accelerator pedal position less than a threshold value). The minimum allowed engine speed calculated in step 1812 can be based on a variety of operating conditions, or selected to be a single value. When the minimum allowed engine speed is dependent upon operating conditions, it can be calculated based on conditions such as, for example: vehicle speed, engine temperature, and exhaust gas temperature.

Continuing with FIG. 18, in step 1814, the routine predicts a turbine speed at a future interval using vehicle deceleration rate. This prediction can be preformed utilizing a simple first order rate of change model where the current turbine speed, and current rate of change, are used to project a turbine speed at a future instant based on a differential in time. Next, in step 1816, the routine calculates a minimum engine torque required to achieve the calculated minimum allowed engine speed with the predicted turbine speed. Specifically, the routine uses a model of the torque converter to calculate the minimum amount of engine torque that would be necessary to maintain the engine speed at the minimum allowed speed taking into account the predicted turbine speed. The details of this calculation are described below with regard to FIG. 20.

Next, in step 1818, the routine calculates the maximum engine brake torque available to be produced in a potential new control mode that is being considered to be used. For example, if the potential new control mode utilizes cylinder cut operation, this calculation takes into account that some or all of the cylinders may not be producing positive engine torque. Alternatively, if the new control mode includes lean operation, then again the routine calculates the maximum engine brake torque available taking into account the minimum available lean air fuel ratio.

Make a note that regarding step 1818, the first example is described in more detail below with regard to FIG. 19.

Next, in step 1820, the routine determines whether the calculated maximum engine brake torque in the potential new control mode is greater than the engine torque required to achieve, or maintain, the minimum allowed engine speed. If the answer to step 1820 is yes, the routine continues to step 1822 to enable the new control mode based on this engine speed criteria. Alternatively, when the answer to step 1820 is no, the routine continues to step 1824 to disable the transition to the new control mode based on this engine speed criteria. In this way, it is possible to enable or disable alternative control modes taking into account their effect on maintaining a minimum acceptable engine speed during the deceleration condition, and thereby reduce engine stalls. Make a note before the description of step 1810 that the routine to FIG. 18 may be preformed during tipout deceleration conditions.

Figure 19:
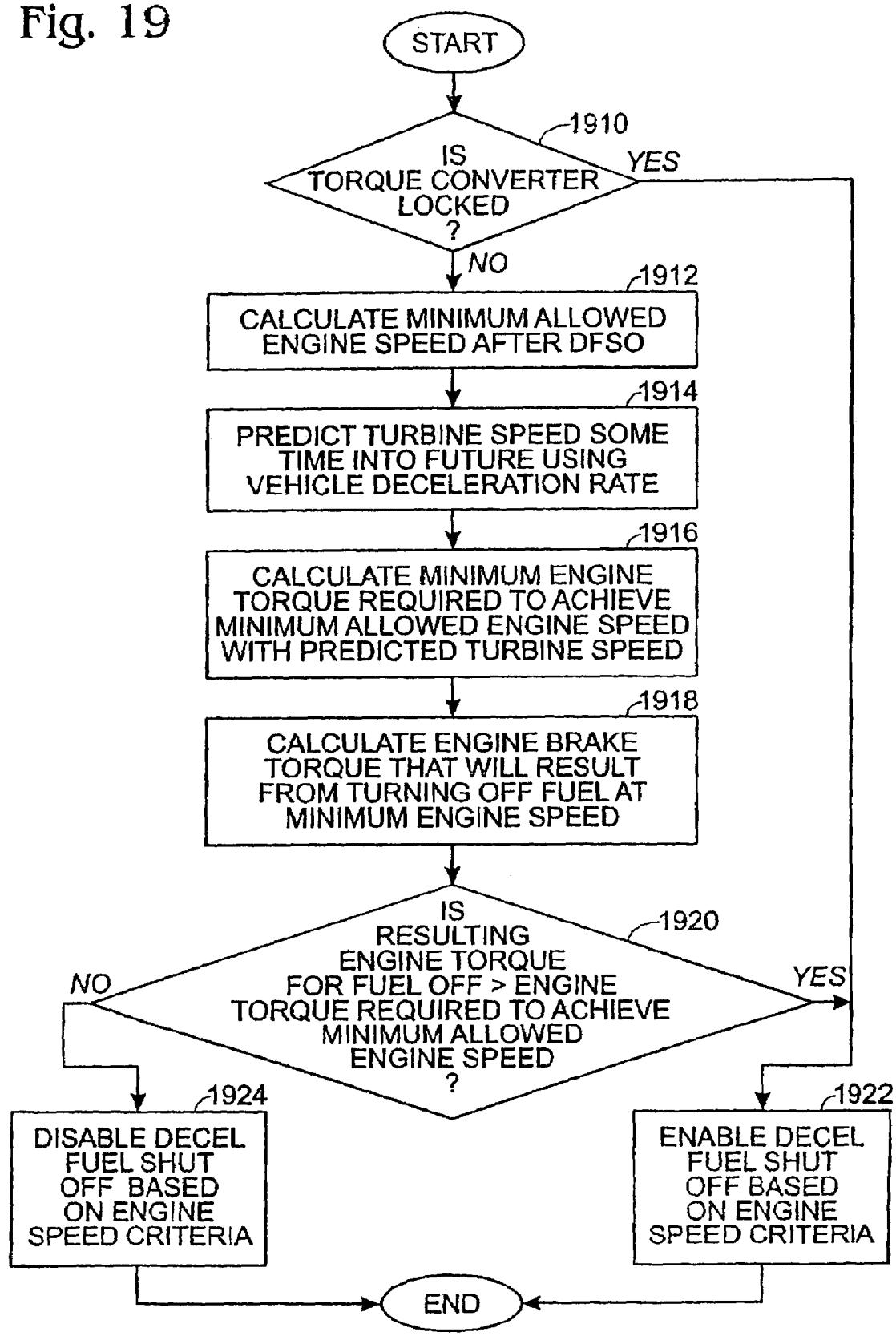

Referring now to FIG. 19, the routine of FIG. 18 has been modified to specifically apply to the cylinder fuel cut operating scenario. Steps 1910-1916 are similar to those described in steps 1810-1816.

From step 1916, the routine continues to step 1918 where the routine calculates the engine brake torque that will result from turning off fuel at the minimum engine speed. Specifically, the routine calculates the engine brake torque that will be produced after turning fuel injection off to part or all of the cylinders. Further, this calculation of brake torque is preformed at the minimum engine speed. Then, in stop 1920, the routine determines whether this resulting engine torque at the minimum engine speed during fuel cut operation is greater then the engine torque required to achieve, or maintain, the minimum allowed engine speed. If so, then the engine torque is sufficient in the fuel cut operation, and therefore the fuel cut operation is enabled based on this engine speed criteria in step 1922. Alternatively, when the answer to step 1920 is no, then the engine torque that can be produced in the full or partial fuel cut operation at the minimum engine speed is insufficient to maintain the minimum engine speed, and therefore the fuel shut-off mode is disable based on this engine speed criteria. In this way, it is possible to selectively enable/disable full and/or partial fuel deactivation to the cylinders in a way that maintains engine speed at a minimum allowed engine speed. In this way, engine stalls can be reduced.

Note that in this way, at least under some conditions, it is possible to enable (or continue to perform) fuel deactivation to at least one cylinder at a lower engine speed when the torque converter is locked than when the torque converter is unlocked. Thus, fuel economy can be improved under some conditions, without increasing occurrence of engine stalls.

Figure 20:
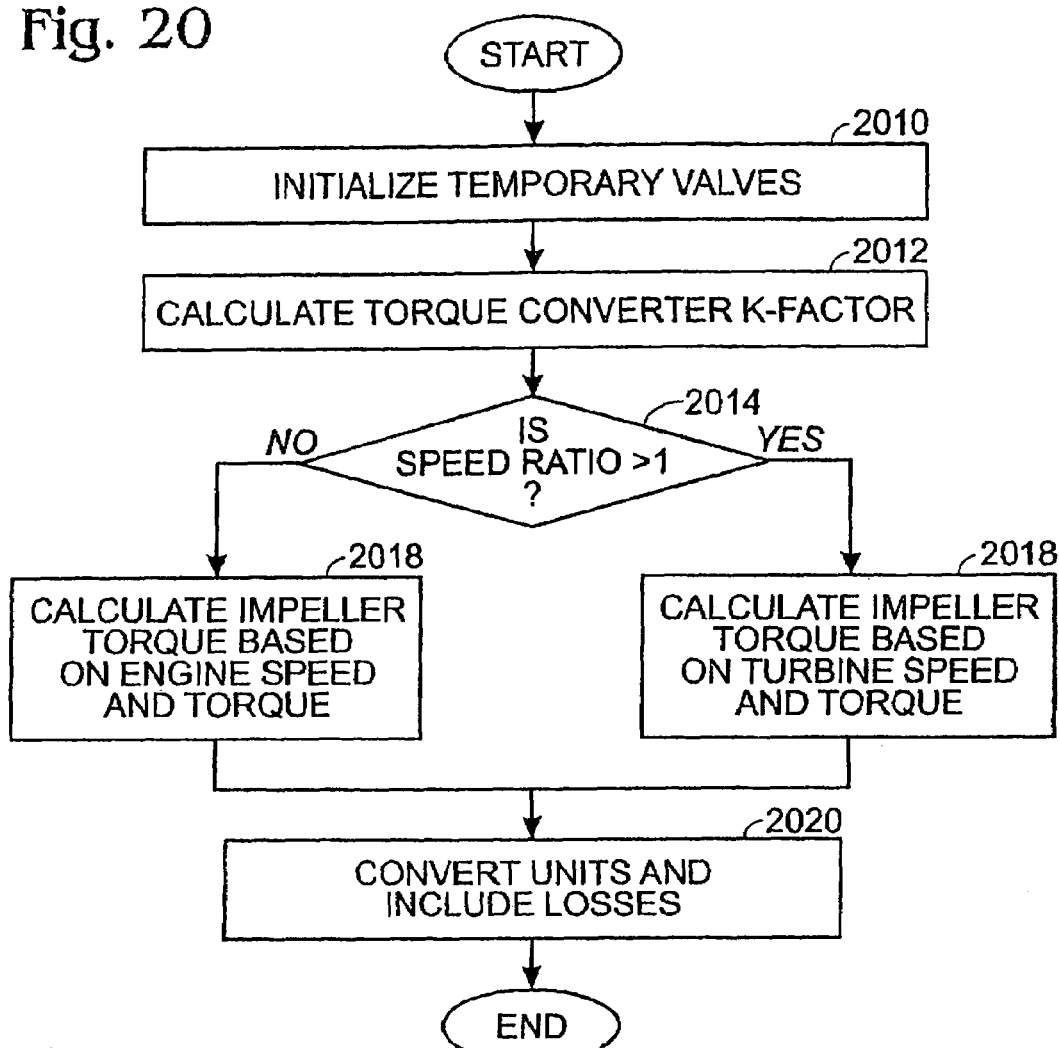
Figure 21:
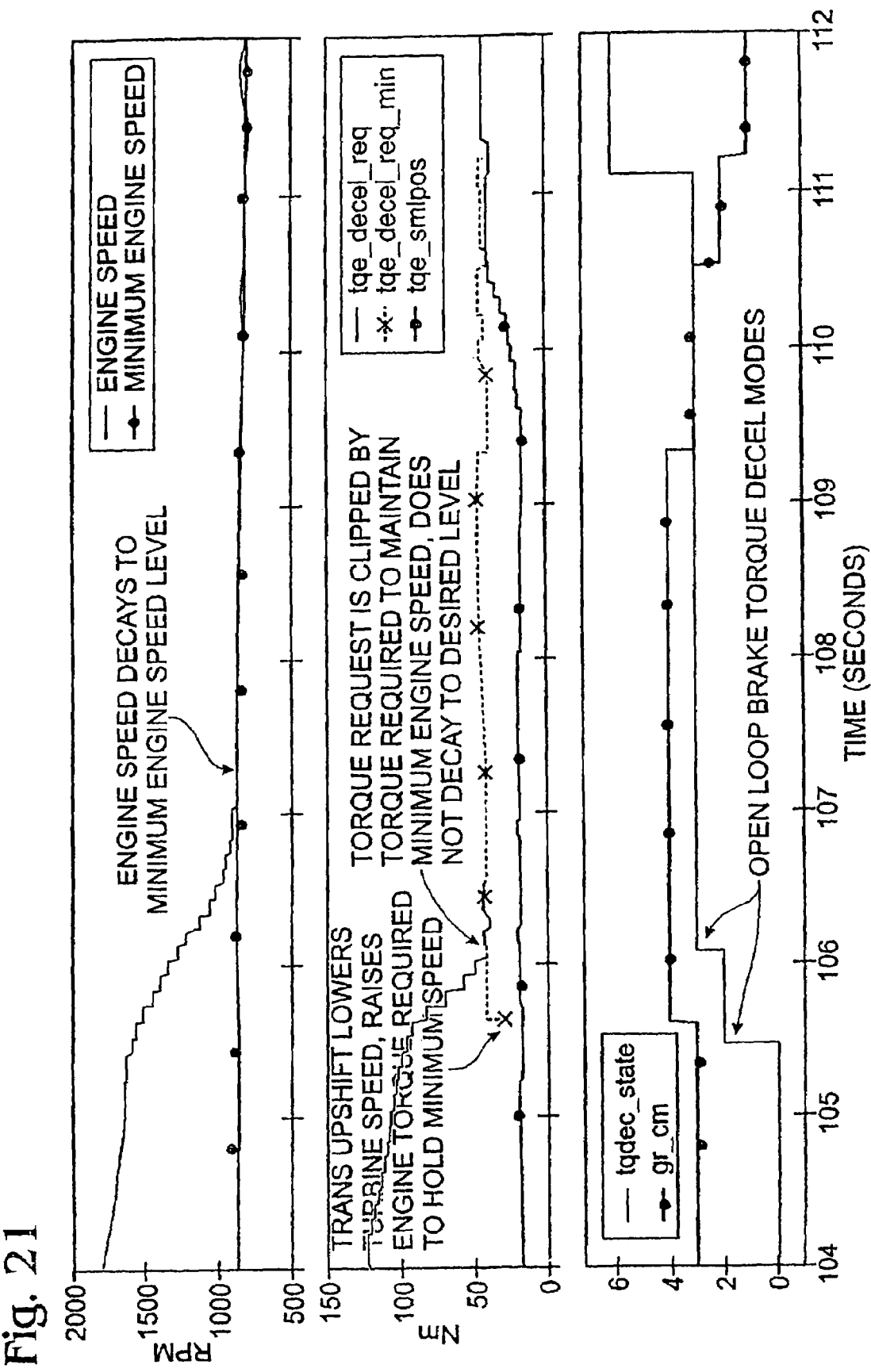
FIG. 21 contains graphs showing a deceleration torque request being clipped via a torque converter model to keep engine speed above a minimum allowed value.

Referring now to FIGS. 20 and 21, a routine is described for clipping a desired engine torque request to maintain engine speed at or above a minimum allowed engine speed during vehicle tip-out conditions utilizing torque converter characteristics. In this way, it is possible to reduce dips in engine speed that may reduce customer feel.

For example, in calibrating a requested impeller torque as a function of vehicle speed for one or more of the engine braking modes, it is desirable to select torque values that give good engine braking feel and are robust in the variety of operating conditions. However, this can be difficult since a variety of factors affect engine braking, and such variations can affect the resulting engine speed. Specifically, it can be desirable to produce less than the required torque to idle under deceleration conditions to provide a desired deceleration trajectory. However, at the same time, engine speed should be maintained above a minimum allowed engine speed to reduce stall. In other words, one way to improve the system efficiency (and reduce run-on feel) under deceleration conditions is to produce less engine torque than needed to idle the engine. Yet at the same time, engine speed drops should be reduced that let engine speed fall below a minimum allowed value.

In one example, for vehicles with torque converters, a model of the open torque converter can be used to determine the engine torque that would correspond to a given engine speed (target speed or limit speed), and thus used to allow lower engine torques during deceleration, yet maintain engine speed above a minimum value. In this case, if there is a minimum allowed engine speed during deceleration, the controller can calculate the engine torque required to achieve at least that minimum engine speed based on turbine speed. The routine below uses two 2-dimensional functions (fn_conv_cpc and fn_conv_tr) to approximate the K-factor and torque ratio across the torque converter as a function of speed ratio. This approximation includes coasting operation where the turbine is driving the impeller. In an alternative approach, more advanced approximations can be used to provide increased accuracy, if necessary.

Note that it is known to use a model of the open torque converter to determine the engine torque that would correspond to a given engine speed in shift scheduling for preventing powertrain hunting. I.e., it is known to forecast the engine speed (and torque converter output speed) after a shift to determine whether the engine can produce enough torque to maintain tractive effort after an upshift (or downshift) in the future conditions. Thus, during normal driving, it is known to screen shift requests to reduce or prevent less than equal horsepower shifts (including a reserve requirement factor), except for accelerations. Further, it is known to include cases where the torque converter is locked, and to include calculations of maximum available engine torque.

Referring now to FIG. 20, a routine is described for calculating the engine brake torque required to spin the engine at a specified engine speed and turbine speed. First, in step 2010, temporary parameters are initialized. Specifically, the following 32-bit variables are set to zero: tq_imp_ft_lbf_tmp (temporary value of impeller torque in lbf), tq_imp_Nm_tmp (temporary value of impeller torque in Nm), cpc_tmp (temporary value of K-factor), and tr_tmp (temporary value of torque ratio). Further, the temporary value of the speed ratio (speed_ratio_tmp)=is calculated as a ratio of the temporary turbine speed (nt_tmp) and the temporary engine speed (ne_tmp), clipped to 1 to reduce noise in the signals.

Then, in step 2012, the routine calculates the temporary K-factor (cpc_tmp) as a function of the speed ratio and converter characteristics stored in memory using a look-up function, for example. Then, in step 2014, a determination is made as to whether the speed ratio (e.g., speed_ratio_tmp>1.0?). If so, this signifies that the vehicle is coasting, and positive engine torque is not being transmitted through the torque converter. When the answer to step 2014 is Yes, the routine continues to step 2016. In step 2016, the routine uses a K-factor equation that uses turbine speed and torque as inputs. Specifically, the impeller torque is calculated from the following equations:

$$tq\_imp\_ft\_lbf\_tmp = nt\_tmp * nt\_tmp / \max((cpc\_tmp * cpc\_tmp), 10000.0);$$

$$tr\_tmp = f(speed\_ratio\_tmp);$$

$$tq\_imp\_ft\_lbf\_tmp = -tq\_imp\_ft\_lbf\_tmp / tr\_tmp;$$

where the function f stores data about the torque converter to generate the torque ratio (tr) based on the speed ratio.

Otherwise, when the answer to step 2014 is No, then the K-factor equation uses engine speed and torque as inputs, and the routine continues to step 2018. In step 2018, the impeller torque is calculated from the following equations:

$$tq\_imp\_ft\_lbf\_tmp = ne\_tmp * ne\_tmp / \max((cpc\_tmp * cpc\_tmp), 10000.0);$$

Then, these can be converted to NM units, and losses included, via the following equation in step 2020.

$$tq\_imp\_Nm\_tmp = tq\_imp\_ft\_lbf\_tmp * 1.3558 + tq\_los\_pmp;$$

In this way, it is possible to calculate a required torque (tq_imp_Nm_tmp) to maintain engine speed as desired. Example operation is illustrated in FIG. 21. Specifically, FIG. 21 demonstrates the performance of this torque request clipping/screening during vehicle testing. At approximately 105.5 seconds the accelerator pedal is released and the torque based deceleration state machine enters hold small positive mode (where a small positive torque is maintained on the drivetrain) followed by an open loop braking mode, where negative engine torque is provided in an open-loop fashion. Soon after the tip-out, the transmission controls command a 3-4 up-shift which will lower the turbine speed below the minimum engine speed target of ~850 rpm in this example, placing a torque load on the engine. This transmission up-shift may result in more engine torque being required to hold 850 rpm engine speed and tqe_decel_req_min (the lower clip applied to the tqe_decel_req_value) therefore jumps to 42 Nm to reflect the higher torque request. The value of tqe_decel_req_min is calculated based on the torque converter model described above. By keeping the deceleration torque request from dropping too low, the engine speed behaves as desired.

Referring now to FIGS. 22-27, a method for managing the cycle averaged torque during transitions between different cylinder cut-out modes is described. Specifically, such an approach may provide improved torque control during these transitions. Before describing the control routine in detail, the following description and graphs illustrate an example situation in which it is possible to better control cycle averaged torque during the transition (note that this is just one example situation in which the method can be used). These graphs use the example of an eight cylinder engine where the cylinders on the engine are numbered in firing order. When the system transitions from firing 1, 3, 5, 7 to 2, 4, 6, 8, for example, two cylinders may fire in succession. If the torque produced by all the cylinders during the transition is substantially the same, the cycle-average torque produced during the transition may be higher than desired, even though no one cylinder produces substantially more or less torque, and over a cycle, the same number of cylinders is still being fired. In other words, there is a single, effective shift of half of the cylinders firing earlier in the overall engine cycle. This torque disturbance may also result in an engine speed disturbance if occurring during idle speed control conditions. The following figures illustrate an example of this torque disturbance.

Note that the following description illustrates a simplified example, and is not meant to define operation of the system.

Figure 22:
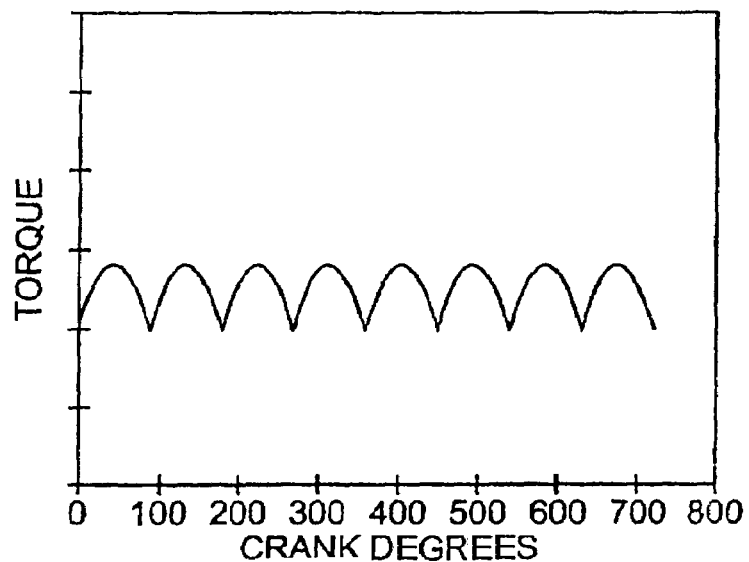

FIG. 22 shows the crankshaft torque for an 8 cylinder engine with all cylinders firing, where the crankshaft torque resulting from the sum of the power strokes on the engine are modeled as simple sine waves. For the example where four cylinders are operated to produce the same net torque as all 8 in FIG. 22, then the torque production of each cylinder would double as shown in FIG. 23.

If this same level of torque was produced by the firing cylinders in 4 cylinder mode but the system transitioned from firing 1-3-5-7 to 2-4-6-8 with the last cylinder fired before the transition being 3 and the first cylinder fired after the transition being 4, then crankshaft torque would be as illustrated in FIG. 24. As shown in FIG. 24, the summing of the torques from cylinders 3 and 4 may produce a torque increase during this transition point and an increase in the average torque over an engine cycle. The increase could be as much as 12.5% for an 8 cylinder engine, or 16.7% for a 6 cylinder engine due to this overlapping torque addition effect. By recognizing this behavior, the control system can be redesigned to reduce the torque produced by the off-going cylinder (3 in this example) and the on-coming cylinder (4 in this example) such that the average torque over a cycle is not increased during a transition.

Figure 25:
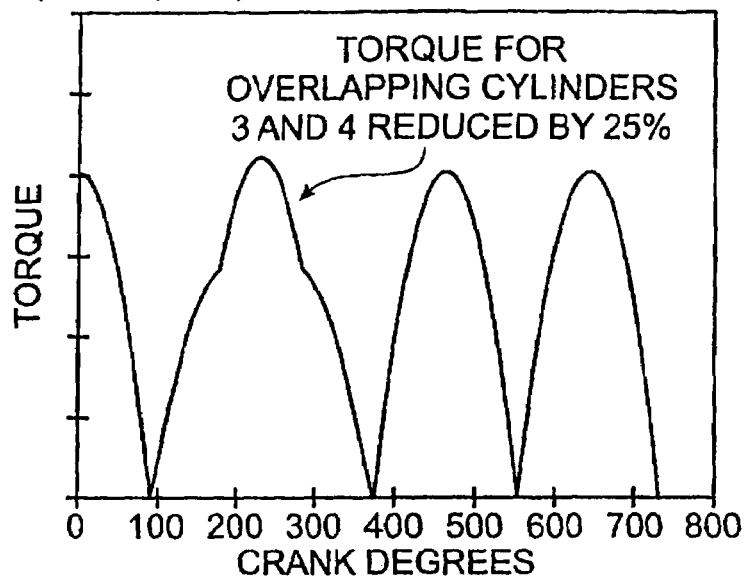

For an 8 cylinder engine, if the torque produced by cylinders 3 and 4 were reduced by approximately 25% each, then the torque profile would resemble FIG. 25, with the cycle average torque approximately matching the steady 4 or 8 cylinder operation.

In this way, it is possible to improve torque control when transitioning between operating in a first mode with the first group combusting inducted air and injected fuel and the second group operating with inducted air and substantially no injected fuel, and operation in a second mode with the second group combusting inducted air and injected fuel and the first group operating with inducted air and substantially no injected fuel. As indicated in the example, above, before the transition, engine torque of a last to be combusted cylinder in the first group is reduced compared with a previously combusted cylinder in that group. Further, after the transition, engine torque of a first to be combusted cylinder in the second group is reduced compared with a next combusted cylinder in that group.

The reduction of one or both of the cylinder can be accomplished in a variety of ways, such as, for example: ignition timing retard, or enleanment of the combusted air and fuel mixture. Further, using electric valve actuation, variable valve lift, an electronic throttle valve, etc., the reduction could be performed by reducing air charge in the cylinders.

In an alternative embodiment, it may be possible to provide improve torque control during the transition by reducing torque of only one of the last to be fired cylinder in the first group and the first to be fired cylinder in the second group. Further, it may be possible to provide improve torque control during the transition by providing unequal torque reduction in both the last to be fired cylinder in the first group and the first to be fired cylinder in the second group.

For example, the torque reduction for the last cylinder of the old firing order (in the example discussed above, cylinder 3) and the first cylinder of the new firing order (cylinder 4) could be implemented in any way such that the total indicated torque produced by these two cylinders was reduced by approximately 25%. For example, if the torque reduction of the last cylinder in the firing order is X*50% and the reduction of the first cylinder in the new firing order is (1−X)*50%, average torque could be maintained. For the example reduction of 25% each, X=0.5.

Figure 26:
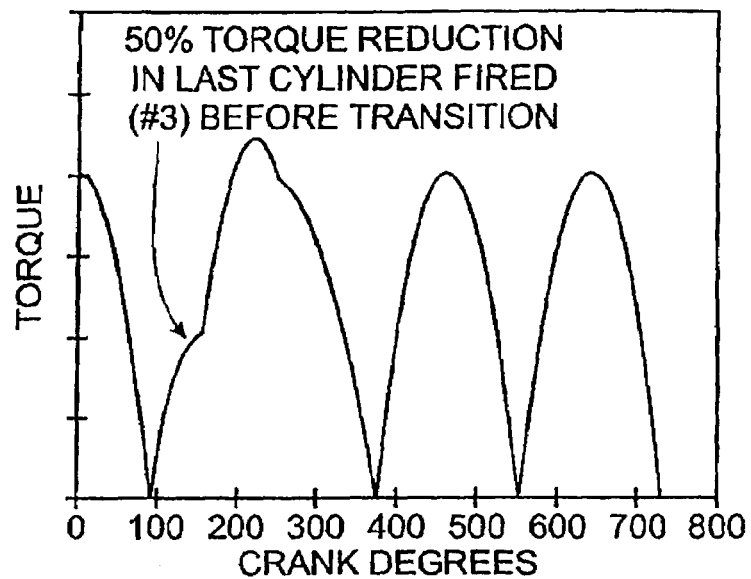
Figure 27:
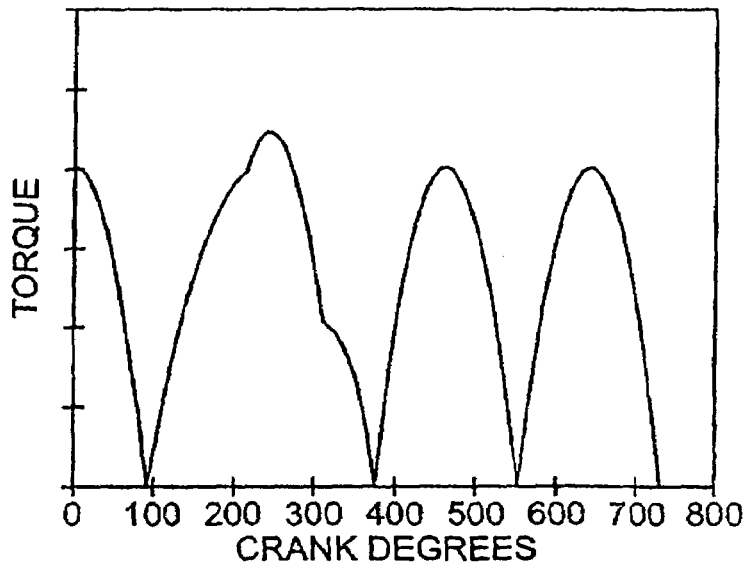

If all the torque were reduced on the last old firing order cylinder (X=1), the results would be similar to those shown in FIG. 26. Alternatively, if all the torque reduction was accomplished with the first cylinder of the new firing order (X=0), then the results would be similar to those shown in FIG. 27. These are just two example, and X could be selected anywhere between 0 and 1.

Referring now to FIGS. 28-33, an approach to reduce engine NVH during mode transitions between full cylinder operation and partial cylinder operation (between full cylinder operation and split ignition timing operation).

Figure 28:
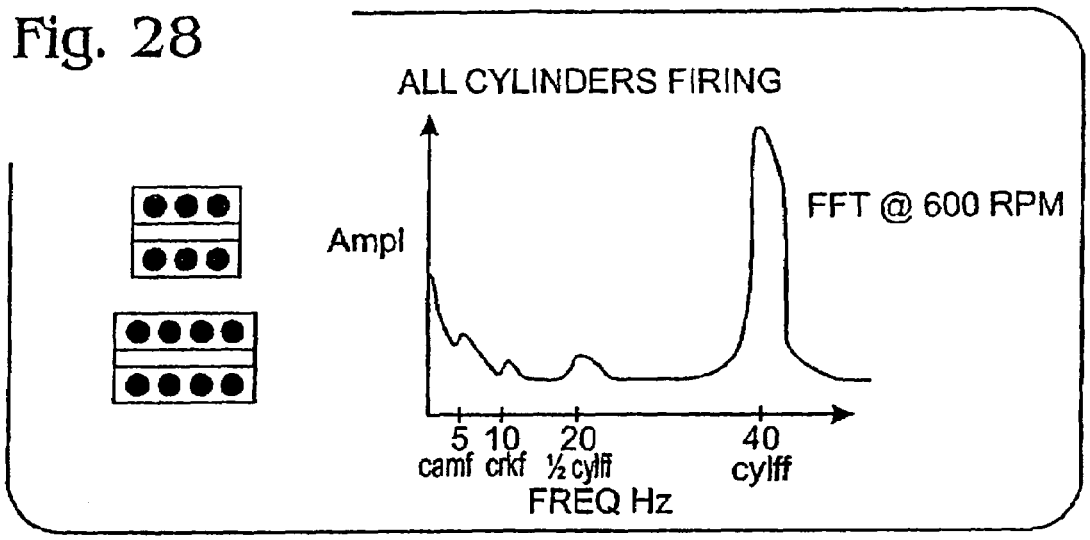
Figure 29:
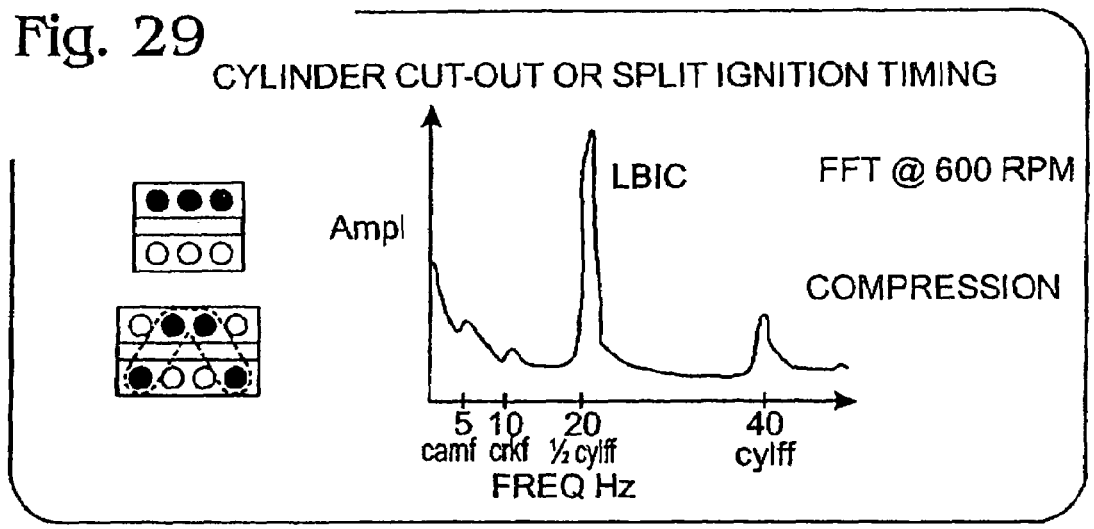
Figure 30:
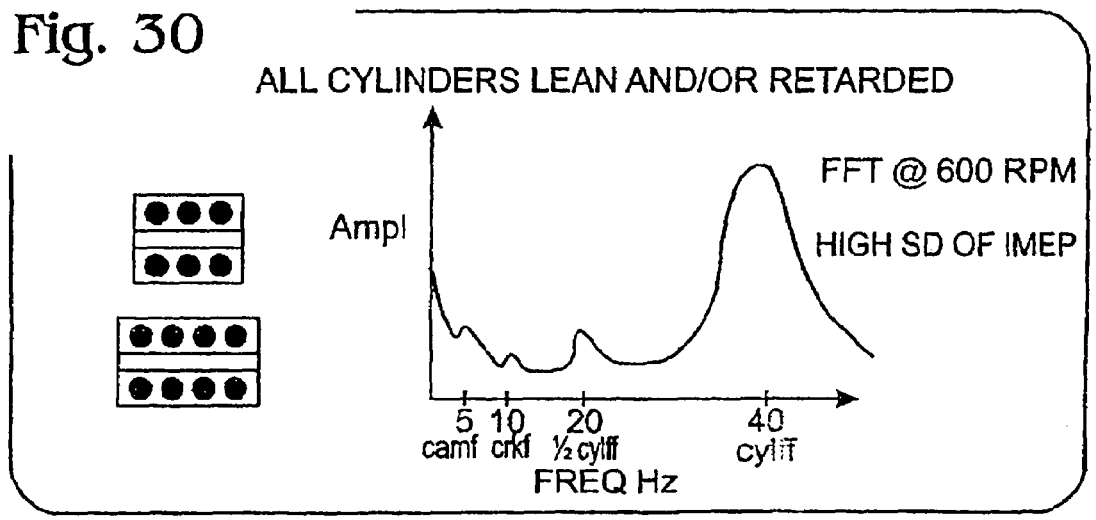

FIG. 28 shows the frequency content of the engine at 600 RPM with all cylinders firing at stoichiometry and optimal ignition timing. The figure shows a dominant peak at firing frequency of all cylinders firing (FF). This can be compared with FIG. 29, which shows the frequency content of the engine at 600 RPM operating in cylinder cut out mode (e.g., fuel to one bank of a V-6 deactivated, or fuel to two cylinders on each bank of a V-8 deactivated), or operating with split ignition timing between groups of cylinders. This shows a dominant peak at ½ FF, and a smaller peak at firing frequency due to compression of all cylinders, since deactivated cylinders still pump air. And both FIGS. 28 and 29 can be compared with FIG. 30, which shows the frequency content of the engine at 600 RPM with all cylinders firing at a lean air-fuel ratio and/or with regarded ignition timing. FIG. 30 shows a dominant peak at FF, but with a wider spread due to increased combustion variability due to lean, and/or retarded ignition timing.

When abruptly transitioning between these modes, there may be a broad band excitation due to the change in fundamental frequency content of the engine torque. This may excite resonance frequencies of the vehicle, such as a vehicle's body resonance, as shown by FIG. 31. Therefore, in one example when such NVH concerns are present, the engine can be operated to gradually make the transition (e.g., by gradually reducing torque in combusting cylinders and gradually increasing torque in deactivated cylinders when enabling combustion in deactivated cylinders). For example, this can be performed via split airflow control between the cylinder groups. Alternative, enleanment and/or ignition timing retard can also be used. In this way, the frequency excitation of any vehicle frequencies may be reduced. In other words, ramping to and from different modes may allow jumping over body resonances so that injector cut-out (or split ignition timing) can operate at lower engine speeds (e.g., during idle) while reducing vibration that may be caused by crossing and excite a body resonance. This is discussed in more detail below with regard to FIGS. 32-33.

Specifically, FIG. 32 shows the frequency content at a mid-point of a transition in which there are two smaller, broader peaks centered about FF and ½ FF. In this example, the engine transitions from operating with split ignition timing to operating all cylinders with substantially the same ignition timing. For example, the controller reduces airflow, or retards ignition timing, or enleans, cylinders generating power, and advanced ignition timing of the cylinders with significant ignition timing retard. FIG. 33 shows the frequency content near the end of the transition when all of the cylinders are carrying out combustion at substantially the same, retarded, ignition timing.

Thus, by using ramping, it may be possible to operate at a lower idle rpm by reducing potential NVH consequence and gradually changing torque frequency content, rather than abruptly stepping to and from different modes with the resultant broad band excitation due to frequency impulses. Further, this may be preferable to an approach that changes engine speed through a resonance before making a transition, which may increase NVH associated with running at a body resonance frequency.

Note that these figures show a single body resonance, however, there could also be drive line or mount resonances that vary with vehicle speed and gear ratio.

Referring now to FIG. 34, an example control strategy is described for use with a system such as in FIG. 2Q, for example. This strategy could be used with any even fire V-type engine such as, for example: a V-6 engine, a V-10 engine, a V-12 engine, etc. Specifically, this strategy uses a stoichiometric injector cut-out operation where one group of cylinders is operated to induct air with substantially no fuel injection, and the remaining cylinders are operating to combust a near stoichiometric air-fuel mixture. In this case, such as in the example of FIG. 2Q, catalysts 222 and 224 can be three-way type catalysts. Also note that a third catalyst can be coupled further downstream in an underbody location, which can also be a three-way catalyst. In this way, it is possible to disable the cylinder group without an upstream three-way catalyst (e.g., group 250), while continuing to operate the other group (group 252) in a stoichiometric condition. In this way, catalyst 222 can effectively reduce exhaust emissions from group 252. Further, when both groups are combusting a stoichiometric mixture, both catalysts 222 and 224 (as well as any further downstream catalysts) can be used to effectively purify exhaust emissions.

This exhaust system has a further advantage in that it is able to improve maintenance of catalyst temperatures even in the injector cut-out mode. Specifically, during cylinder fuel injection cut-out, catalyst 222 can convert emissions (e.g. HC, CO and NOx) in the stoichiometric exhaust gas mixture (which can oscillate about stoichiometry). The relatively cool air from bank 250 mixes with the hot stoichiometric exhaust gases before being fed to catalyst 224. However, this mixture is approximately the same temperature in the fuel injection cut-out mode as it would be in stoichiometric operation where both cylinders 250 and 252 carry out combustion. Specifically, when in the injector cut-out mode, the stoichiometric cylinder load is approximately twice the exhaust temperature in the mode of both groups carrying out combustion. This raises the exhaust temperature coming out of the cylinders in group 252 to nearly twice that of the cylinders carrying out combustion at an equivalent engine load. Thus, when excess air is added to the hotter exhaust gas in the cylinder cut-out mode, the overall temperature is high enough to keep catalysts 224 in a light-off mode. Therefore, when the engine exits the injector cut-out mode, both catalysts 222 and 224 are in a light-off mode and can be used to reduce emissions.

If, however, the exhaust system design is such that in the injector cut-out mode catalyst 224 still cools below a desired catalyst temperature, then split ignition operation can be used when re-enabling combustion to both cylinder groups as described above with regard to FIG. 8. Specifically, when transitioning from operating with group 250 in the cylinder in the fuel cut mode, and group 252 operating about stoichiometry—to operating both groups about stoichiometry, group 250 can be re-enabled with fuel injection to carry out combustion with a significantly retarded ignition timing. In this way, catalysts 224 can be rapidly heated due to the large amount of heat generated by group 250. Further, the significantly less retarded combustion of group 252 maintains the engine output smoothly about a desired value.

As described above, the configuration of FIG. 2Q can provide significant advantages in the fuel cut mode, however, the inventors herein have recognized that during cold starting conditions, catalyst 224 reaches a light off temperature slower than catalyst 222 due to the further distance from cylinder Group 250 and being in the downstream position relative to catalyst 222. Therefore, in one example, it is possible to provide better catalyst light off operation during a start using the split ignition timing approach described above herein. This is described in further detail below with regard to FIG. 34.

Referring now specifically to FIG. 34, a routine as described before regarding engine starting operation with an unequal exhaust path to the first catalyst such as in the system of FIG. 2Q, for example. First, in step 3410, the routine determines whether the exhaust configuration is one having unequal exhaust paths to a first catalyst. If the answer to step 3410 is "yes", the routine continues to step 3412. In step 3412, the routine determines whether the current conditions are a "cold engine start." This can be determined based on a time-sensitive last engine operation, engine coolant temperature and/or various other parameters. If the answer to step 3412 is "yes", the routine continues to step 3414 to operate the engine in a crank mode.

In the crank mode, the engine starter rotates the engine up to a speed at which it is possible to identify cylinder position. At this point, the engine provides for fuel injection to all the cylinders in a sequential mode, or in a "big bang" mode. In other words, the routine sequentially provides fuel injection to each of the engine cylinders in the desired fire mode to start the engine. Alternatively, the routine fires off fuel injectors simultaneously to all the cylinders and sequentially fires the ignition into each cylinder in the firing order to start the engine.

The routine then continues to step 3416 as the engine runs up to the desired idle speed. During the run-up mode, it is possible again to operate all of the cylinders to carry out combustion to run the engine up to a desired engine idle speed. At this point, the routine continues to step 3418, where the power-heat mode (e.g., split ignition timing) is used. In this mode, the cylinder group coupled to an upstream emission control device (e.g., Group 252) is operated with potentially a slightly lean air-fuel mixture, and slightly retarded ignition timing from maximum torque timing to maintain the cylinders at a desired engine speed. However, the other group (Group 250) is then operated with significant ignition timing retard to produce little engine torque output that provide significant amount of heat. While this combustion may be past the combustion stability limit, smooth engine operation can be maintained via the combustion in Group 252. The large amount of heat from Group 250 thereby quickly brings catalysts in the downstream position past a Y-pipe (e.g., catalyst 224) to a desired light-off temperature. In this way, both catalysts can be rapidly brought to a desired temperature, at which the engine can transition to operating both cylinder groups with substantially the same ignition timing.

Note that in an alternative embodiment, the split ignition timing between the cylinder groups can be commenced during the run-up mode or even during engine cranking.

It will be appreciated that the configurations and routines disclosed herein are exemplary in nature, and that these specific embodiments are not to be considered in a limiting sense, because numerous variations are possible. The subject matter of the present disclosure includes all novel and nonobvious combinations and subcombinations of the various system and exhaust configurations, fuel vapor purging estimate algorithms, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method for controlling an engine having at least a first and second group of cylinders, comprising:
    operating the engine in a first mode wherein the first cylinder group operates with air and substantially no injected fuel and the second cylinder group operates to combust air and injected fuel;
    during a first condition, transitioning the engine to operating in a second mode wherein both the first cylinder group and the second cylinder group operate to combust air and injected fuel, combustion in both said first and second cylinder group being lean of stoichiometry at a lean combustion limit with retarded ignition timing; and
    during a second condition, transitioning the engine to operating in a third mode wherein both the first cylinder group and the second cylinder group operate to combust air and injected fuel, combustion in both said first and second cylinder group being lean of stoichiometry less lean than the lean combustion limit without retarded ignition timing.

2. The method recited in claim 1 wherein said first condition and said second condition depend on engine airflow.

3. A method for controlling an engine having at least a first and second group of cylinders, each group comprising a plurality of cylinders, comprising:
    operating the engine in a first mode wherein the first cylinder group operates with air and substantially no injected fuel and the second cylinder group operates to combust air and injected fuel;
    during a first condition, transitioning the engine to operating in a second mode wherein both the first cylinder group and the second cylinder group operate to combust air and injected fuel, combustion in both said first and second cylinder group being lean of stoichiometry at a lean combustion limit with retarded ignition timing, wherein after said transition, airflow is decreased by closing a throttle valve of the engine; and
    during a second condition, transitioning the engine to operating in a third mode wherein both the first cylinder group and the second cylinder group operate to combust air and injected fuel, combustion in both said first and second cylinder group being lean of stoichiometry less lean than the lean combustion limit without retarded ignition timing, wherein said first condition and said second condition depend on engine airflow.

4. The method recited in claim 3 wherein during said first condition, ignition timing is advanced while said airflow is decreased.

5. The method recited in claim 4 wherein during said first condition, fuel charge per cylinder is decreased while said airflow is decreased to maintain operation at said lean combustion limit.

* * * * *